(12) United States Patent
Bakalash et al.

(10) Patent No.: US 8,284,207 B2
(45) Date of Patent: Oct. 9, 2012

(54) METHOD OF GENERATING DIGITAL IMAGES OF OBJECTS IN 3D SCENES WHILE ELIMINATING OBJECT OVERDRAWING WITHIN THE MULTIPLE GRAPHICS PROCESSING PIPELINE (GPPLS) OF A PARALLEL GRAPHICS PROCESSING SYSTEM GENERATING PARTIAL COLOR-BASED COMPLEMENTARY-TYPE IMAGES ALONG THE VIEWING DIRECTION USING BLACK PIXEL RENDERING AND SUBSEQUENT RECOMPOSITING OPERATIONS

(75) Inventors: Reuven Bakalash, Shdema (IL); Yaniv Leviathan, Savyon (IL)

(73) Assignee: Lucid Information Technology, Ltd., Kfar Netter (IL)

( * ) Notice: Subject to any disclaimer, the term of this patent is extended or adjusted under 35 U.S.C. 154(b) by 286 days.

(21) Appl. No.: 12/231,304

(22) Filed: Aug. 29, 2008

(65) Prior Publication Data
US 2009/0128551 A1 May 21, 2009

Related U.S. Application Data

(63) Continuation of application No. 12/077,072, filed on Mar. 14, 2008, now abandoned, which is a
(Continued)

(51) Int. Cl.
*G06F 15/80* (2006.01)
*G06F 15/00* (2006.01)
*G06F 9/46* (2006.01)
*G06T 1/00* (2006.01)
*G06T 1/20* (2006.01)
*G06K 9/60* (2006.01)

(52) U.S. Cl. ........ 345/505; 345/501; 345/502; 345/506; 382/304; 712/32; 718/102; 718/105

(58) Field of Classification Search .................. None
See application file for complete search history.

(56) References Cited

U.S. PATENT DOCUMENTS
5,475,856 A 12/1995 Kogge
(Continued)

FOREIGN PATENT DOCUMENTS
WO WO 2004/070652 A2 8/2004

OTHER PUBLICATIONS

Abram Santilli and Ewa Huebner, A Global Hierarchical Z Space Algorithm for Cluster Parallel Graphics Architectures, Copyright © 2006 by the Association for Computing Machinery, Inc., GRAPHITE 2006, Kuala Lumpur, Malaysia, Nov. 29-Dec. 2, 2006, pp. 137-145.*

(Continued)

*Primary Examiner* — Tize Ma
(74) *Attorney, Agent, or Firm* — Eitan, Mehulal & Sadot

(57) ABSTRACT

A multi-pass method of generating an image frame of a 3D scene while eliminating the overdrawing of objects within the multiple graphics processing pipelines (GPPLs) supported on a parallel graphics processing system The GPPLs include a primary GPPL, and each GPPL, includes a color frame buffer and Z depth buffer. The GPPLs support an object-division based parallel graphics rendering process, in which the 3D scene is decomposed into objects that are assigned to particular GPPLs for processing. The multi-pass method involves, during a first pass, locally a Global Depth Map (GDM) which is provided to the Z depth buffer of each GPPL. This step involves the transmission of graphics commands and data for all objects in the image frame, to all GPPLs to be rendered. Then, during subsequent passes, a complementary-type partial image consisting of visible pixels only is generated within the color buffer of each GPPL using the GDM and a Z test filter supported by the Z depth buffer. After subsequent passes are performed, a complete color image is recomposited within the primary GPPL, using the complementary-type partial images stored in the color buffers of the GPPLs, without comparing or recompositing depth values in the Z depth buffers.

18 Claims, 54 Drawing Sheets

Generalized Embodiment of The Multi-Pass Parallel Graphics Processing Method of Present Invention

Related U.S. Application Data continuation-in-part of application No. 11/897,536, filed on Aug. 30, 2007, now Pat. No. 7,961,194, and a continuation-in-part of application No.PCT/US2007/026466, filed on Dec. 28, 2007, and a continuation-in-part of application No. 11/789,039, filed on Apr. 23, 2007, now abandoned, and a continuation-in-part of application No. 11/655,735, filed on Jan. 18, 2007, now Pat. No. 8,085,273, and a continuation-in-part of application No. PCT/IB2007/003464, filed on Jan. 18, 2007, said application No. 12/077,072 is a continuation-in-part of application No. 11/648,160, filed on Dec. 31, 2006, and a continuation-in-part of application No. 11/386,454, filed on Mar. 22, 2006, now Pat. No. 7,834,880, and a continuation-in-part of application No. 11/340,402, filed on Jan. 25, 2006, now Pat. No. 7,812,844, which is a continuation-in-part of application No. PCT/IB2006/001529, filed on Jan. 25, 2006, and a continuation-in-part of application No. 10/579,682, filed as application No. PCT/IL2004/001069 on Nov. 19, 2004, now Pat. No. 7,808,499.

(60) Provisional application No. 60/759,608, filed on Jan. 18, 2006, provisional application No. 60/647,146, filed on Jan. 25, 2005, provisional application No. 60/523,084, filed on Nov. 19, 2003.

(56) References Cited

U.S. PATENT DOCUMENTS

| | | |
|---|---|---|
| 5,535,410 A | 7/1996 | Watanabe et al. |
| 5,687,357 A | 11/1997 | Priem |
| 5,740,464 A | 4/1998 | Priem et al. |
| 5,745,762 A | 4/1998 | Celi, Jr. et al. |
| 5,754,866 A | 5/1998 | Priem |
| 5,757,385 A | 5/1998 | Narayanaswami et al. |
| 5,758,182 A | 5/1998 | Rosenthal et al. |
| 5,794,016 A | 8/1998 | Kelleher |
| 5,841,444 A | 11/1998 | Mun et al. |
| 5,909,595 A | 6/1999 | Rosenthal et al. |
| 6,118,462 A | 9/2000 | Mergulis |
| 6,169,553 B1 | 1/2001 | Fuller et al. |
| 6,181,352 B1 | 1/2001 | Kirk et al. |
| 6,184,908 B1 | 2/2001 | Chan et al. |
| 6,188,412 B1 | 2/2001 | Morein |
| 6,191,800 B1 | 2/2001 | Arenburg et al. |
| 6,201,545 B1 | 3/2001 | Wong et al. |
| 6,212,261 B1 | 4/2001 | Meubus et al. |
| 6,212,617 B1 | 4/2001 | Hardwick |
| 6,259,460 B1 | 7/2001 | Gossett et al. |
| 6,288,418 B1 | 9/2001 | Reed et al. |
| 6,292,200 B1 | 9/2001 | Bowen et al. |
| 6,333,744 B1 | 12/2001 | Kirk et al. |
| 6,337,686 B2 | 1/2002 | Wong et al. |
| 6,352,479 B1 | 3/2002 | Sparks, II |
| 6,362,825 B1 | 3/2002 | Johnson |
| 6,415,345 B1 | 7/2002 | Wu et al. |
| 6,442,656 B1 | 8/2002 | Alasti et al. |
| 6,462,737 B2 | 10/2002 | Lindholm et al. |
| 6,473,086 B1 | 10/2002 | Morein et al. |
| 6,473,089 B1 | 10/2002 | Wei et al. |
| 6,477,687 B1 | 11/2002 | Thomas |
| 6,492,987 B1 | 12/2002 | Morein |
| 6,496,187 B1 | 12/2002 | Deering et al. |
| 6,496,404 B1 | 12/2002 | Fiedler et al. |
| 6,502,173 B1 | 12/2002 | Aleksic et al. |
| 6,529,198 B1 | 3/2003 | Miyauchi |
| 6,532,013 B1 | 3/2003 | Papakipos et al. |
| 6,532,525 B1 | 3/2003 | Aleksic et al. |
| 6,535,209 B1 | 3/2003 | Abdalla et al. |
| 6,542,971 B1 | 4/2003 | Reed |
| 6,557,065 B1 | 4/2003 | Peleg et al. |
| 6,577,309 B2 | 6/2003 | Lindholm et al. |
| 6,577,320 B1 | 6/2003 | Kirk |
| 6,578,068 B1 | 6/2003 | Bowman-Amuah |
| 6,593,923 B1 | 7/2003 | Donovan et al. |
| 6,633,296 B1 | 10/2003 | Laksono et al. |
| 6,636,212 B1 | 10/2003 | Zhu |
| 6,636,215 B1 | 10/2003 | Greene |
| 6,646,639 B1 | 11/2003 | Greene et al. |
| 6,650,330 B2 | 11/2003 | Lindholm et al. |
| 6,650,331 B2 | 11/2003 | Lindholm et al. |
| 6,657,635 B1 | 12/2003 | Hutchins et al. |
| 6,662,257 B1 | 12/2003 | Caruk et al. |
| 6,664,960 B2 | 12/2003 | Goel et al. |
| 6,664,963 B1 | 12/2003 | Zatz |
| 6,670,958 B1 | 12/2003 | Aleksic et al. |
| 6,677,953 B1 | 1/2004 | Twardowski et al. |
| 6,683,614 B2 | 1/2004 | Walls et al. |
| 6,690,372 B2 | 2/2004 | Donovan et al. |
| 6,691,180 B2 | 2/2004 | Priem et al. |
| 6,700,583 B2 | 3/2004 | Fowler et al. |
| 6,704,025 B1 | 3/2004 | Bastos et al. |
| 6,724,394 B1 | 4/2004 | Zatz et al. |
| 6,725,457 B1 | 4/2004 | Priem et al. |
| 6,728,820 B1 | 4/2004 | Brian et al. |
| 6,731,298 B1 | 5/2004 | Moreton et al. |
| 6,734,861 B1 | 5/2004 | Van Dyke et al. |
| 6,734,874 B2 | 5/2004 | Lindholm et al. |
| 6,741,243 B2 | 5/2004 | Lewis et al. |
| 6,744,433 B1 | 6/2004 | Bastos et al. |
| 6,753,878 B1 | 6/2004 | Heirich et al. |
| 6,774,895 B1 | 8/2004 | Papakipos et al. |
| 6,778,176 B2 | 8/2004 | Lindholm et al. |
| 6,778,177 B1 | 8/2004 | Furtner |
| 6,778,181 B1 | 8/2004 | Kilgariff et al. |
| 6,778,189 B1 | 8/2004 | Kilgard |
| 6,779,069 B1 | 8/2004 | Treichler et al. |
| 6,789,154 B1 | 9/2004 | Lee et al. |
| 6,797,998 B2 | 9/2004 | Dewey et al. |
| 6,801,202 B2 | 10/2004 | Nelson et al. |
| 6,812,927 B1 | 11/2004 | Cutler et al. |
| 6,825,843 B2 | 11/2004 | Allen et al. |
| 6,828,980 B1 | 12/2004 | Moreton et al. |
| 6,828,987 B2 | 12/2004 | Swan |
| 6,831,652 B1 | 12/2004 | Orr |
| 6,842,180 B1 | 1/2005 | Maiyuran et al. |
| 6,844,879 B2 | 1/2005 | Miyaushi |
| 6,856,320 B1 | 2/2005 | Rubinstein et al. |
| 6,864,893 B2 | 3/2005 | Zatz |
| 6,864,984 B2 | 3/2005 | Naya et al. |
| 6,870,540 B1 | 3/2005 | Lindholm et al. |
| 6,876,362 B1 | 4/2005 | Newhall, Jr. et al. |
| 6,885,376 B2 | 4/2005 | Tang-Petersen et al. |
| 6,894,687 B1 | 5/2005 | Kilgard et al. |
| 6,894,689 B1 | 5/2005 | Greene et al. |
| 6,900,810 B1 | 5/2005 | Moreton et al. |
| 6,938,176 B1 | 8/2005 | Alben et al. |
| 6,940,515 B1 | 9/2005 | Moreton et al. |
| 6,947,047 B1 | 9/2005 | Moy et al. |
| 6,947,865 B1 | 9/2005 | Mimberg et al. |
| 6,952,206 B1 | 10/2005 | Craighead |
| 6,956,579 B1 | 10/2005 | Diard et al. |
| 6,959,110 B1 | 10/2005 | Danskin et al. |
| 6,961,057 B1 | 11/2005 | Van Dyke et al. |
| 6,975,319 B1 | 12/2005 | Donovan et al. |
| 6,980,209 B1 | 12/2005 | Donham et al. |
| 6,982,718 B2 | 1/2006 | Kilgard et al. |
| 6,985,152 B2 | 1/2006 | Rubinstein et al. |
| 6,989,840 B1 | 1/2006 | Everitt et al. |
| 6,992,667 B2 | 1/2006 | Lindholm et al. |
| 6,995,767 B1 | 2/2006 | Donovan et al. |
| 6,999,076 B2 | 2/2006 | Morein |
| 7,002,588 B1 | 2/2006 | Lindholm et al. |
| 7,015,915 B1 | 3/2006 | Diard |
| 7,023,437 B1 | 4/2006 | Voorhies et al. |
| 7,027,972 B1 | 4/2006 | Lee |
| 7,038,678 B2 | 5/2006 | Bunnell |
| 7,038,685 B1 | 5/2006 | Lindholm |

| Patent No. | Date | Inventor |
|---|---|---|
| 7,038,692 B1 | 5/2006 | Priem et al. |
| 7,051,139 B2 | 5/2006 | Peleg et al. |
| 7,053,901 B2 | 5/2006 | Huang et al. |
| 7,064,763 B2 | 6/2006 | Lindholm et al. |
| 7,068,272 B1 | 6/2006 | Voorhies et al. |
| 7,068,278 B1 | 6/2006 | Williams et al. |
| 7,075,541 B2 | 7/2006 | Diard |
| 7,080,194 B1 | 7/2006 | Van Dyke |
| 7,081,895 B2 | 7/2006 | Papakipos et al. |
| 7,091,971 B2 | 8/2006 | Morein |
| 7,095,414 B2 | 8/2006 | Lindholm et al. |
| 7,098,922 B1 | 8/2006 | Bastos et al. |
| 7,119,808 B2 | 10/2006 | Goncalez et al. |
| 7,120,816 B2 | 10/2006 | Williams et al. |
| 7,123,266 B2 | 10/2006 | Wei et al. |
| 7,129,909 B1 | 10/2006 | Dong et al. |
| 7,130,316 B2 | 10/2006 | Kovacevic |
| 7,142,215 B1 | 11/2006 | Papakipos et al. |
| 7,145,565 B2 | 12/2006 | Everitt et al. |
| 7,170,513 B1 | 1/2007 | Voorhies et al. |
| 7,170,515 B1 | 1/2007 | Zhu |
| 7,224,359 B1 | 5/2007 | Papakipos et al. |
| 7,248,261 B1 | 7/2007 | Hakura |
| 7,289,125 B2 | 10/2007 | Diard et al. |
| 7,324,111 B2 | 1/2008 | Diamond |
| 7,324,547 B1 | 1/2008 | Alfieri et al. |
| 7,325,086 B2 | 1/2008 | Kong et al. |
| 7,372,465 B1 | 5/2008 | Tamasi et al. |
| 7,388,581 B1 | 6/2008 | Diard et al. |
| 7,477,256 B1 | 1/2009 | Johnson |
| 7,525,547 B1 | 4/2009 | Diard |
| 7,598,958 B1 | 10/2009 | Kelleher |
| 2001/0029556 A1 | 10/2001 | Priem et al. |
| 2002/0015055 A1 | 2/2002 | Foran |
| 2002/0059302 A1 | 5/2002 | Ebihara |
| 2002/0085007 A1 | 7/2002 | Nelson et al. |
| 2002/0118308 A1 | 8/2002 | Dujmenovic |
| 2002/0145612 A1 | 10/2002 | Blythe et al. |
| 2002/0180740 A1 | 12/2002 | Lindholm et al. |
| 2002/0196259 A1 | 12/2002 | Lindholm et al. |
| 2003/0020720 A1 | 1/2003 | Lindholm et al. |
| 2003/0034975 A1 | 2/2003 | Lindholm et al. |
| 2003/0038808 A1 | 2/2003 | Lindholm et al. |
| 2003/0080959 A1 | 5/2003 | Morein |
| 2003/0103054 A1 | 6/2003 | Montrym et al. |
| 2003/0112245 A1 | 6/2003 | Lindholm et al. |
| 2003/0112246 A1 | 6/2003 | Lindholm et al. |
| 2003/0117971 A1 | 6/2003 | Aubury |
| 2003/0128197 A1 | 7/2003 | Turner et al. |
| 2003/0151606 A1 | 8/2003 | Morein |
| 2003/0164832 A1 | 9/2003 | Alcorn |
| 2003/0164834 A1 | 9/2003 | Lefebvre et al. |
| 2003/0171907 A1 | 9/2003 | Gal-On et al. |
| 2003/0179220 A1 | 9/2003 | Dietrich, Jr. et al. |
| 2003/0188075 A1 | 10/2003 | Peleh et al. |
| 2003/0189565 A1 | 10/2003 | Lindholm et al. |
| 2003/0212735 A1 | 11/2003 | Hicok et al. |
| 2004/0012600 A1 | 1/2004 | Deering et al. |
| 2004/0036159 A1 | 2/2004 | Bruno |
| 2004/0153778 A1 | 8/2004 | Cheng |
| 2004/0169651 A1 | 9/2004 | Everitt et al. |
| 2004/0179019 A1 | 9/2004 | Sabella et al. |
| 2004/0196289 A1 | 10/2004 | Langendorf et al. |
| 2004/0207618 A1 | 10/2004 | Williams et al. |
| 2004/0210788 A1 | 10/2004 | Williams et al. |
| 2004/0223003 A1 | 11/2004 | Heirich et al. |
| 2005/0041031 A1 | 2/2005 | Diard |
| 2005/0081115 A1 | 4/2005 | Cheng et al. |
| 2005/0122330 A1 | 6/2005 | Boyd et al. |
| 2005/0162437 A1 | 7/2005 | Morein et al. |
| 2005/0166207 A1 | 7/2005 | Baba et al. |
| 2005/0190189 A1 | 9/2005 | Chefd'hotel et al. |
| 2005/0190190 A1 | 9/2005 | Diard et al. |
| 2005/0195186 A1 | 9/2005 | Mitchell et al. |
| 2005/0195187 A1 | 9/2005 | Seiler et al. |
| 2005/0206646 A1 | 9/2005 | Alcorn |
| 2005/0223124 A1 | 10/2005 | Reed |
| 2005/0225558 A1 | 10/2005 | Morein et al. |
| 2005/0237327 A1 | 10/2005 | Rubinstein et al. |
| 2005/0237329 A1 | 10/2005 | Rubinstein et al. |
| 2005/0243096 A1 | 11/2005 | Possley et al. |
| 2005/0243215 A1 | 11/2005 | Doswald et al. |
| 2005/0259103 A1 | 11/2005 | Kilgard et al. |
| 2005/0265064 A1 | 12/2005 | Ku et al. |
| 2005/0275760 A1 | 12/2005 | Gritz et al. |
| 2006/0005178 A1 | 1/2006 | Kilgard et al. |
| 2006/0028478 A1 | 2/2006 | Rubinstein et al. |
| 2006/0055695 A1 | 3/2006 | Abdalla et al. |
| 2006/0059494 A1 | 3/2006 | Wexler et al. |
| 2006/0101218 A1 | 5/2006 | Reed |
| 2006/0114260 A1 | 6/2006 | Diard |
| 2006/0119607 A1 | 6/2006 | Lindholm et al. |
| 2006/0120376 A1 | 6/2006 | Duncan et al. |
| 2006/0123142 A1 | 6/2006 | Duncan et al. |
| 2006/0156399 A1 | 7/2006 | Parmar et al. |
| 2006/0202941 A1 | 9/2006 | Morein et al. |
| 2006/0208960 A1 | 9/2006 | Glen |
| 2006/0221086 A1 | 10/2006 | Diard |
| 2006/0221087 A1 | 10/2006 | Diard |
| 2006/0225061 A1 | 10/2006 | Ludwig et al. |
| 2006/0248241 A1 | 11/2006 | Danilak |
| 2006/0267987 A1 | 11/2006 | Litchmanov |
| 2006/0268005 A1 | 11/2006 | Hutchins et al. |
| 2006/0271713 A1 | 11/2006 | Xie et al. |
| 2006/0274073 A1 | 12/2006 | Johnson et al. |
| 2006/0282604 A1 | 12/2006 | Temkine et al. |
| 2006/0290700 A1 | 12/2006 | Gonzalez et al. |
| 2007/0159488 A1 | 7/2007 | Danskin et al. |
| 2007/0195099 A1 | 8/2007 | Diard et al. |
| 2008/0007559 A1 | 1/2008 | Kalaiah et al. |
| 2008/0143731 A1 | 6/2008 | Cheng et al. |
| 2008/0309676 A1* | 12/2008 | Nehab et al. .................. 345/582 |

OTHER PUBLICATIONS

Jeremy Birn, 3D Render.com Render Passes, Layers, and 3D Compositing, Feb. 21, 2007, http://web.archive.org/web/20070221212834/www.3drender.com/light/compositing/index.html.*

Antonio Garcia and Han-Wei Shen "An Interleaved Parallel Volume Render With PC-clusters", Proceedings of the Fourth Eurographics Workshop on Parallel Graphics and Visualization, 19 pages, 2002.

Erik Reinhard and Chuck Hansen, "A Comparison of Parallel Compositing Techniques on Shared Memory Architectures", Accepted for the Eurographics Workshop on Parallel Graphics and Visualisations, Girona, Spain, 9 pages, Sep. 2000.

Steven Molnar, "Combining Z-buffer Engines for Higher-Speed Rendering", Proceedings of the 1988 Eurographics Workshop on Graphics Hardware, 11 pages, 1988.

John Eyles et al., "PixelFlow: The Realization," SIGGRAPH/EUROGRAPHICS Conference on Graphics Hardware, 13 pages, 1997.

Publication by TW Crockett entitled, "An Introduction to Parallel Rendering", in Parallel Computing, 1997, Elsevier Science, 29 Pages.

Technical publication by Li et al entitled "ParVox—A Parallel Splatting Volume Rendering System for Distributed Visualization," Oct. 1997, 7 Pages.

Department of Computer Science, University of North Carolina publication by Molnar et al. entitled, "PixelFlow: High-Speed Rendering Using Image Composition," 1992, 10 Pages.

EP 04 79 9376, Oct. 14, 2008.
PCT/IB07/03464, Sep. 22, 2008.
PCT/US07/26466, Jul. 16, 2008.
PCT/IB06/01529, Dec. 31, 2007.
PCT/IL04/001069, Jun. 30, 2005.

Powerpoint presentation entitled, "Go Multiple" by Dennis Yang, Conference Platform , 2007, 11 pages.

Scientific publication entitled, "Chromium; A Stream-Processing Framework for Interactive Rendering On Clusters" from Stanford University, Lawrence Livermore National Laboratory, and IBM T.J. Watson Research Center, 2007, 10 pages.

Princeton University document entitled "Hybrid Sort-First and Sort-Last Parallel Rendering with a Cluster of PC's," Samanta et al., Princeton University Department of Energy, Aug. 21, 2000, pp. 97-108.

Silicon Graphics, Inc. pdf. document entitled "OpenGL Multipipe™ SDK White Paper", 2002, 2003, pp. 1-32.

Silicon Graphics, Inc. online document entitled "Additional Information for: OpenGL Multipipe™ SDK White Paper (IRIX 6.5)", published Feb. 1, 2003, 2 pages.

* cited by examiner

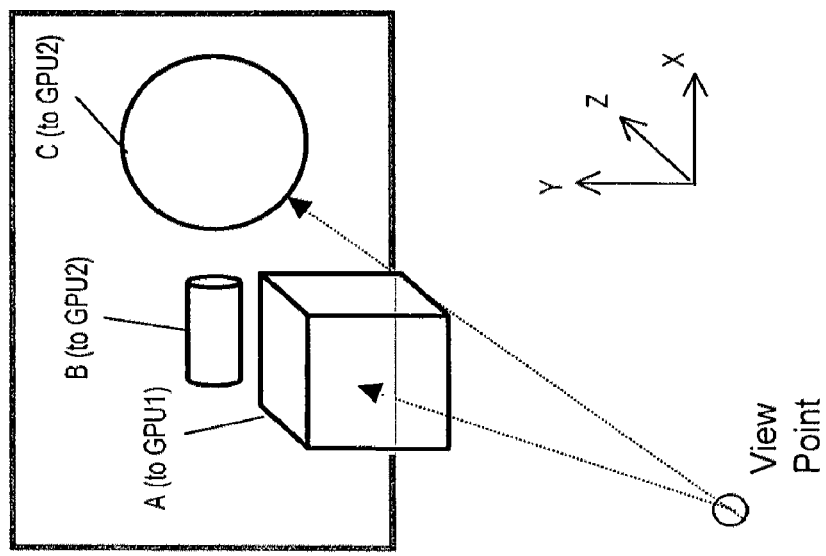
Fig. 1E1

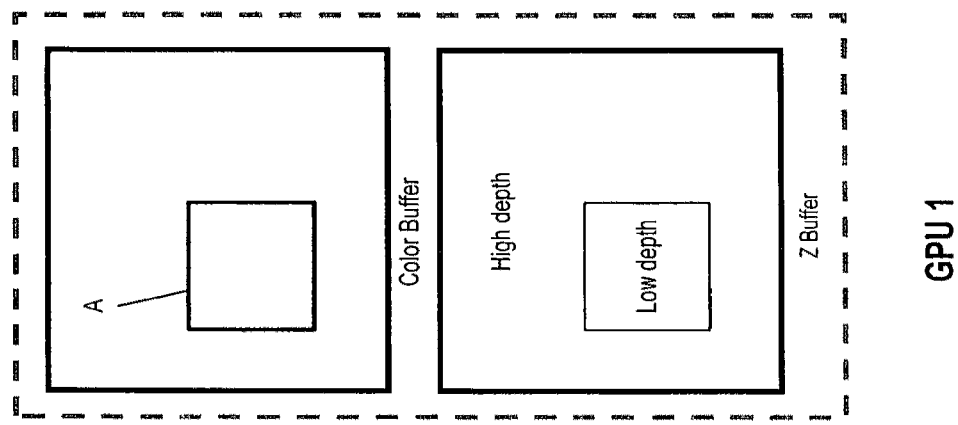

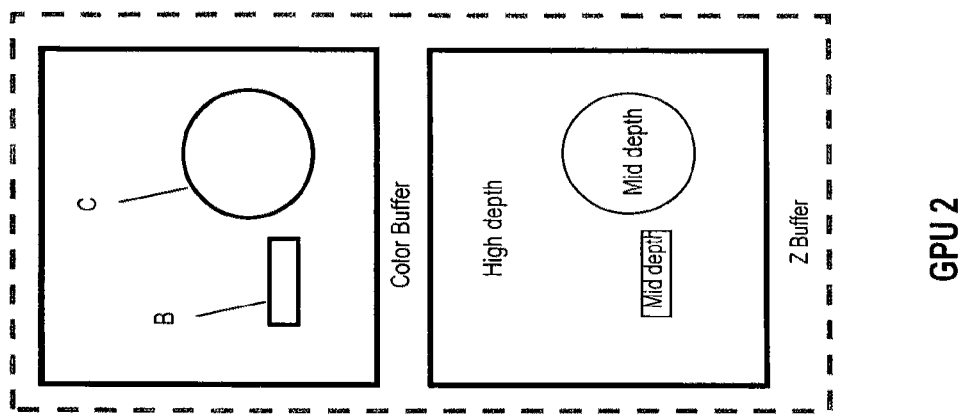
Fig. 1E3

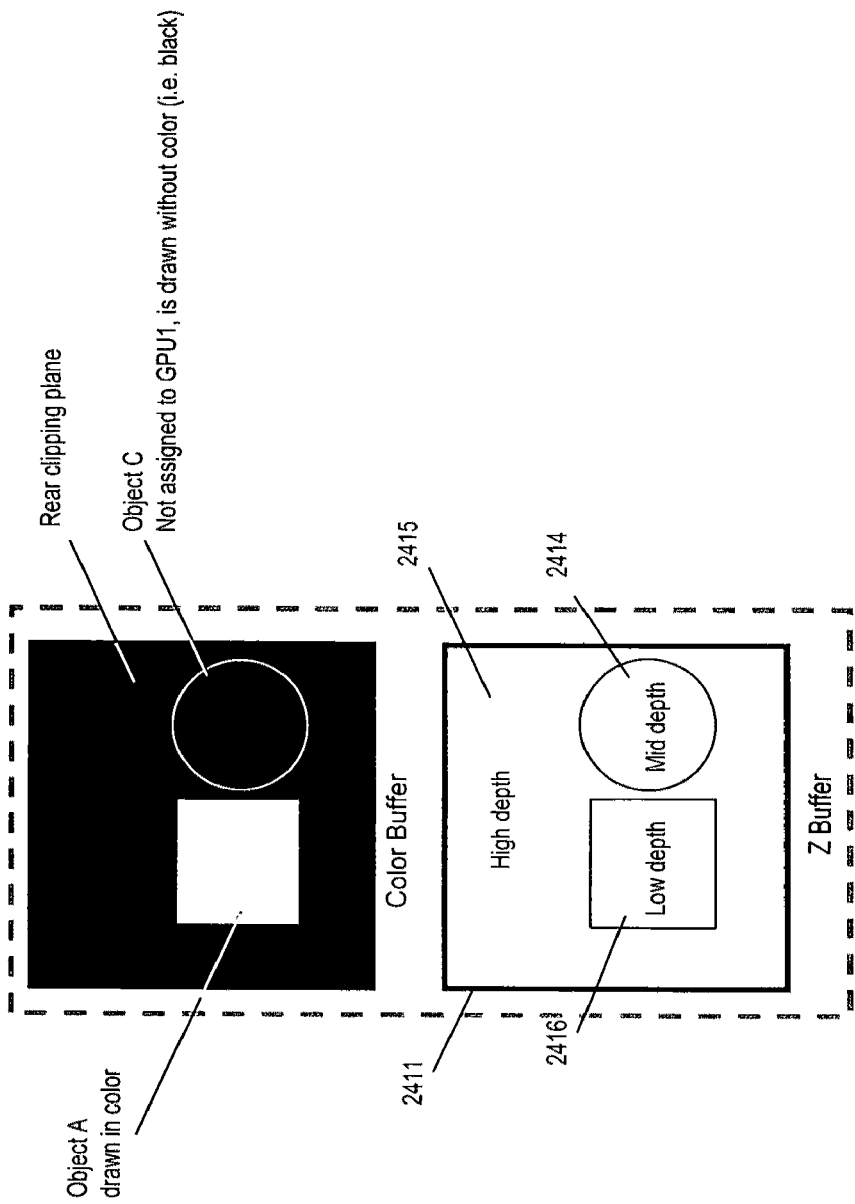
Fig. 2D1

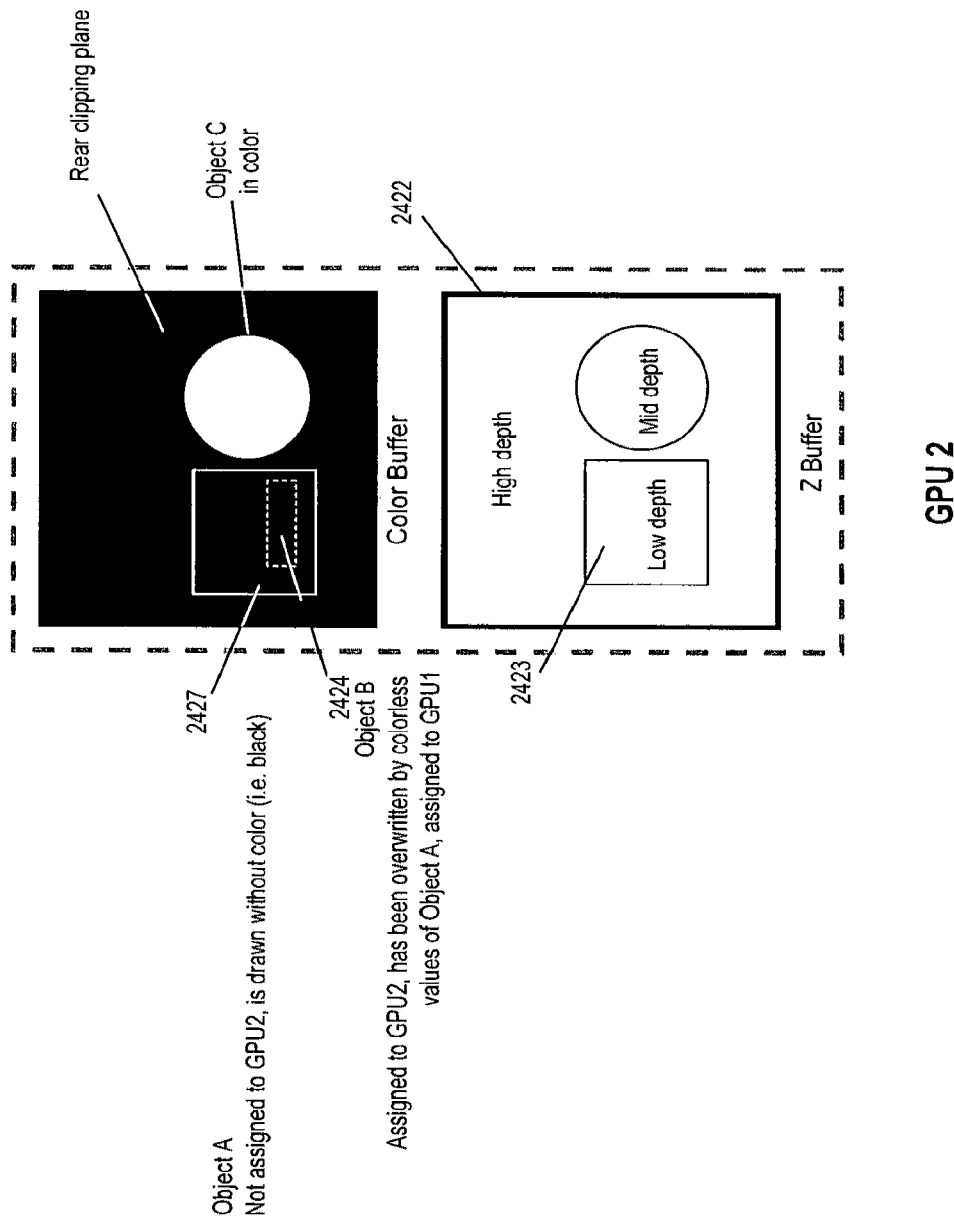
Fig. 2D2

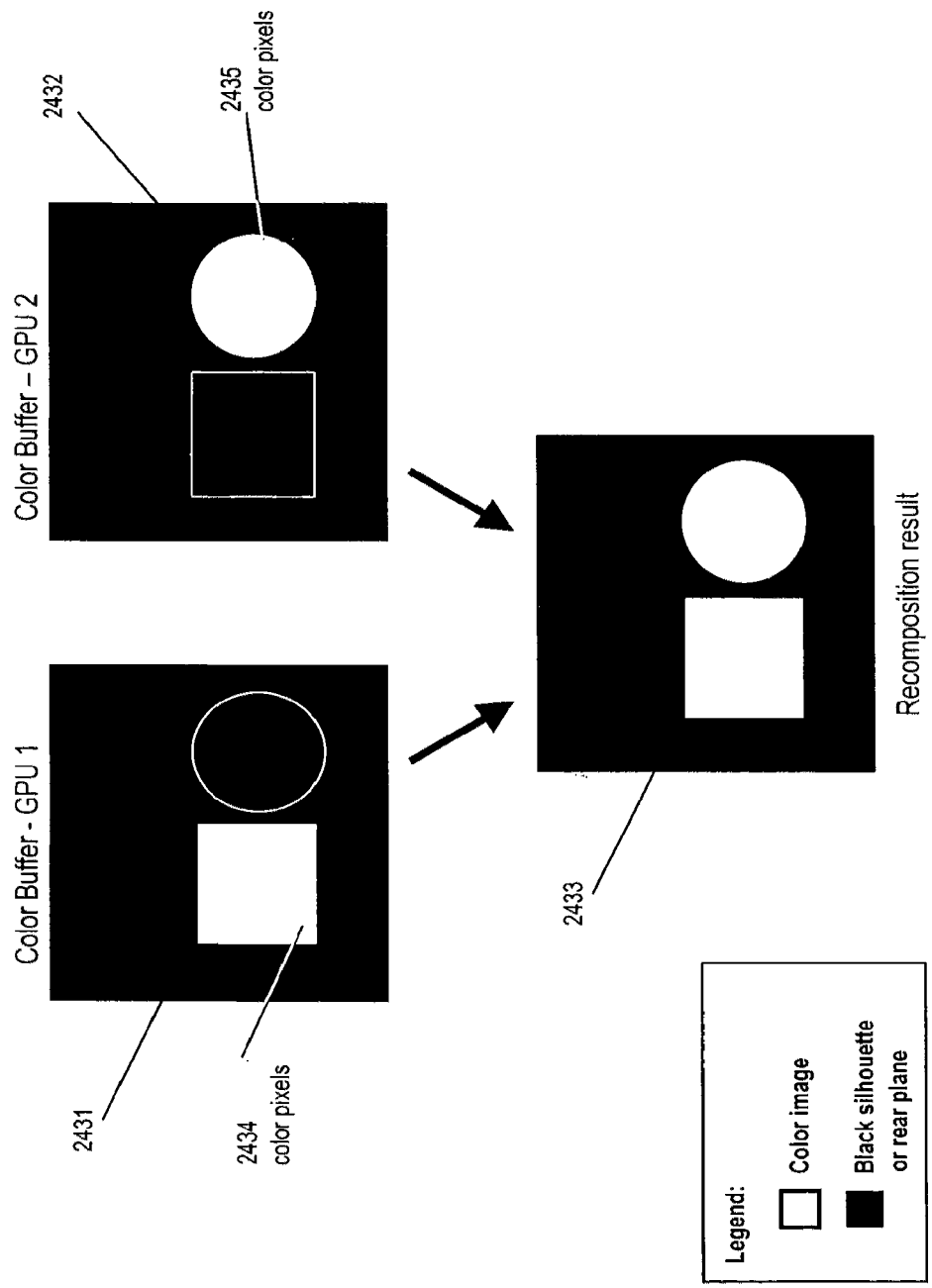
Fig. 2D3

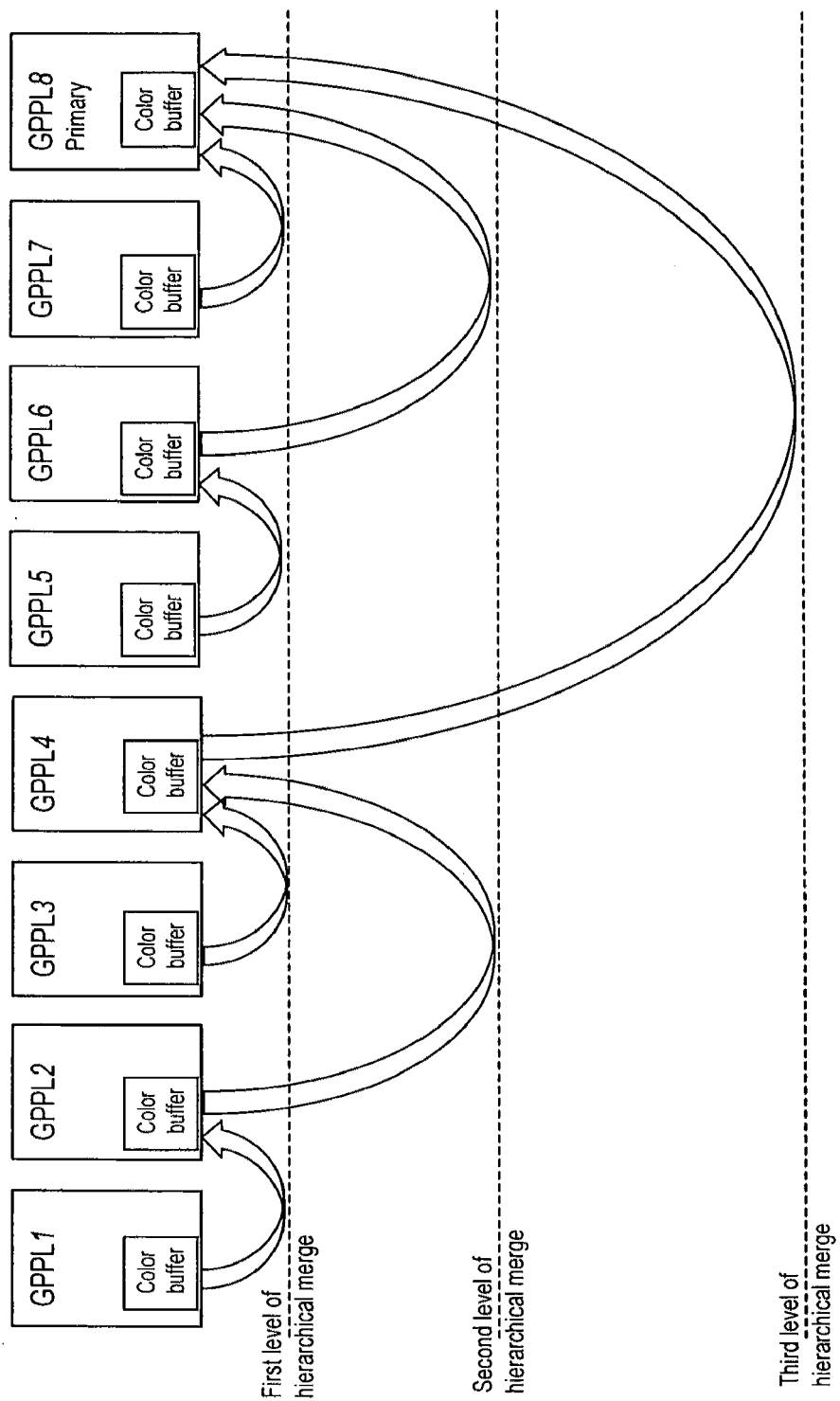
Fig. 2E1

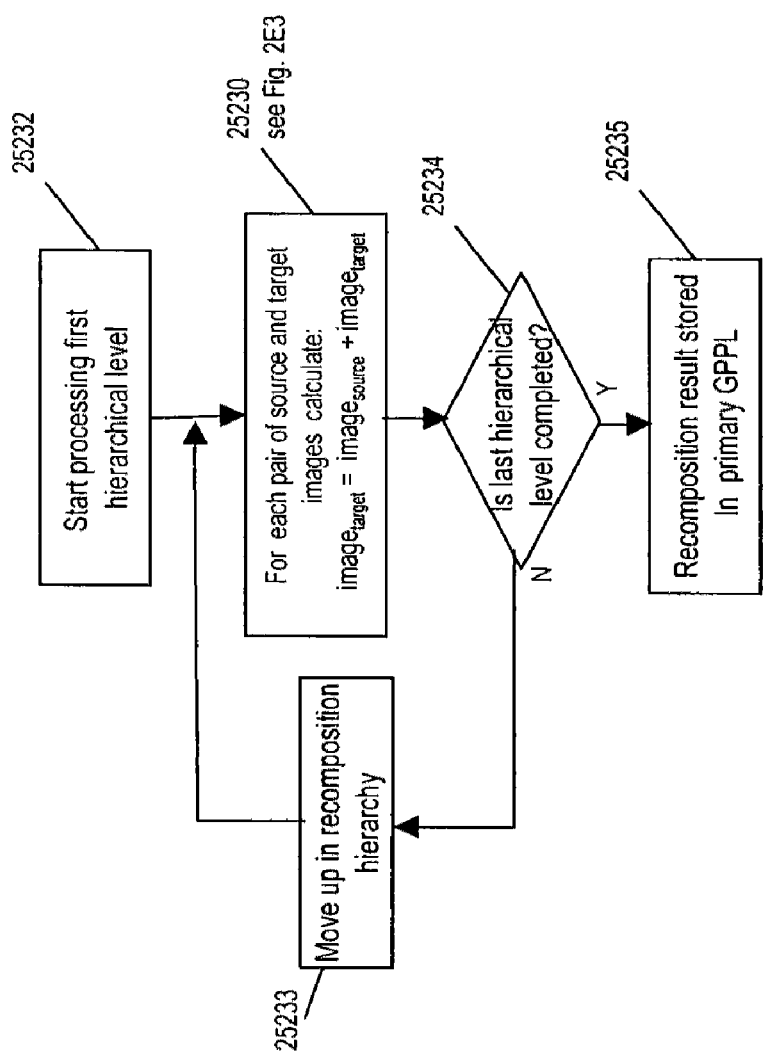
Fig. 2E2

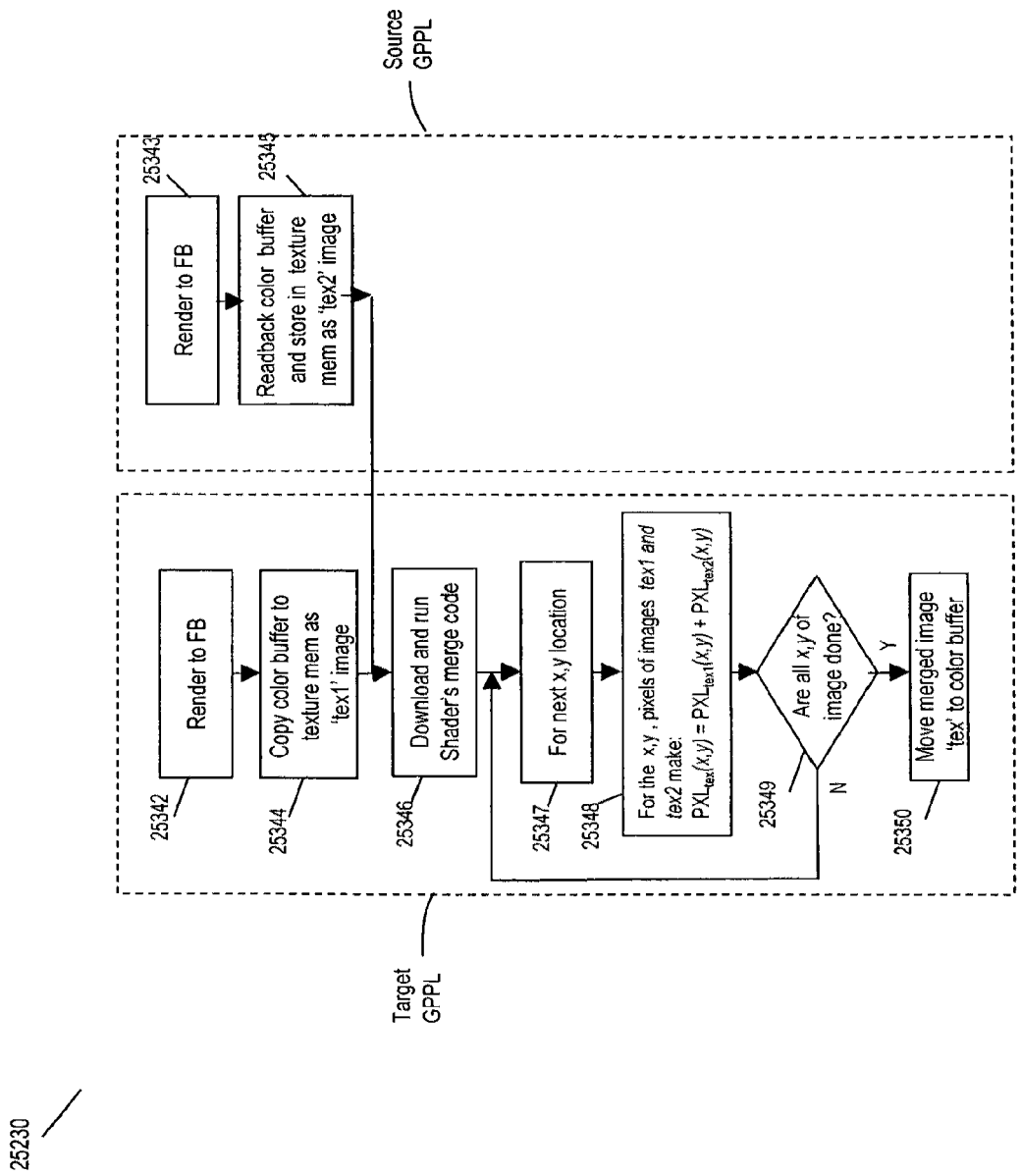
Fig. 2E3

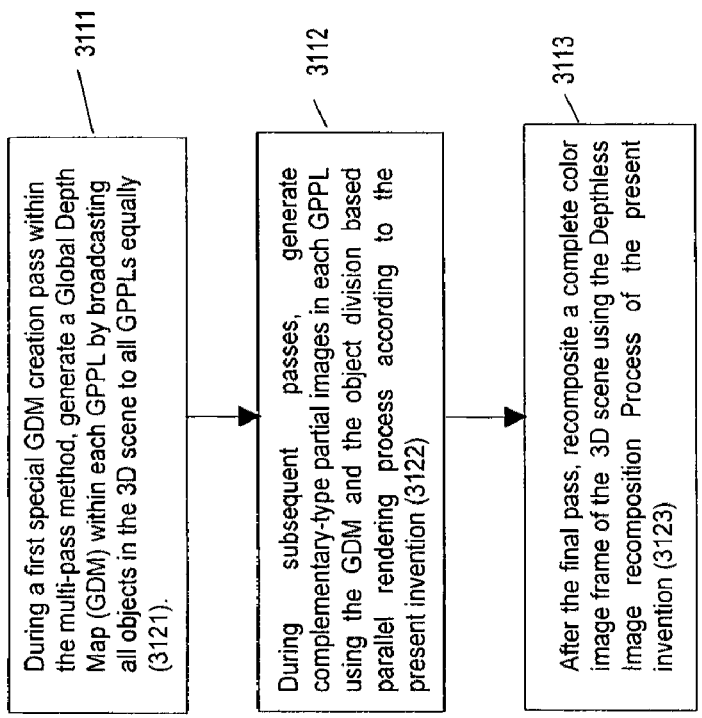

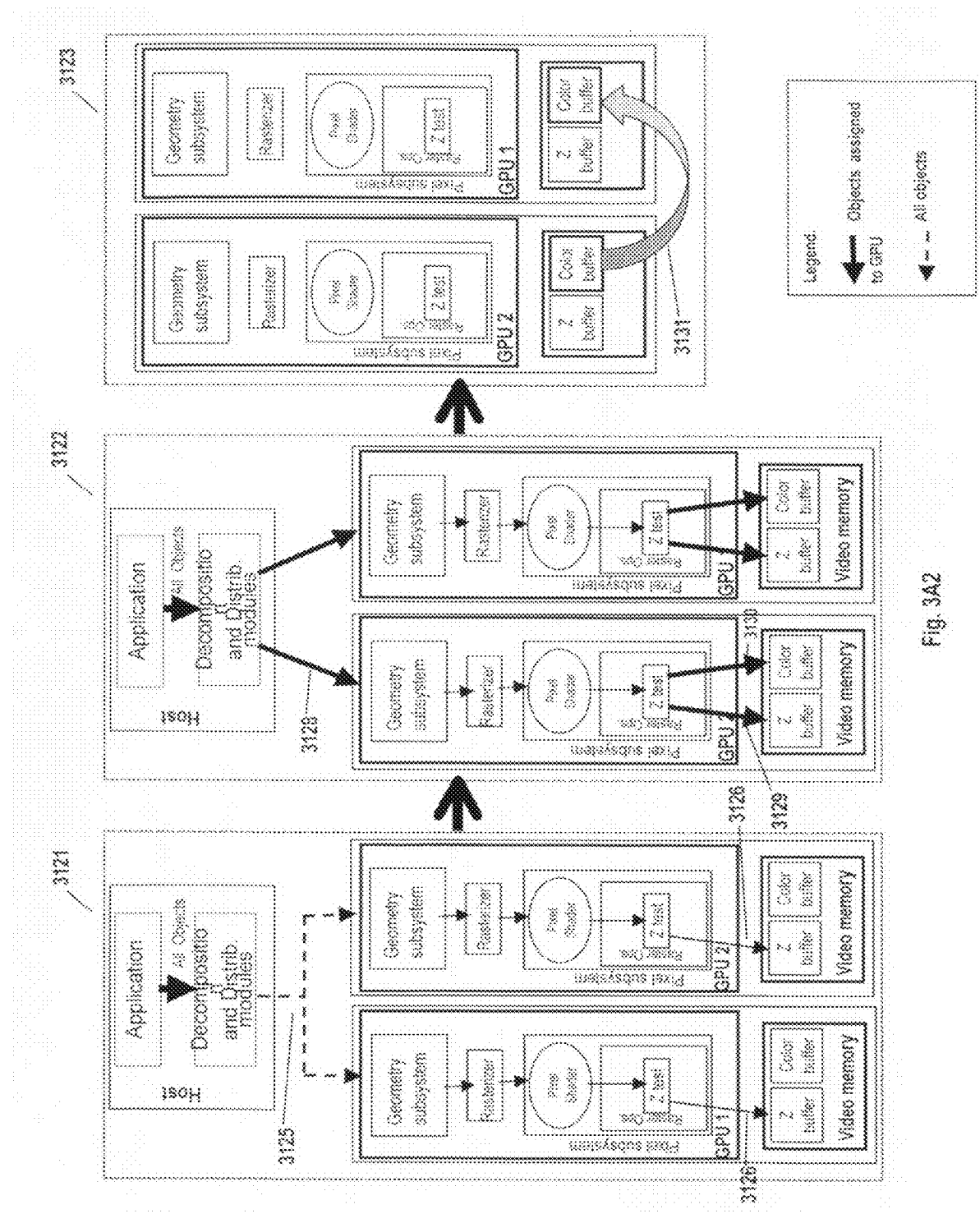
Fig. 3A2

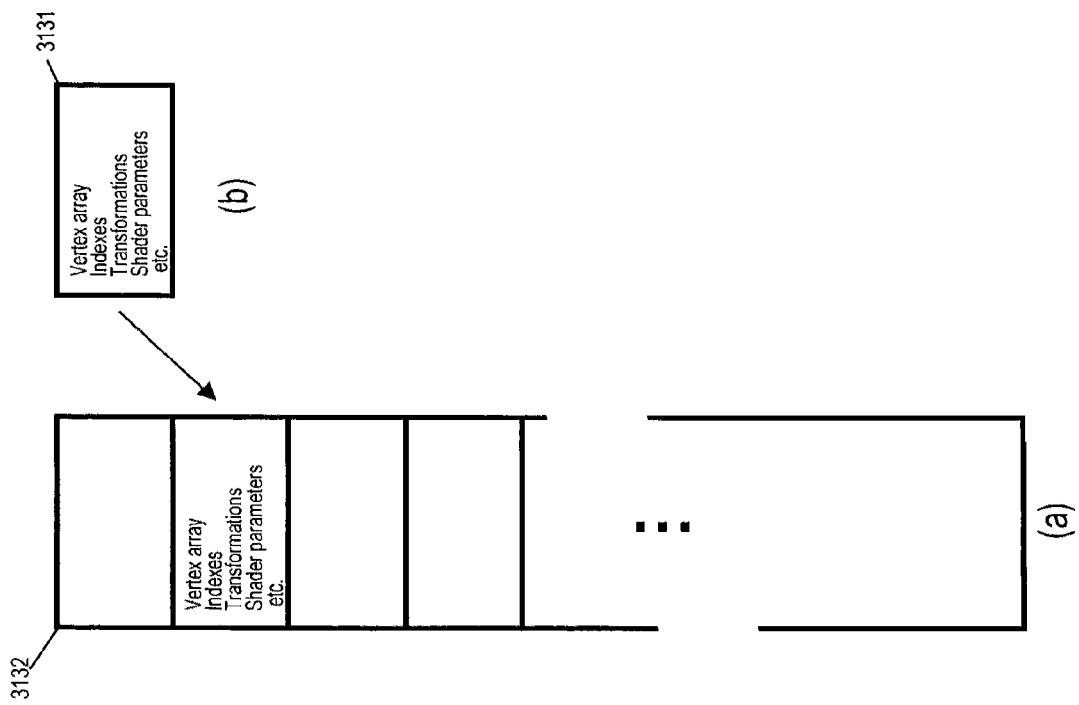
Fig. 3A3

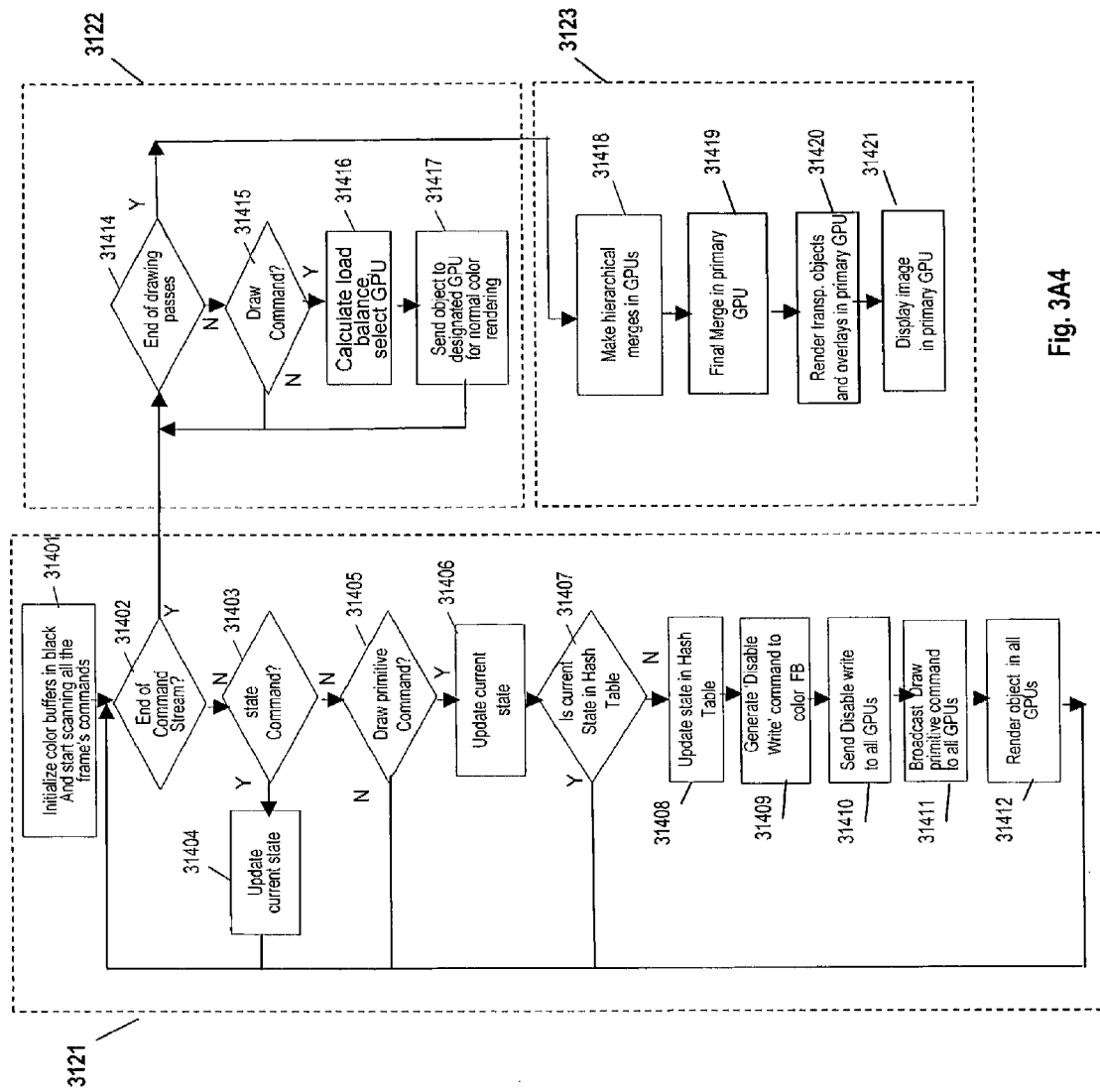
Fig. 3A4

Second Illustrative Embodiment of The Multi-Pass Parallel Graphics Processing Method of Present Invention
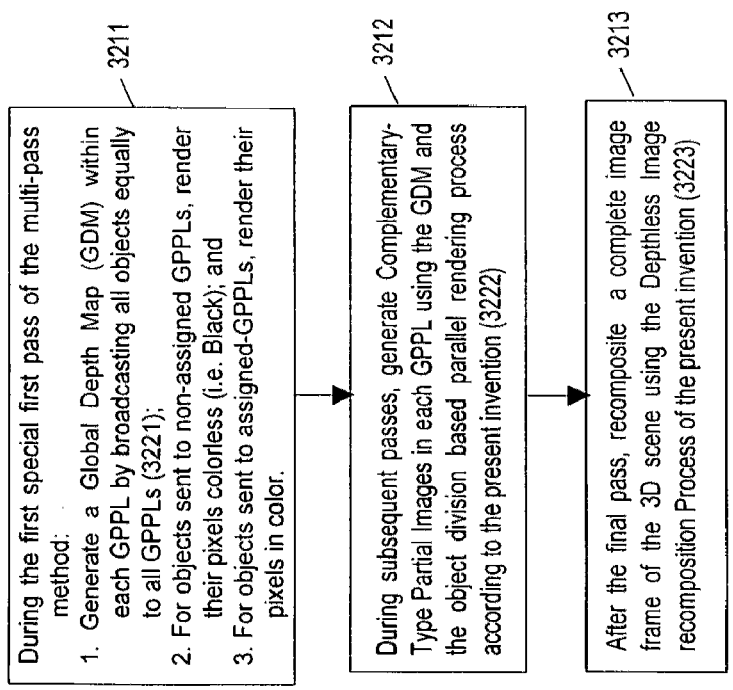
Fig. 3B1

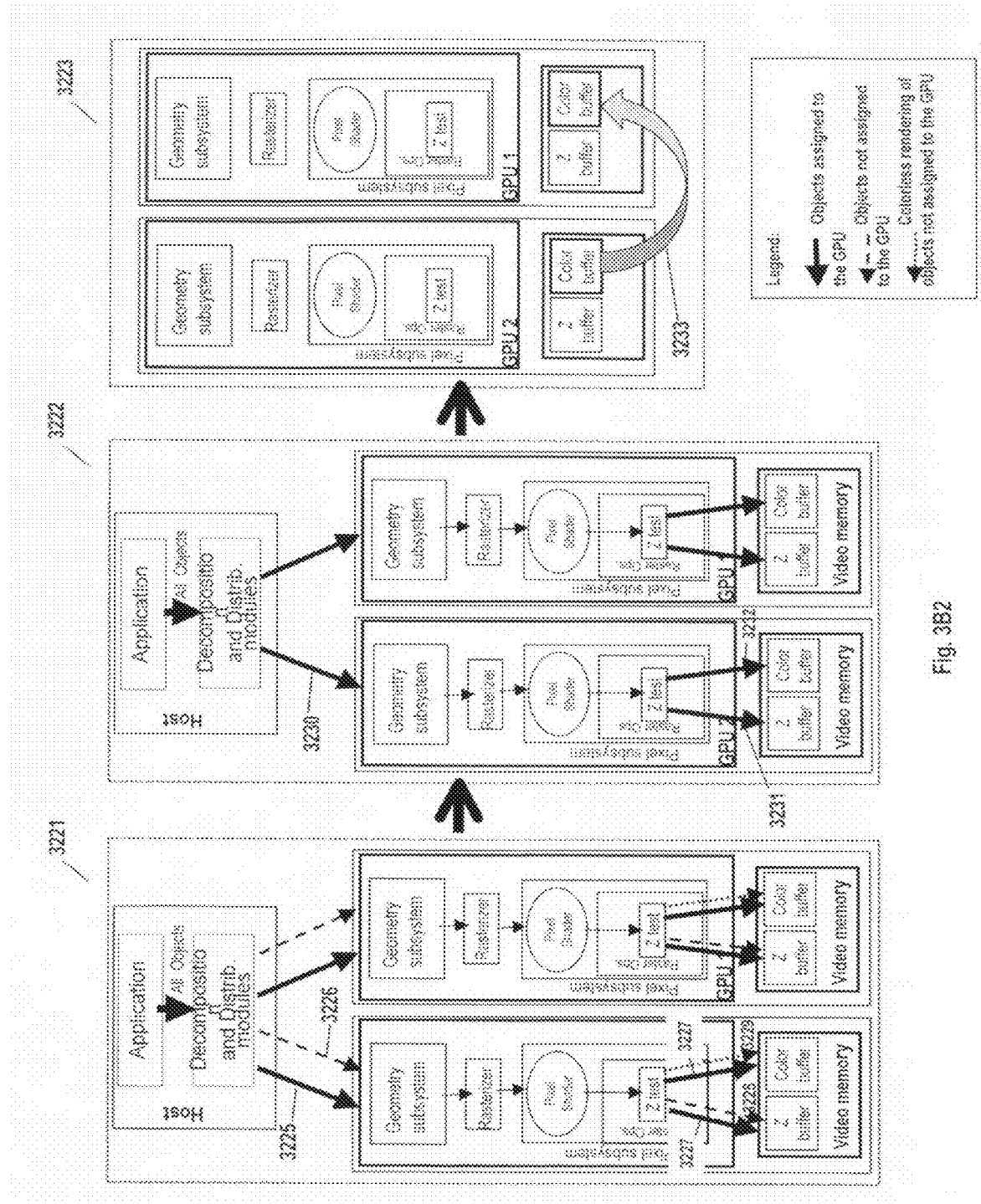
Fig. 3B2

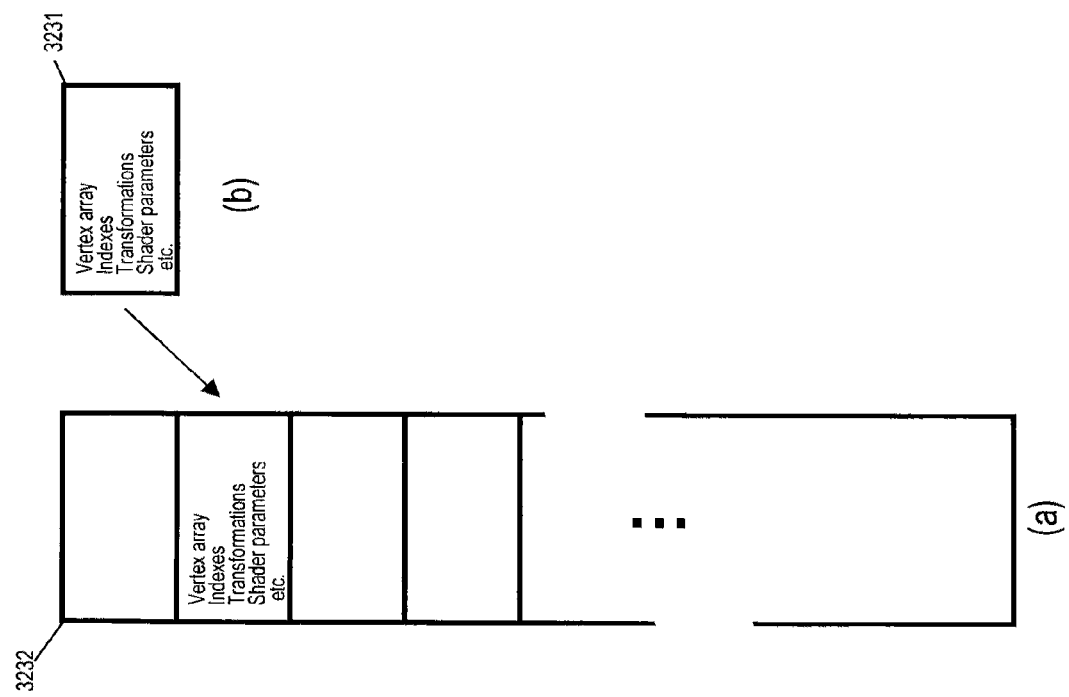
Fig. 3B3

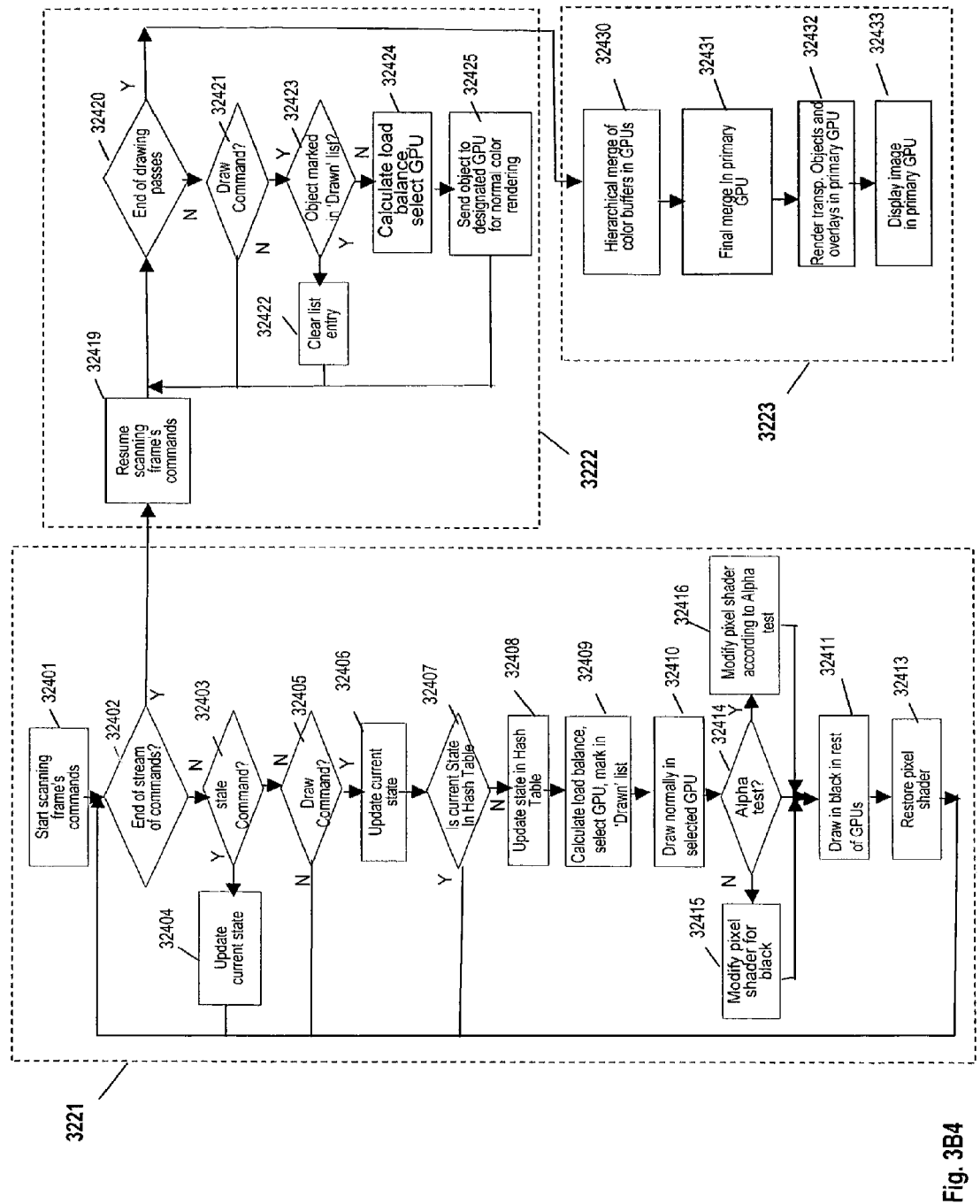
Fig. 3B4

Fourth Illustrative Embodiment of the Multi-Pass Parallel Graphics Processing Method of Present Invention

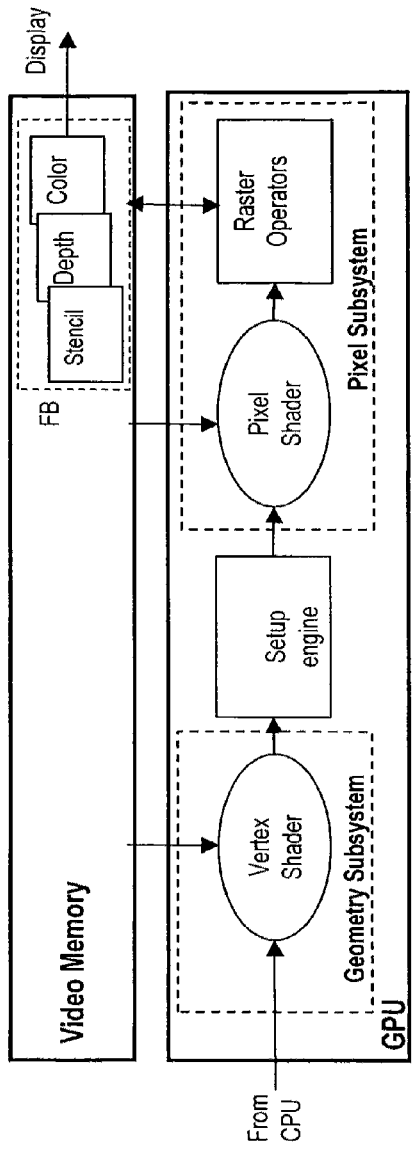
Fig6B1. GPU based GPPL (graphics processing pipeline). Classic GPU (e.g. GeForce 7700)
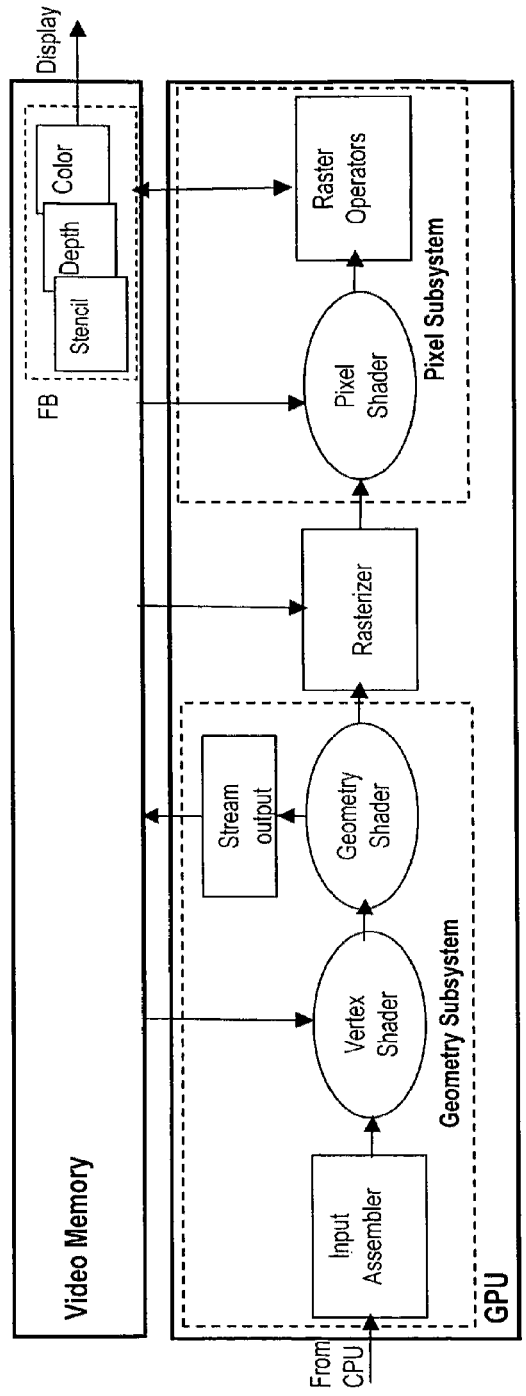
Fig. 6B2

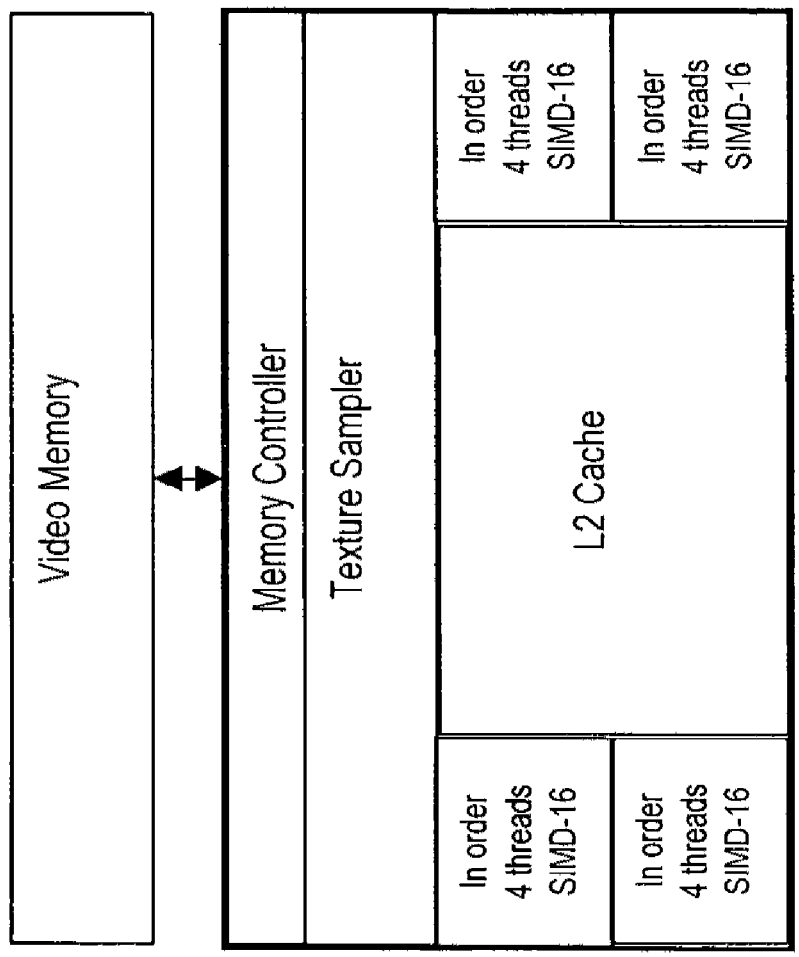
Fig. 6B3

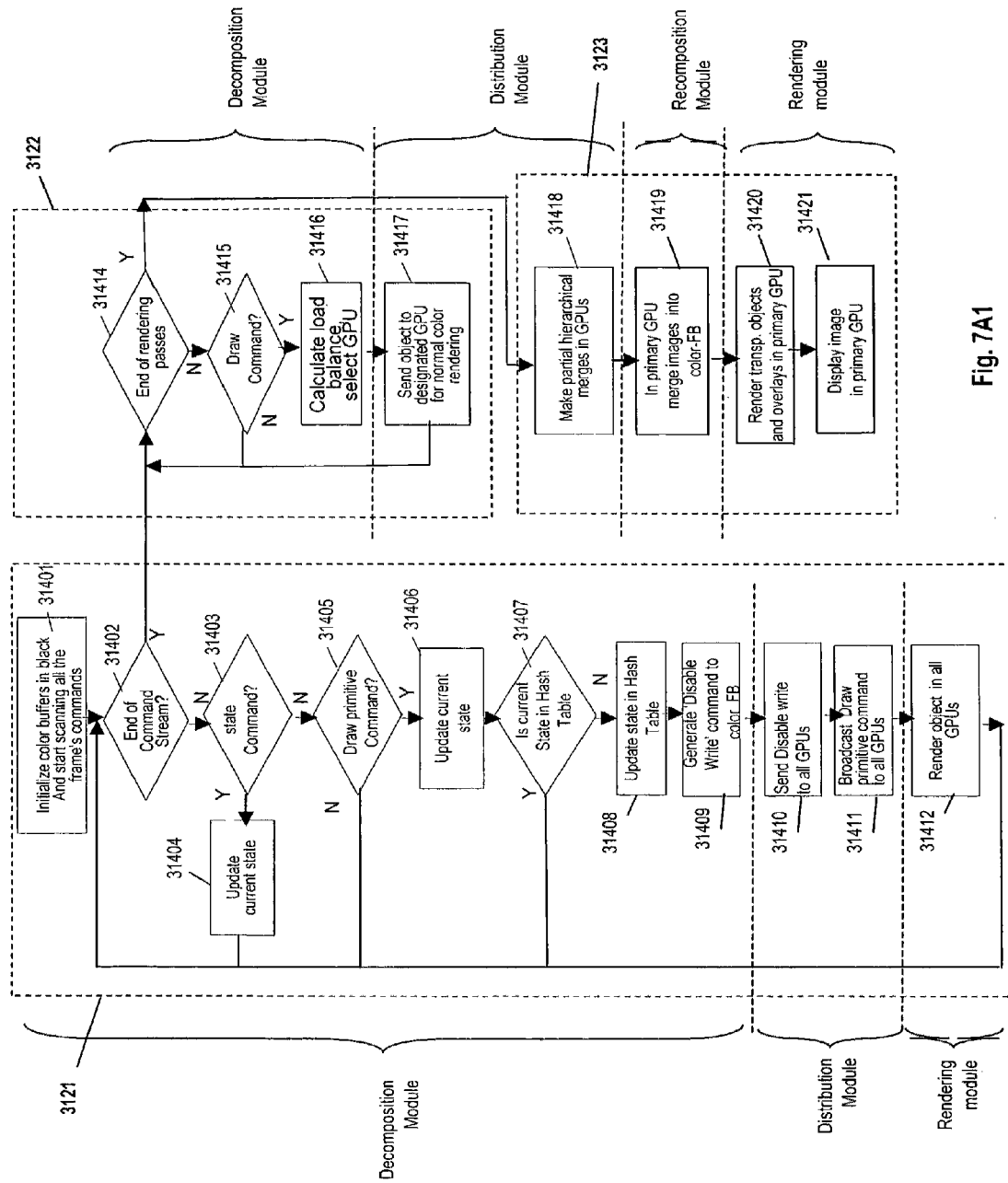
Fig. 7A1

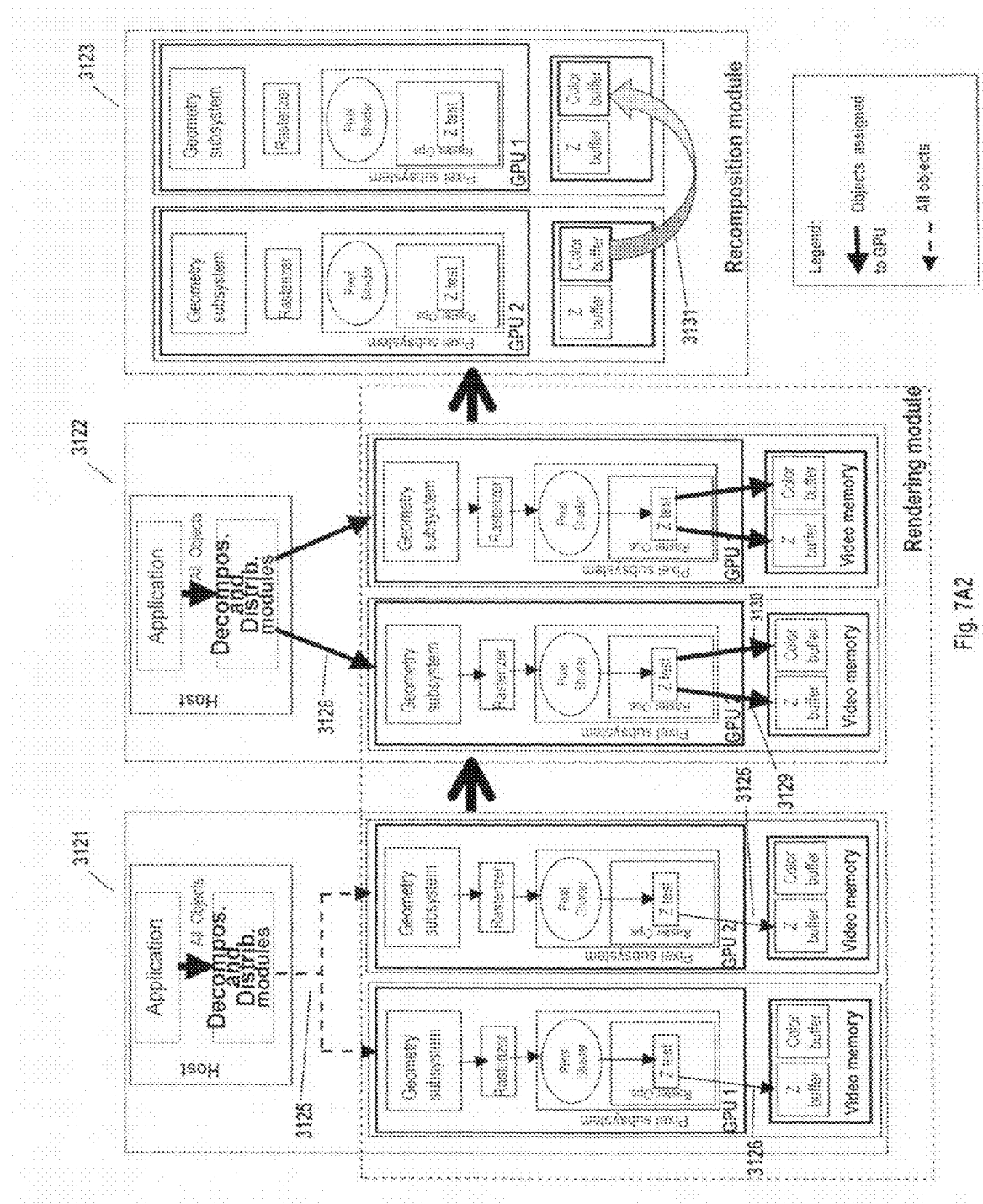
Fig. 7A2

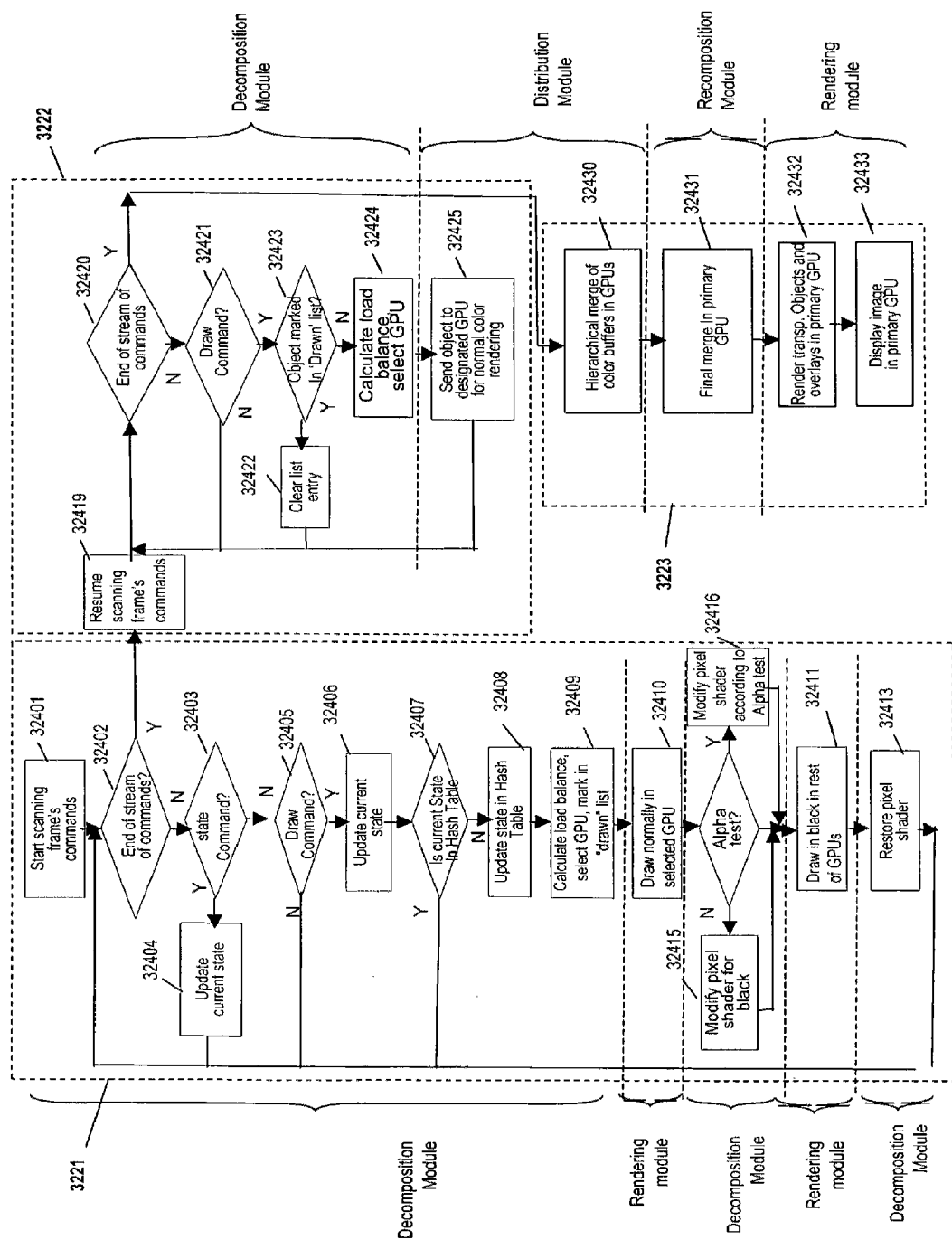
Fig. 7B1

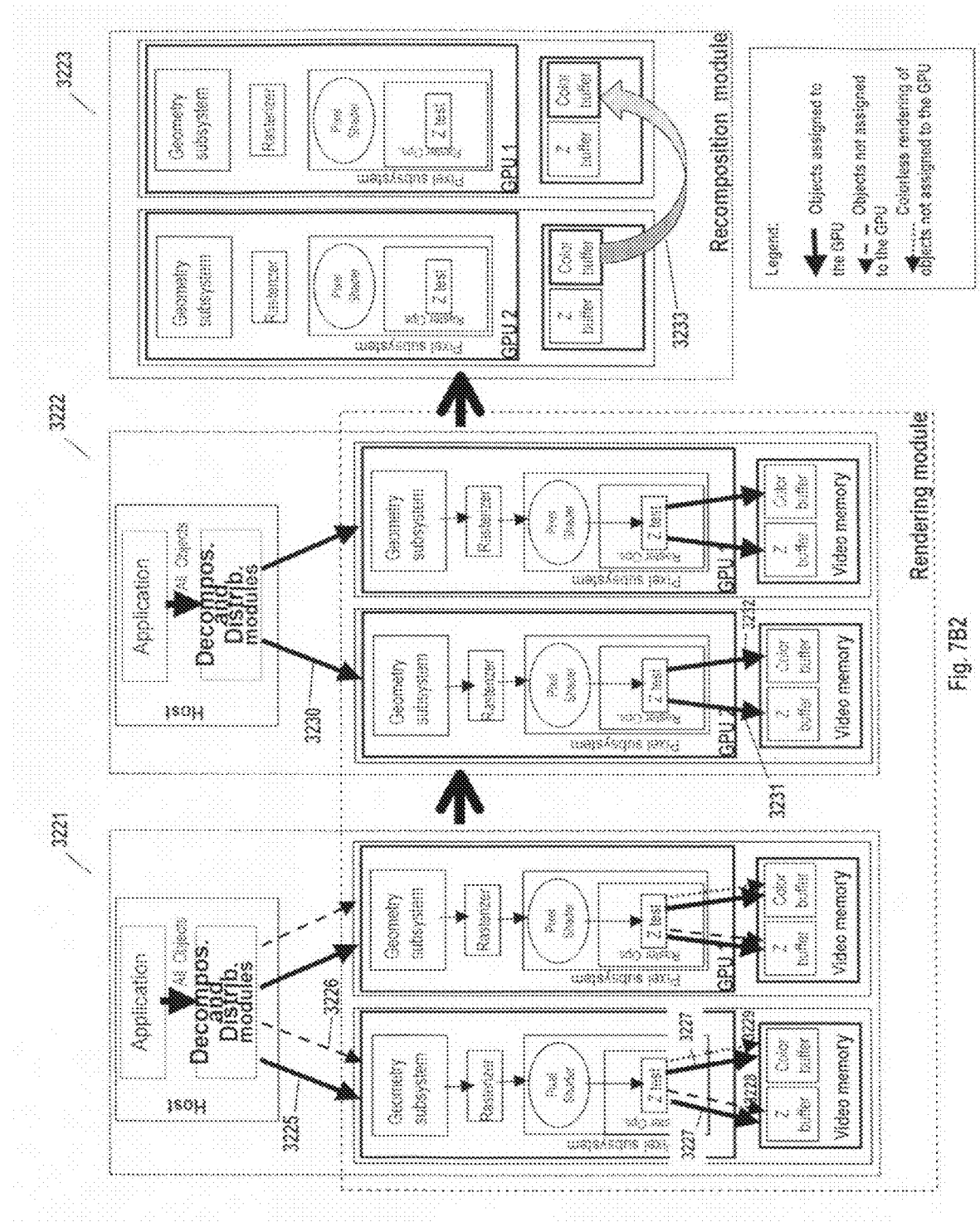
Fig. 7B2

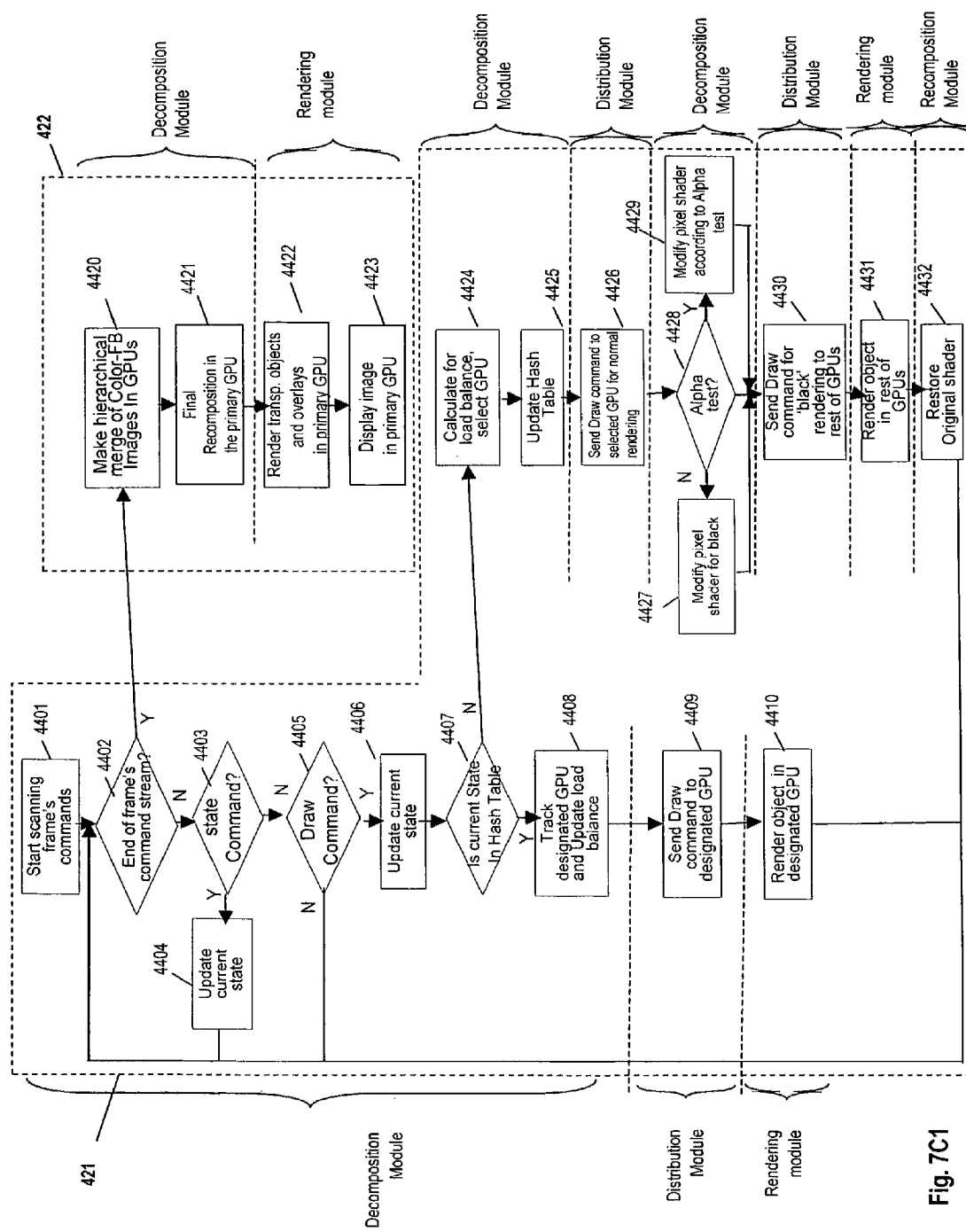
Fig. 7C1

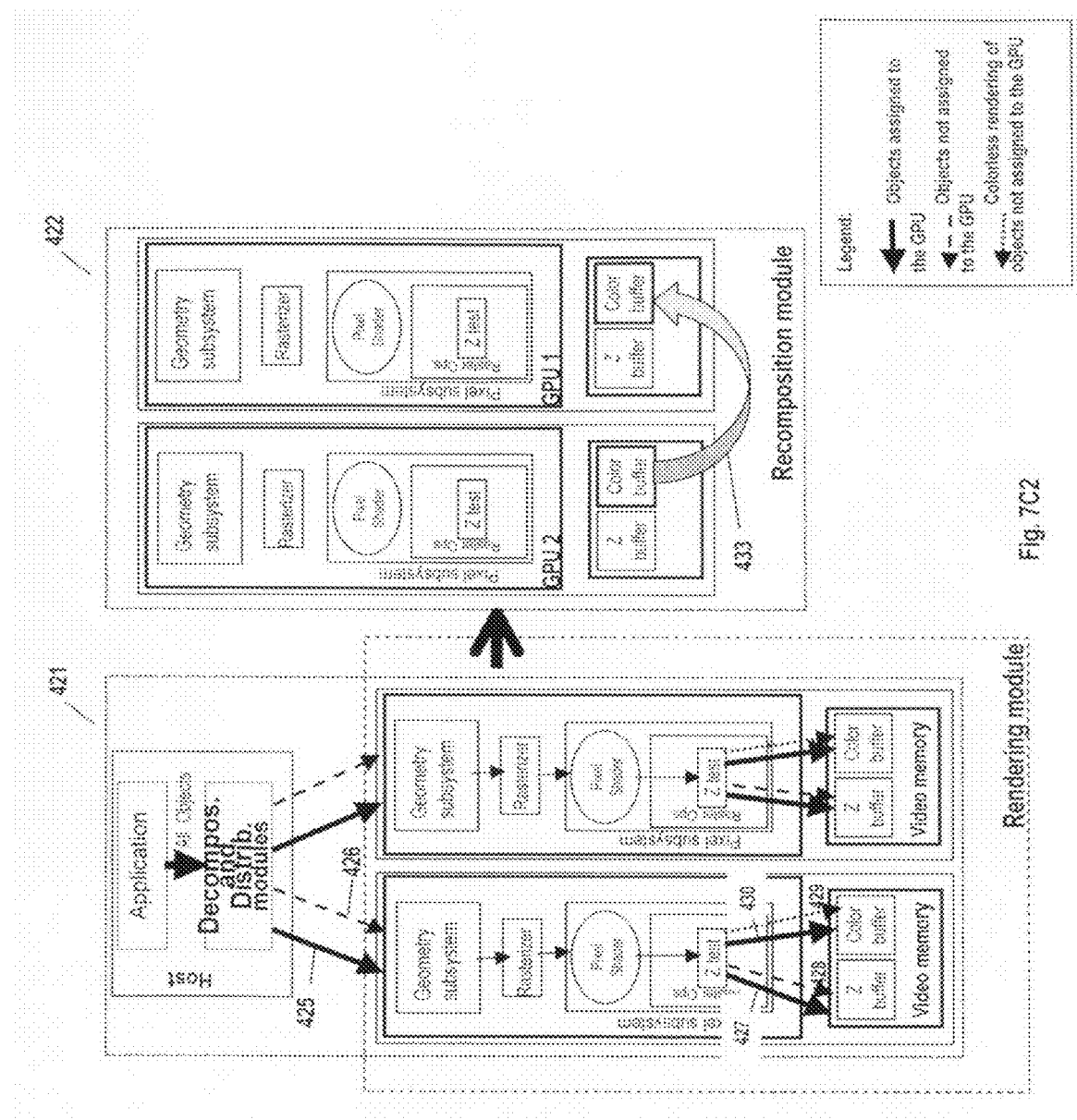
Fig. 7C2

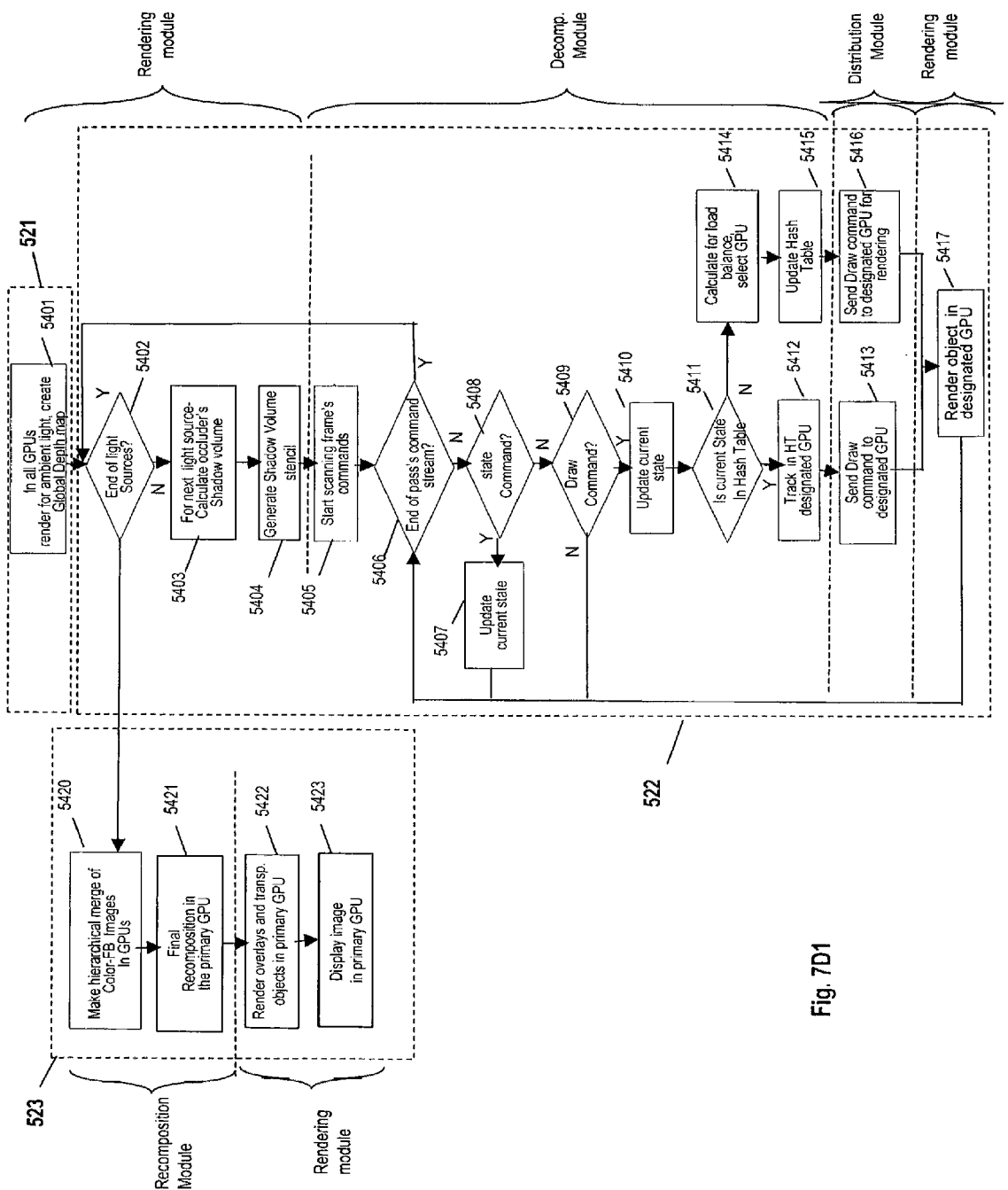
Fig. 7D1

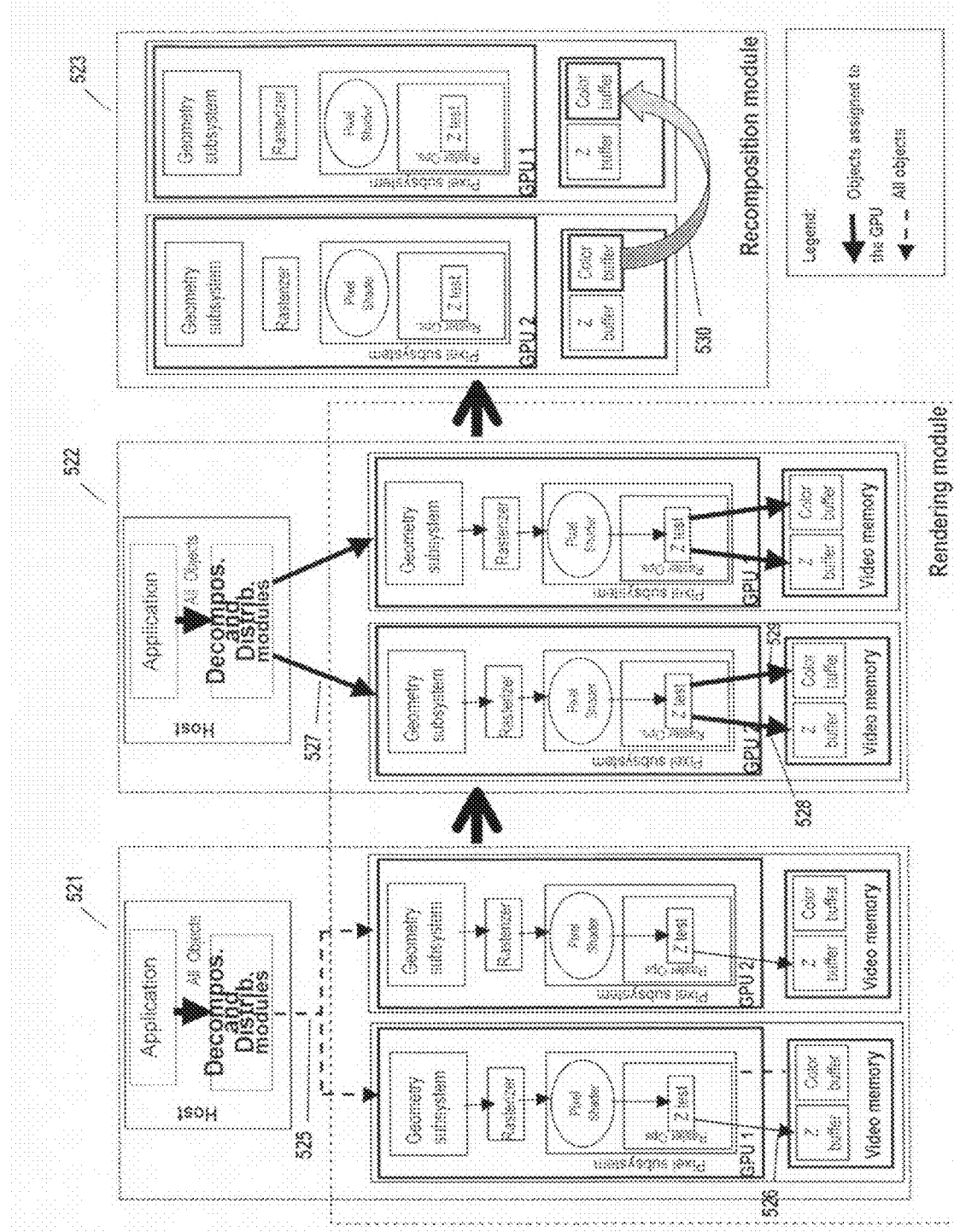
Fig. 7D2

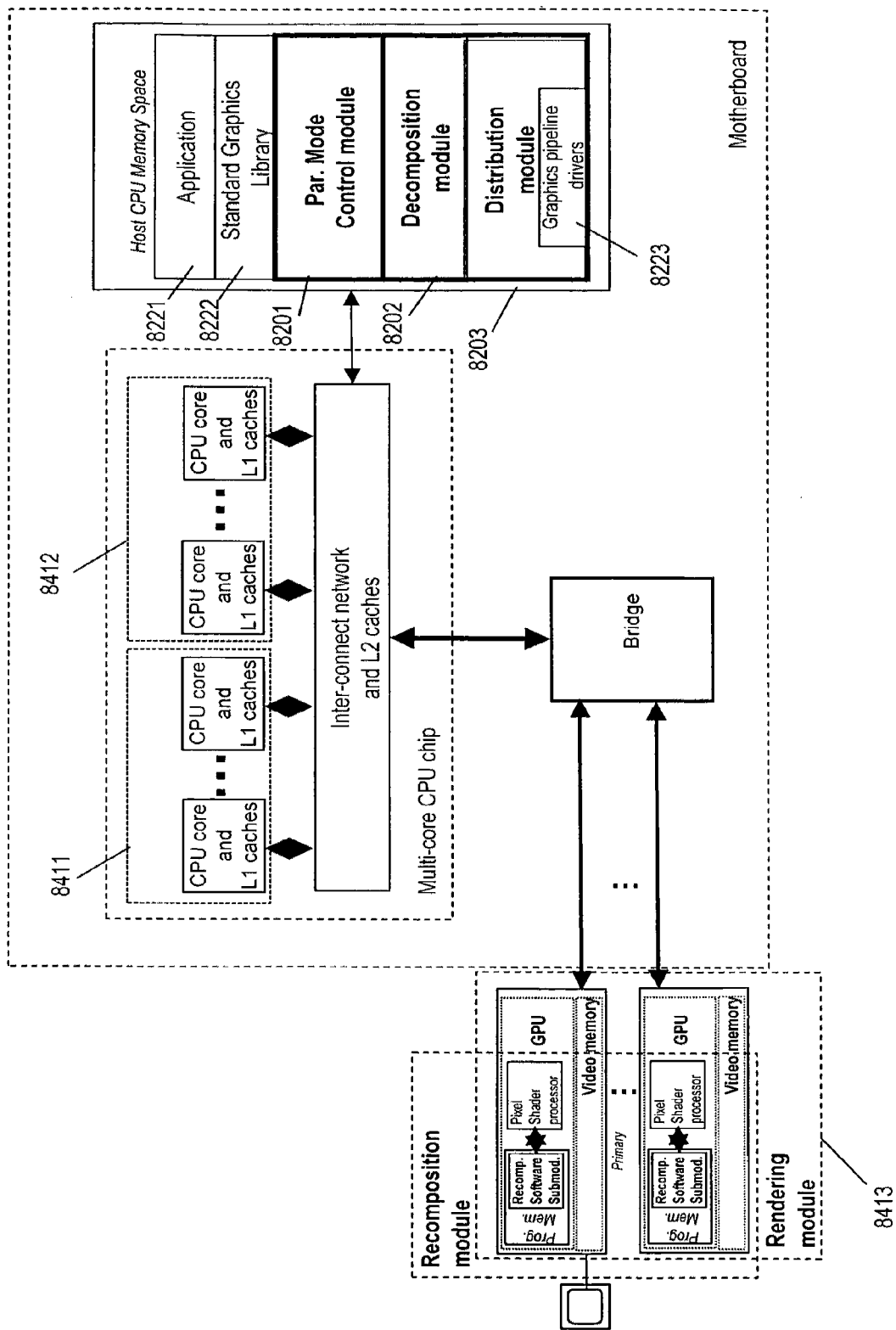
Fig. 8D1

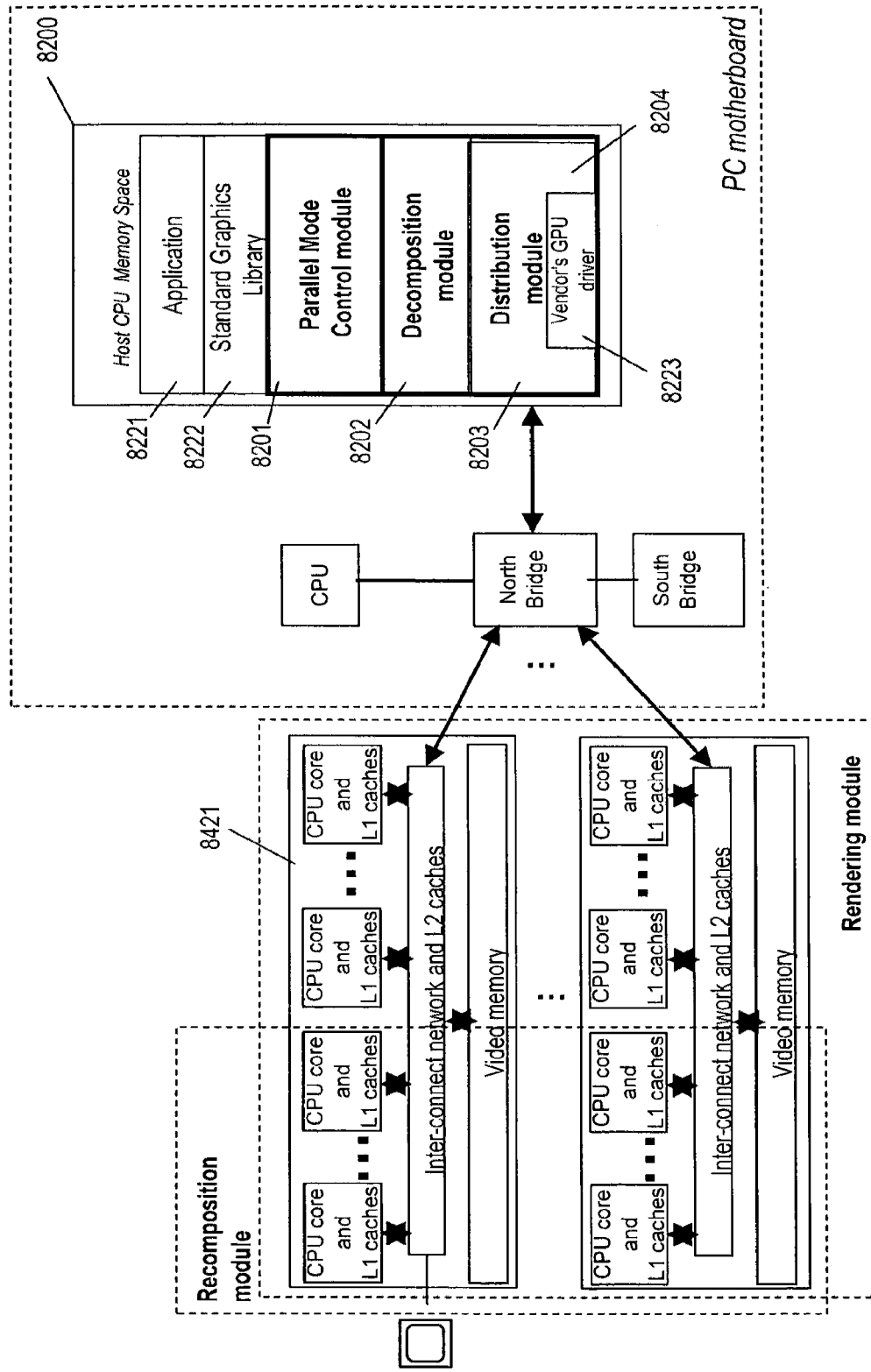
Fig. 8D2

METHOD OF GENERATING DIGITAL IMAGES OF OBJECTS IN 3D SCENES WHILE ELIMINATING OBJECT OVERDRAWING WITHIN THE MULTIPLE GRAPHICS PROCESSING PIPELINE (GPPLS) OF A PARALLEL GRAPHICS PROCESSING SYSTEM GENERATING PARTIAL COLOR-BASED COMPLEMENTARY-TYPE IMAGES ALONG THE VIEWING DIRECTION USING BLACK PIXEL RENDERING AND SUBSEQUENT RECOMPOSITING OPERATIONS

CROSS-REFERENCE TO RELATED CASES

The present Application is Continuation of U.S. application Ser. No. 12/077,072 filed Mar. 14, 2008; now abandoned which is a Continuation-in-Part (CIP) of the following Applications: U.S. application Ser. No. 11/897,536 filed Aug. 30, 2007; now U.S. Pat. No. 7,961,194 International Application Serial No. PCT/US 07/26466 filed Dec. 28, 2007; U.S. application Ser. No. 11/789,039 filed Apr. 23, 2007; now abandoned U.S. application Ser. No. 11/655,735 filed Jan. 18, 2007, now U.S. Pat. No. 8,085,273 International Application Serial No. PCT/IB07/03464 filed Jan. 18, 2007; which is based on Provisional Application Ser. No. 60/759,608 filed Jan. 18, 2006; U.S. application Ser. No. 11/648,160 filed Dec. 31, 2006; U.S. application Ser. No. 11/386,454 filed Mar. 22, 2006; now U.S. Pat. No. 7,834,880 U.S. application Ser. No. 11/340,402 filed Jan. 25, 2006; now U.S. Pat. No. 7,812,844 which is based on Provisional Application Ser. No. 60/647, 146 filed Jan. 25, 2005; International Application Serial No. PCT/IB06/01529 filed Jan. 25, 2006; U.S. application Ser. No. 10/579,682 filed Mar. 23, 2007, now U.S. Pat. No. 7,808, 499 which is a National Stage Entry of International Application Serial No. PCT/IL2004/001069 filed Nov. 19, 2004, which is based on Provisional Application Ser. No. 60/523, 084 filed Nov. 19, 2003; each said Patent Application being commonly owned by Lucid Information Technology, Ltd., and being incorporated herein by reference as if set forth fully herein.

BACKGROUND OF INVENTION

1. Field of Invention

The present invention relates generally to the field of 3D computer graphics rendering, and more particularly, to ways of and means for improving the performance of parallel graphics processes running on 3D parallel graphics processing systems supporting the decomposition of 3D scene objects among its multiple graphics processing pipelines (GPPLs).

2. Brief Description of the State of Knowledge in the Art

Applicants' U.S. application Ser. No. 11/897,536 filed Aug. 30, 2007, incorporated herein by reference, in its entirety, discloses diverse kinds of PC-level computing systems embodying different types of parallel graphics rendering subsystems (PGRSs) with graphics processing pipelines (GPPLs) generally illustrated in FIG. 1. The multi-pipeline architecture of such systems can be realized using GPU-based GPPLs of classical design, as shown in FIG. 2A, or alternatively, using more advanced GPU-based GPPLs, compliant with the DirectX 10 standard, as shown in FIG. 2C. Alternatively, the multi-pipeline architecture of such systems can be realized using multi-core CPU based GPPLs as shown in FIG. 2C.

In general, such graphics-based computing systems support multiple modes of graphics rendering parallelism across their GPPLs, including time, image and object division modes, which can be adaptively and dynamically switched into operation during the run-time of any graphics application running on the host computing system. While each mode of parallel operation has its advantages, as described in U.S. application Ser. No. 11/897,536 filed Aug. 30, 2007, supra, the object division mode of parallel operation is particularly helpful during the running of interactive gaming applications because this mode has the potential of resolving many bottleneck conflicts which naturally accompany such demanding applications.

During the object division mode of parallel operation, supported on a parallel graphics rendering system, for example, of the type disclosed in Applicant's U.S. application Ser. No. 11/897,536 filed Aug. 30, 2007, objects within a 3D scene (i.e. graphics data and commands representative thereof) are (i) automatically decomposed based on a specified criteria, and assigned/designated to particular GPUs, and (ii) distributed to the assigned/designated GPUs, so that the GPUs can render partial images of the 3D scene, based on the assigned/designated objects distributed thereto during parallel rendering operations, and ultimately, for these partial image fragments to be re-composited in a final color frame buffer (FB) of the primary GPPL, for display on one or more visual display devices.

During conventional image recomposition processes, supported on parallel graphics rendering platforms operating in the object-division mode of parallelism, the pixel depth or z values of objects's images within the 3D scene must be analyzed/compared, during each image frame, against (i) the pixel depth values of other objects' images (which may be occluding a particular object during rendering), as well as (ii) the rear or background clipping plane represented within the 3D scene. This depth-based image recomposition process is illustrated in FIGS. 1E1, 1E2 and 1E3, and illustrates how local depth maps of objects assigned to particular GPUs are constructed within each GPU, and are used during the recomposition of partial image fragments generated within the color frame buffer of each GPU during the final stage of the object-division (OD) based image recomposition process.

As shown in FIG. 1E1, in conventional prior art Object Division, shows a simple scene, comprising of three objects, A,B and C. An exemplary decomposition of this scene can be done by sending object A for rendering to GPU 1, and objects B and C to GPU 2. FIGS. 1E2 and 1E3 show the color and Z buffers created by prior art Object Division method. From the given View Point object B (of GPU 2) is obstructed by object A (of GPU 1). Both Z-buffers, of GPU 1 and GPU 2, create local depth maps, each map constructed from objects designated to the GPU. Each GPU is unaware of objects rendered by the other GPU, therefore such objects are not reflected in the Z-buffer of the GPU.

Clearly, use of the object-division mode of graphics parallelism has a number of important advantages over the other methods of parallel graphics rendering, for example: (i) responsiveness to user interface inputs; (ii) parallelization of the entire 3D graphics pipeline including the vertex as well as pixel parts thereof; (iii) the reduction of CPU-GPU transfer load; and (iv) the reduction of GPU memory requirements. However, the OD mode of graphics parallelism suffers from a number of inherent shortcomings and drawbacks.

In particular, the object-division mode of parallelism requires a complex and intensive process of merging a plurality of partial image fragments buffered in color frame buffers (FBs), utilizing depth-based information stored in the Z buffers of the GPUs, involving in depth-based comparisons on a pixel-by-pixel basis, resulting in substantial time delays, significant bandwidth consumption, and high hardware costs.

Also, objects being rendered at each GPU, that are obstructed by objects rendered by other GPUs, are processed for rendering (i.e. drawn) as if these objects were visible. Although these redundant portions are eliminated during the final image re-composition process, using depth-based comparisons, such redundant processing operations greatly decreases the efficiency of the object-division mode of parallelism.

When the anti-aliasing (AA) mode is operating during the object-division mode of parallelism, each GPU performs the correct anti-aliasing of its image fragments. However, some objects that are anti-aliased with their current background will become extrinsic to their new background when composed into the final image.

In many graphics applications, there are different lighting sources, and multi-pass applications must render the same scene geometry several times (i.e. passes), typically for different lighting calculations. Thus, the final color of a pixel of an object will be determined by blending together the results of all of the partial rendering passes. When using the object-division mode of parallelism, this multi-pass rendering increases the complexity of the image re-composition process due to the additional dependency on the stencil buffer, which operates on top of the Z buffer within each GPU.

In view, therefore of the above, there is a great need in the art for an improved method of and apparatus for carrying out parallel 3D graphics processing, while avoiding the shortcomings and drawbacks of the prior art apparatus and methodologies.

OBJECTS AND SUMMARY OF THE PRESENT INVENTION

Accordingly, a primary object of the present invention is to provide a new and improved method of and apparatus for practicing parallel 3D graphics processes in modern multiple-GPU based computer graphics systems, based on the division of objects in 3D scenes, among multiple graphics processing pipelines (GPPLs), while avoiding the shortcomings and drawbacks associated with prior art apparatus and methodologies.

Another object of the present invention is to provide a novel parallel graphics processing system (PGPS) embodied within a host computing system having (i) host memory space (HMS) for storing one or more graphics-based applications and a graphics library for generating graphics commands and data (GCAD) during the run-time (i.e. execution) of the graphics-based application, (ii) one or more CPUs for executing said graphics-based applications, and (iii) a display device for displaying images containing graphics during the execution of said graphics-based applications.

Another object of the present invention is to provide improved PC-level computing systems and architectures employing the parallel graphics processing technique of the present invention.

Another object of the present invention is to provide a parallel graphics processing subsystem supporting object division based parallelism among its GPPLs (e.g. GPU-based GPPLs), and performing pixel depth value comparison within each GPU using a common global depth map (GDM) during the pixel rendering process, in contrast to conventional approaches involving the use of Z-buffer comparisons during the final phase of image recomposition.

Another object of the present invention is to provide a novel method of parallel graphics processing based on object division parallelism among a plurality of GPPLs, and employing a global depth map (GDM), created by the graphics application, for use in z-depth tests during the pixel rendering process, and eliminating the shortcoming of z-buffer comparisons of all GPUs in regular object division.

Another object of the present invention is to provide a method of recompositing partial complementary-type images within multiple GPPLs.

Another object of the present invention is to provide a method of generating partial complementary-type images within multiple GPPLs.

Another object of the present invention is to provide a method of generating global depth maps (GDMs) within multiple GPPLs.

Another object of the present invention is to provide a method of generating global depth maps (GDMs) within multiple GPPLs using GDMs created during a first GDM pass of a multi-pass parallel graphics processing method.

Another object of the present invention is to provide a method of generating global depth maps (GDMs) within multiple GPPLs during a color-based pixel rendering process.

Another object of the present invention is to provide a method of providing global depth maps (GDMs) within multiple GPPLs, generated during a graphics application.

Another object of the present invention is to provide a method of generating images using a depthless image recomposition process within multiple GPPLs.

Another object of the present invention is to provide a novel Z-buffering mechanism for use in compositing a 3D scene in a 3D parallel graphics rendering system, comprising a (color) frame buffer (memory) having a color value for each pixel and a z-buffer with the same number of entries is provided for storing a z-value for each pixel in the frame buffer; and wherein the z-buffer is initialized to zero, representing the z-value at the back clipping plane of the 3D scene, wherein the frame buffer is initialized to the background color, and wherein the largest value that can be stored in the z-buffer represents the z value of the front clipping plane.

Another object of the present invention is to provide such a novel Z-buffering mechanism wherein polygons compositing the 3D scene are scan converted into the frame buffer in an arbitrary order, and wherein during the scan-conversion process, if the polygon being scan converted at point (x,y) is no farther from the viewer than the point whose color and depth are currently in the buffers, then the color and depth values of the new point is used to replace the old color and depth values stored at the point (x,y).

Another object of the present invention is to provide a 3D parallel graphics rendering system which creates a global depth map (GDM) within each GPU in cases where such a global depth map is not provided by the graphics application, for use as a depth reference during Z-tests conducted throughout the graphics application, thereby eliminating object overdrawing and other shortcomings and drawbacks associated with conventional object division based parallel graphics rendering processes.

Another object of the present invention is to provide a 3D parallel graphics rendering system which creates and uses a global depth map (GDM) within each GPU, for the purpose of testing the z-depth values of all objects in the 3D scene, thereby eliminating the shortcomings and drawbacks associated with using z-buffer comparisons from all GPUs, as performed in prior art object division based pixel rendering processes.

Another object of the present invention is to provide a 3D parallel graphics rendering system which supports object division based parallelism among the GPPLs while providing an anti-aliasing process that is substantially free from the artifacts generated when using prior art object division based pixel rendering processes.

Another object of the present invention is to utilize a Global Depth Map created by the application, e.g. during a special Ambient Light Pass, for Z-test reference, enabling Depthless Image Recomposition Process.

Another object of the present invention is to provide a method of generating complementary-type partial images in each GPPL using the GDM and the object division based parallel rendering process.

Another object of the present invention is to provide a depthless image recomposition process for object division parallelism, creating a complete image frame of 3D scene, eliminating the need of comparing depth values of all GPUs as part of compositing process.

Another object of present invention is to provide an improved object division method free of anti-aliasing artifacts, in contrast to prior art object division method.

Another object of present invention is to create an improved object division method free of overdrawing effect, greatly increasing the efficiency of prior art object division parallelism.

These and other objects of the present invention will become apparent hereinafter and in the claims to invention.

BRIEF DESCRIPTION OF DRAWINGS OF PRESENT INVENTION

For a more complete understanding of how to practice the Objects of the Present Invention, the following Detailed Description of the Illustrative Embodiments can be read in conjunction with the accompanying Drawings, briefly described below:

Figure 1A:
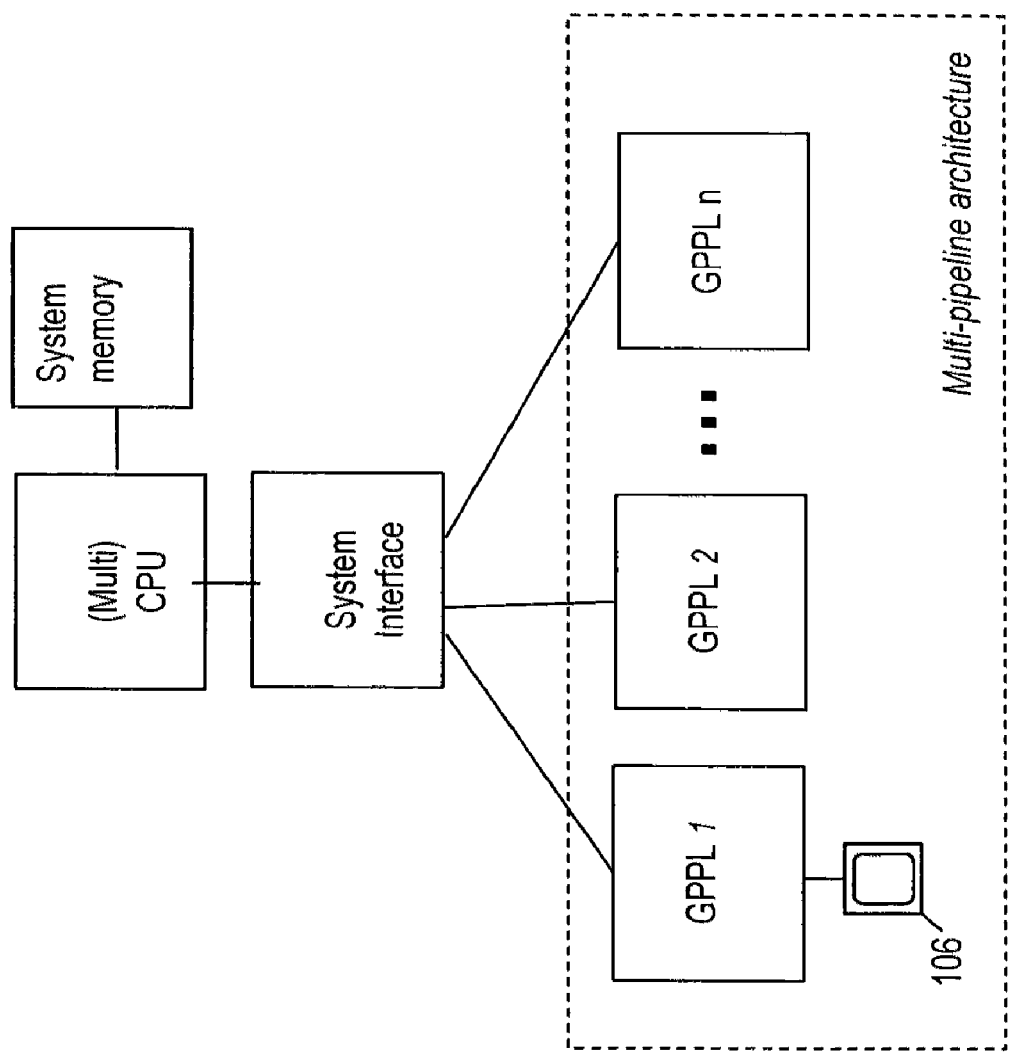
FIG. 1A is a graphical representation of a PC-level based multi-GPPL parallel graphics rendering platform of the type disclosed in Applicants' U.S. application Ser. No. 11/897,536 filed Aug. 30, 2007, showing multi-CPUs, system memory, a system interface, and a plurality of GPPLs, with a display interface driving one or more graphics display screens.
Figure 1B:
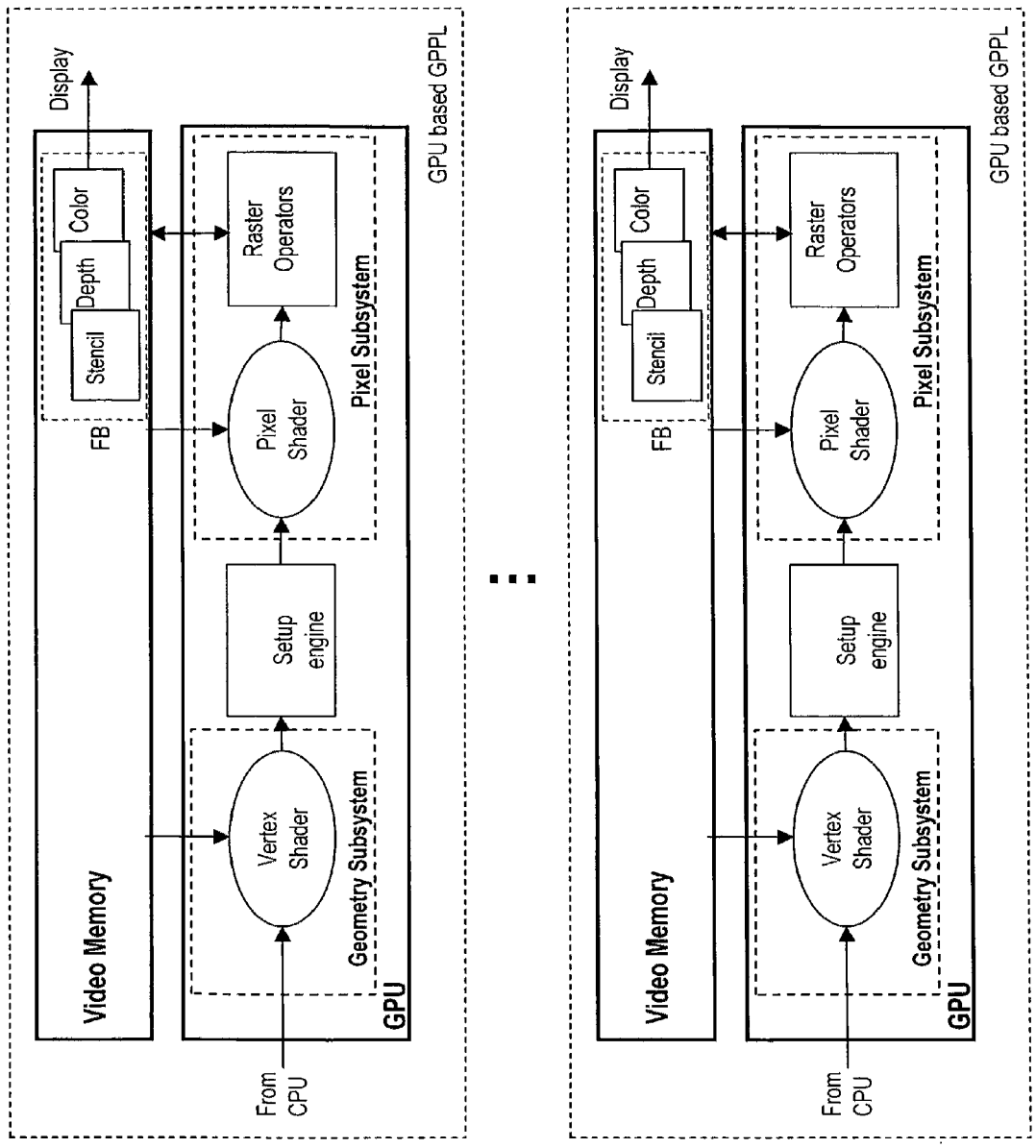
FIG. 1B is a schematic representation of a plurality of GPU-based graphics processing pipelines (GPPLs), such as in nVidia's GeForce 7700 graphics subsystem, that can be employed in the multi-GPPL graphics rendering platform of FIG. 1A.
Figure 1C:
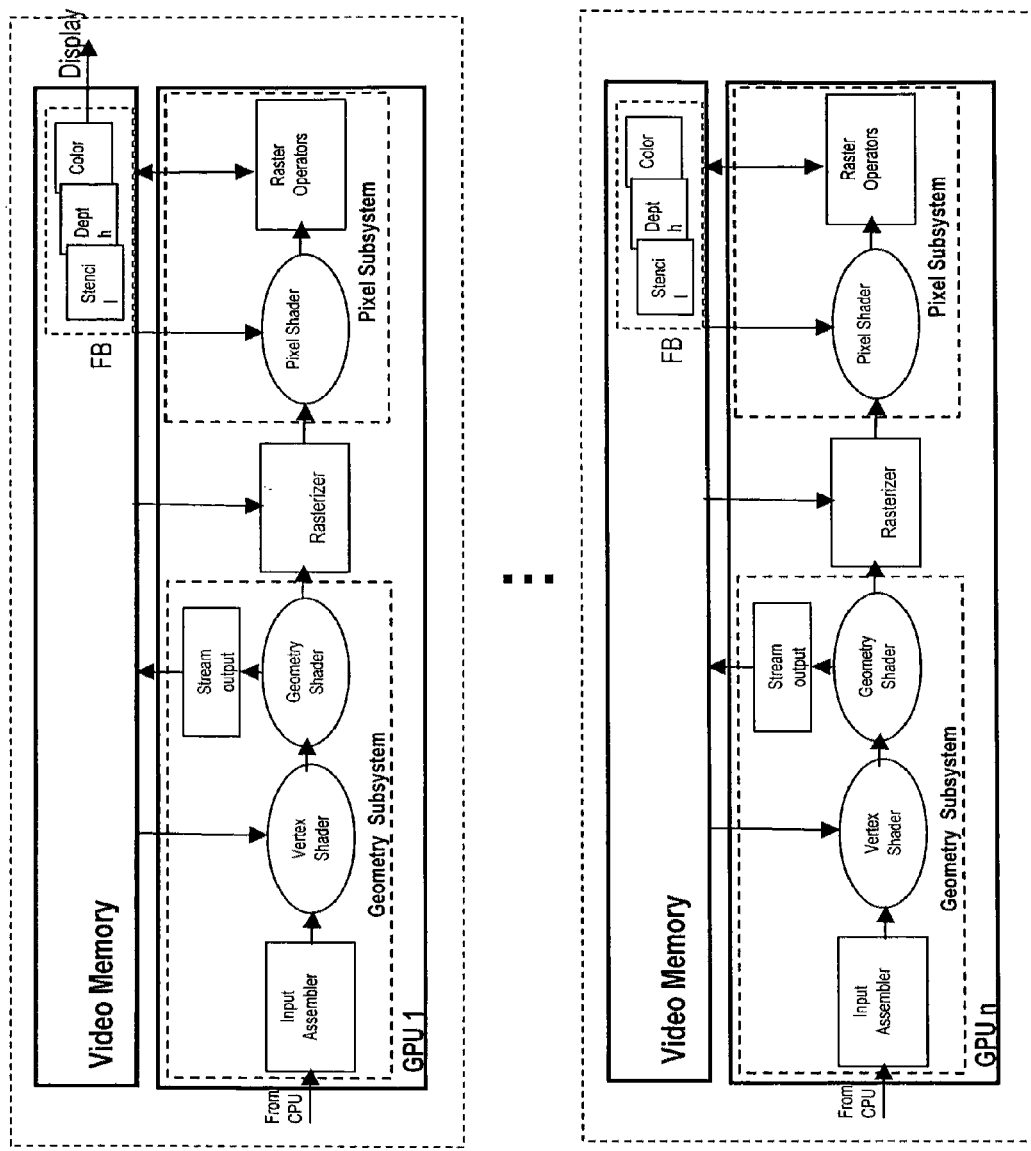
FIG. 1C is a schematic representation of a plurality of advanced GPU-based graphics processing pipelines (GPPLs), such as in nVidia's GeForce 8800 GTX graphics subsystem, that can be employed in the multi-GPPL graphics rendering platform of FIG. 1A.
Figure 1D:
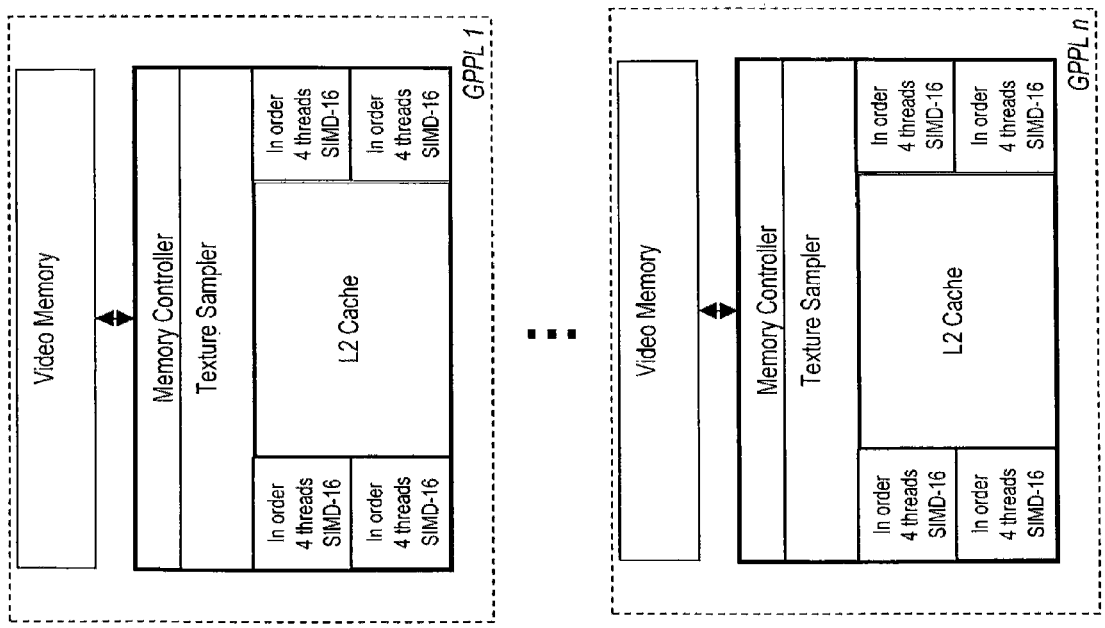
FIG. 1D is a schematic representation of a plurality of multicore-based graphics processing pipelines (GPPLs) that can be employed in the multi-GPPL graphics rendering platform of FIG. 1A.
Figure 2A:
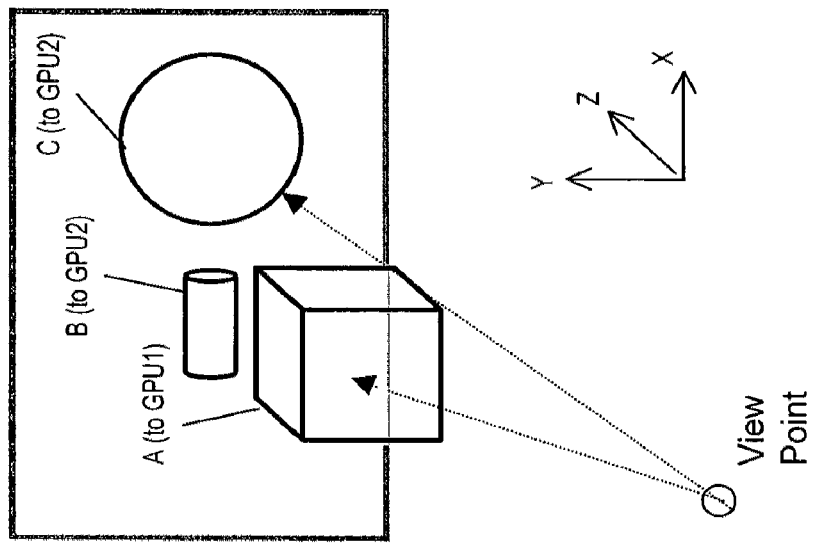
Figure 2B:
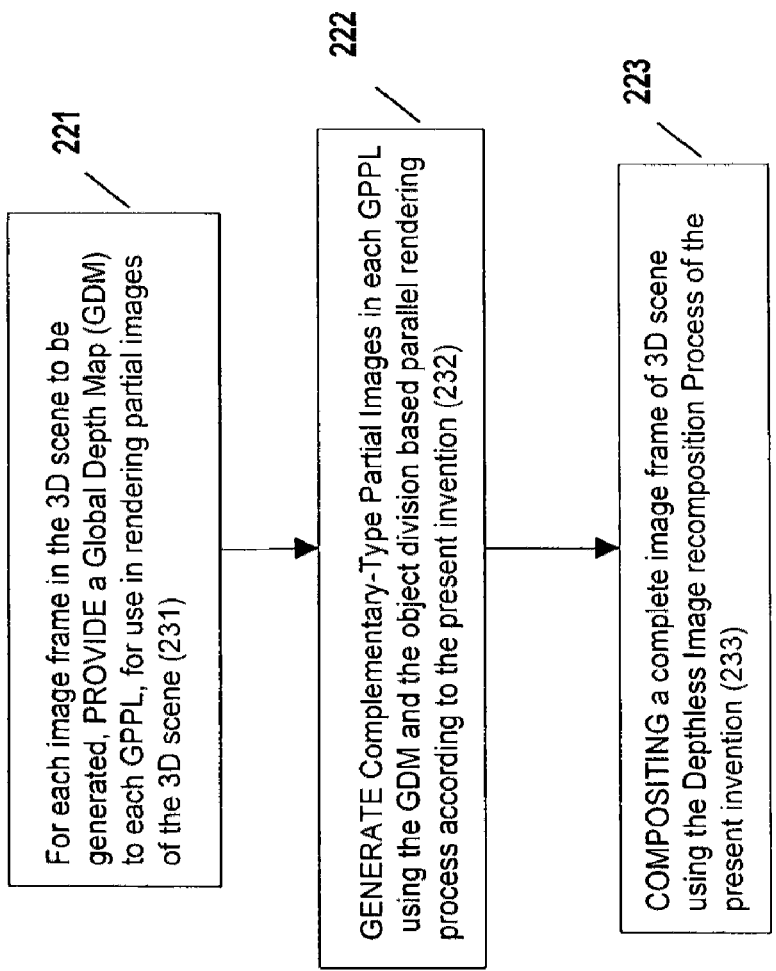
Figure 2C:
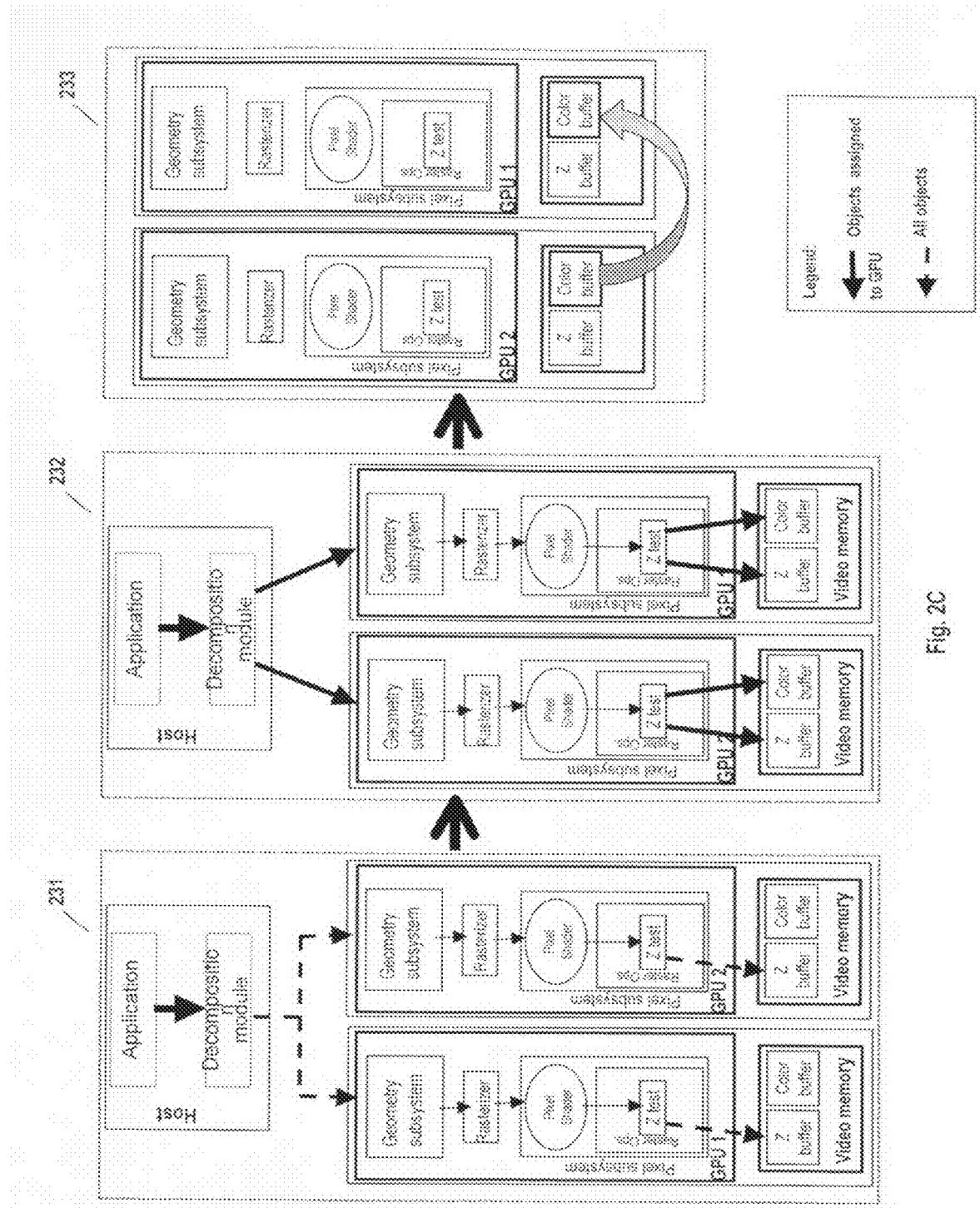
Figure 4A:
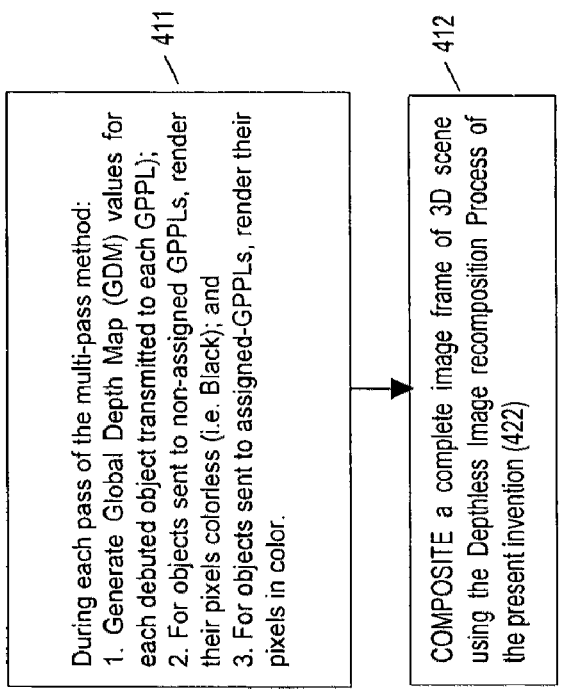
Figure 4B:
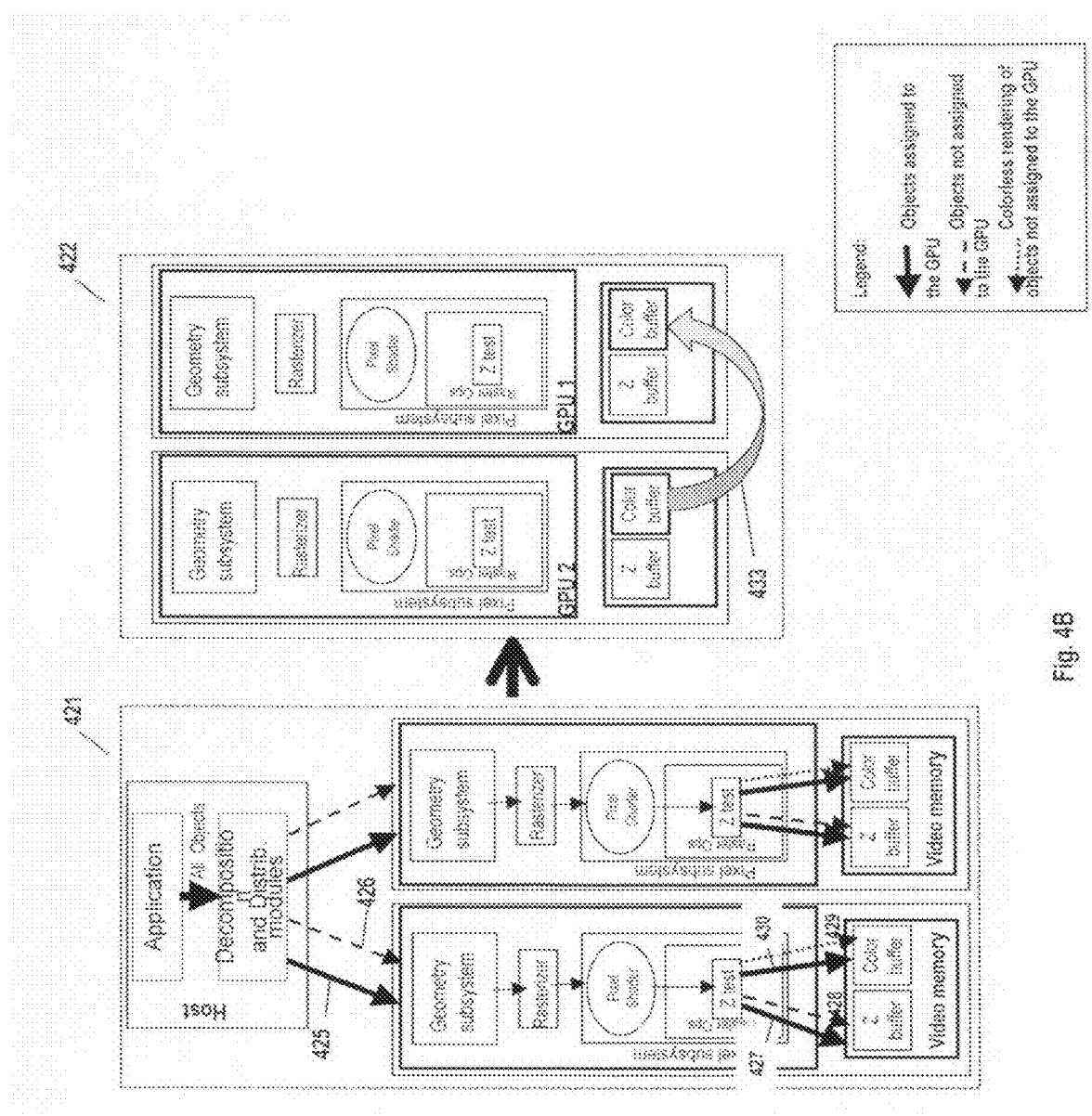
Figure 4C:
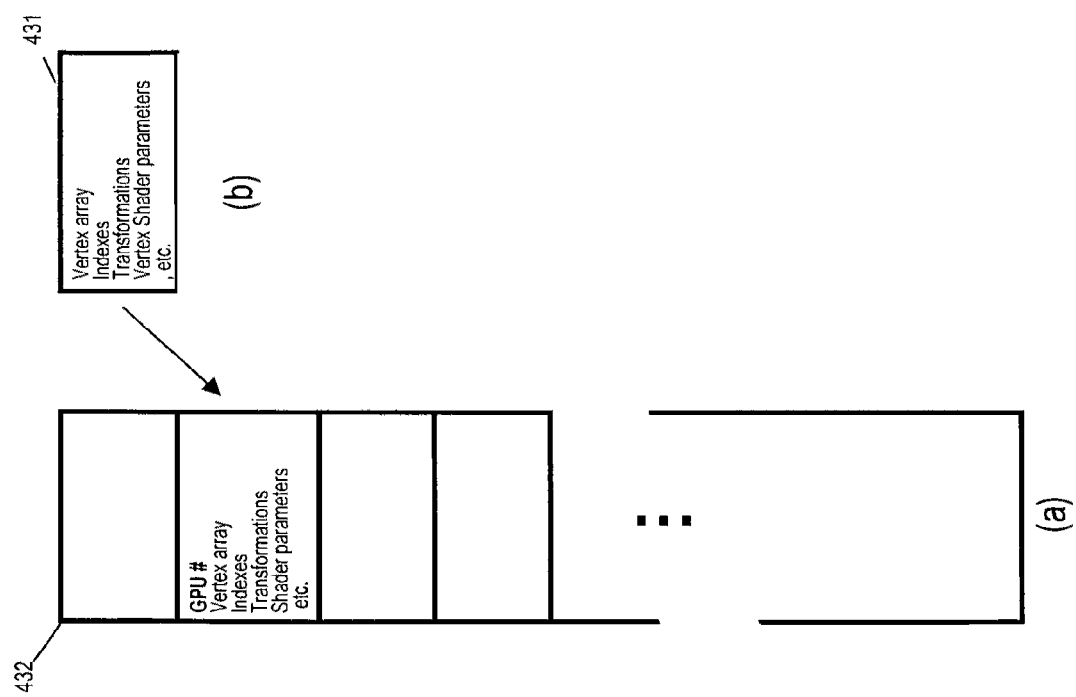
Figure 4D:
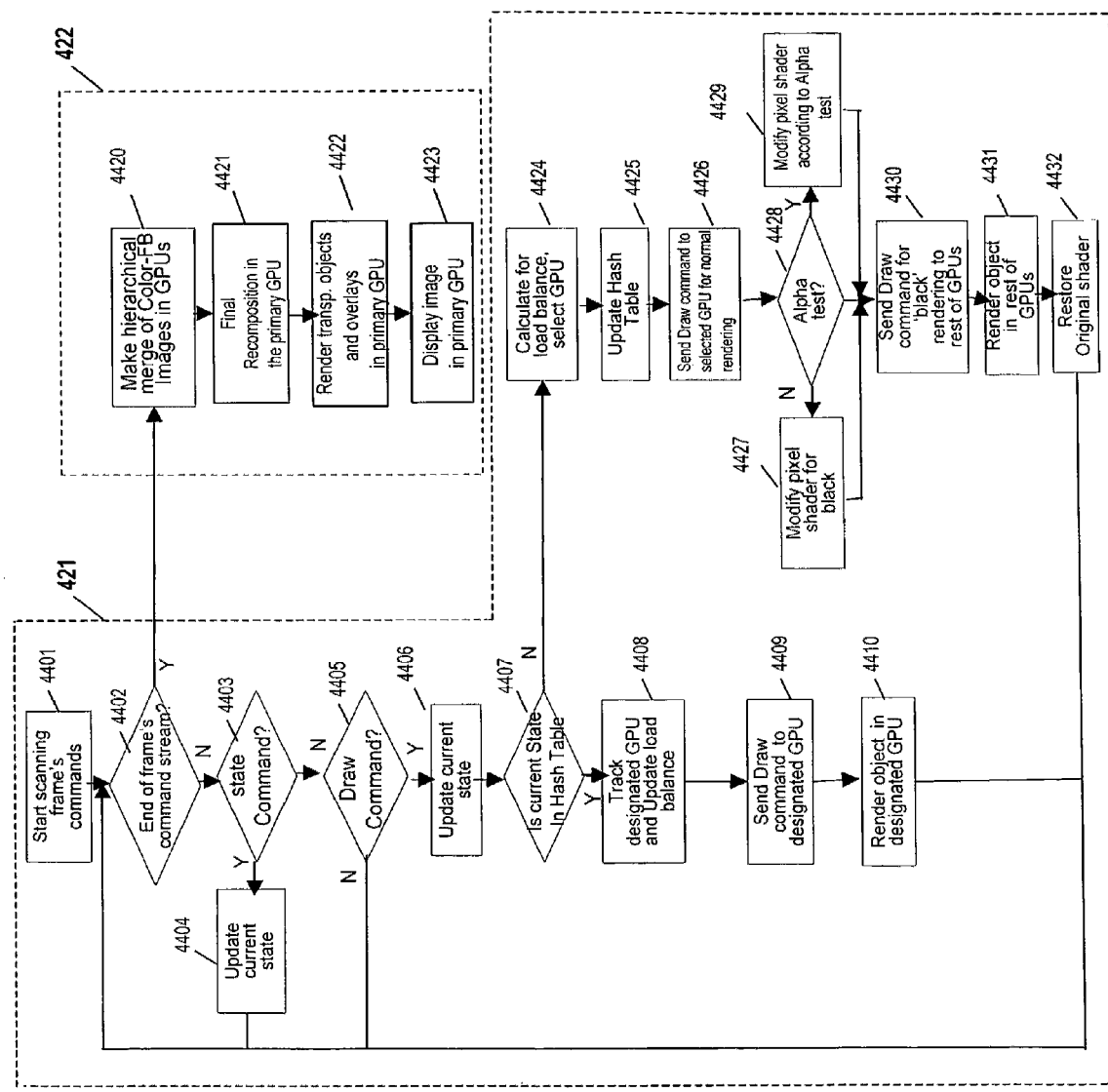
Figure 5A:
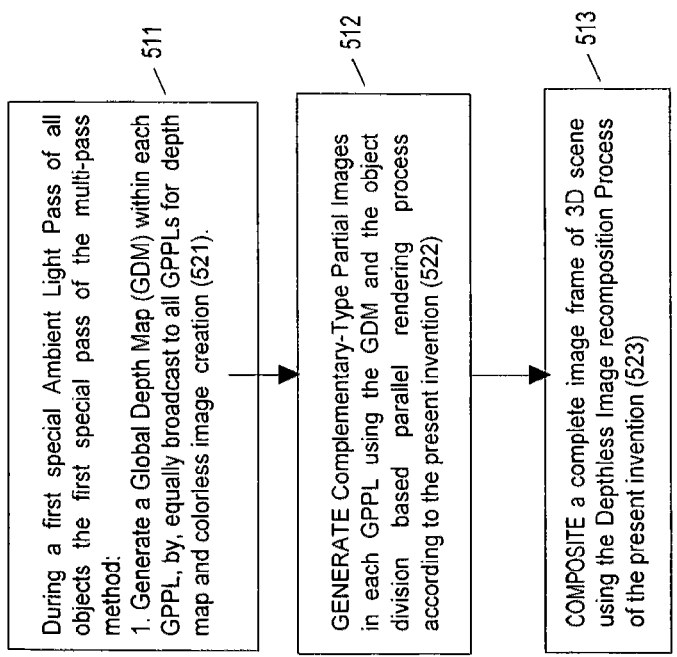
Figure 5B:
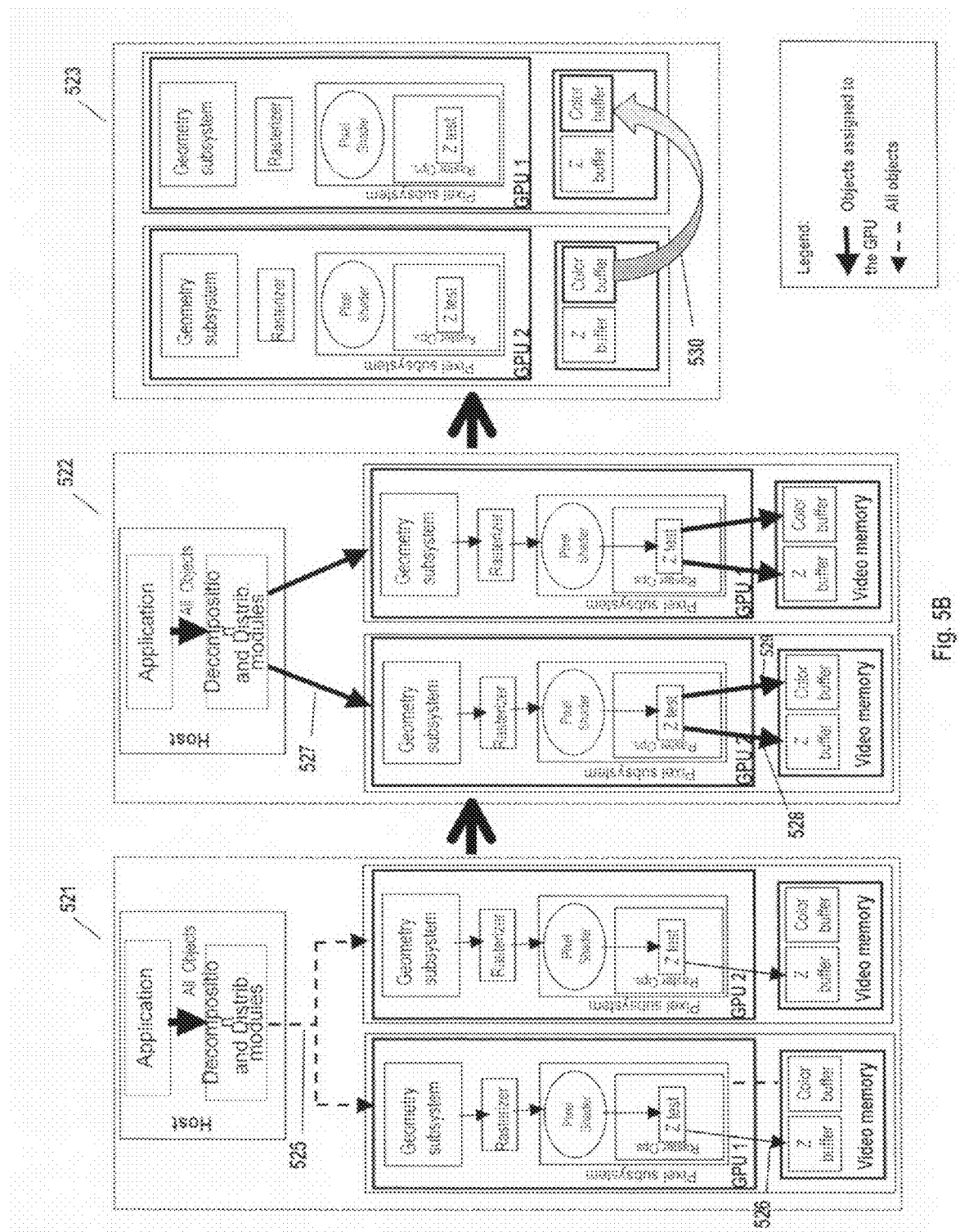
Figure 5C:
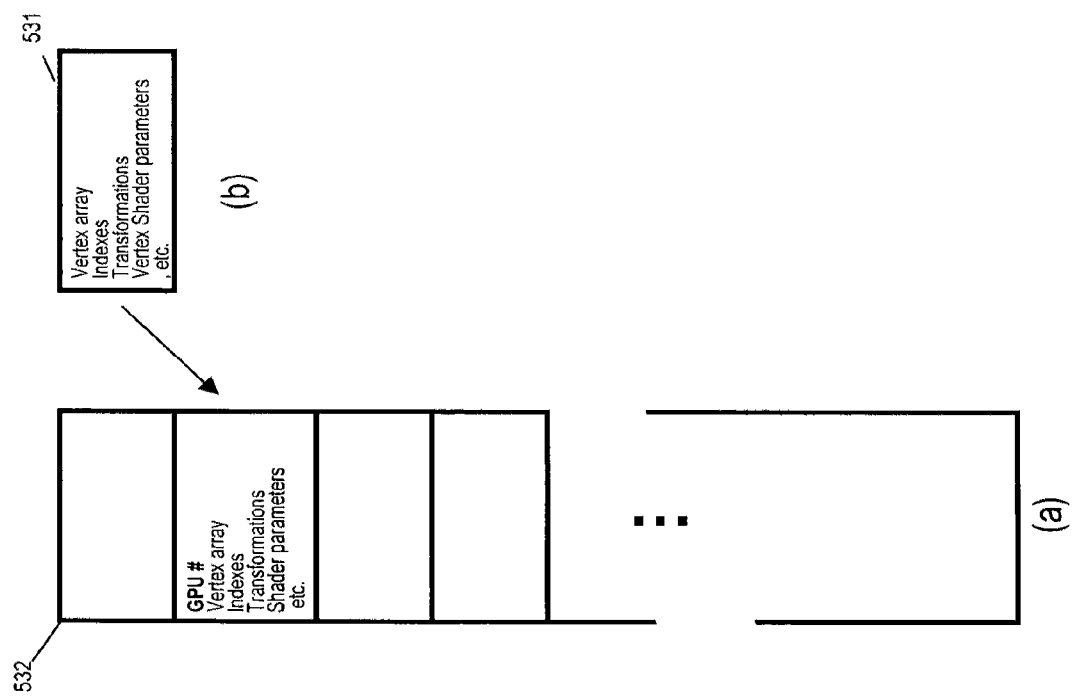
Figure 5D:
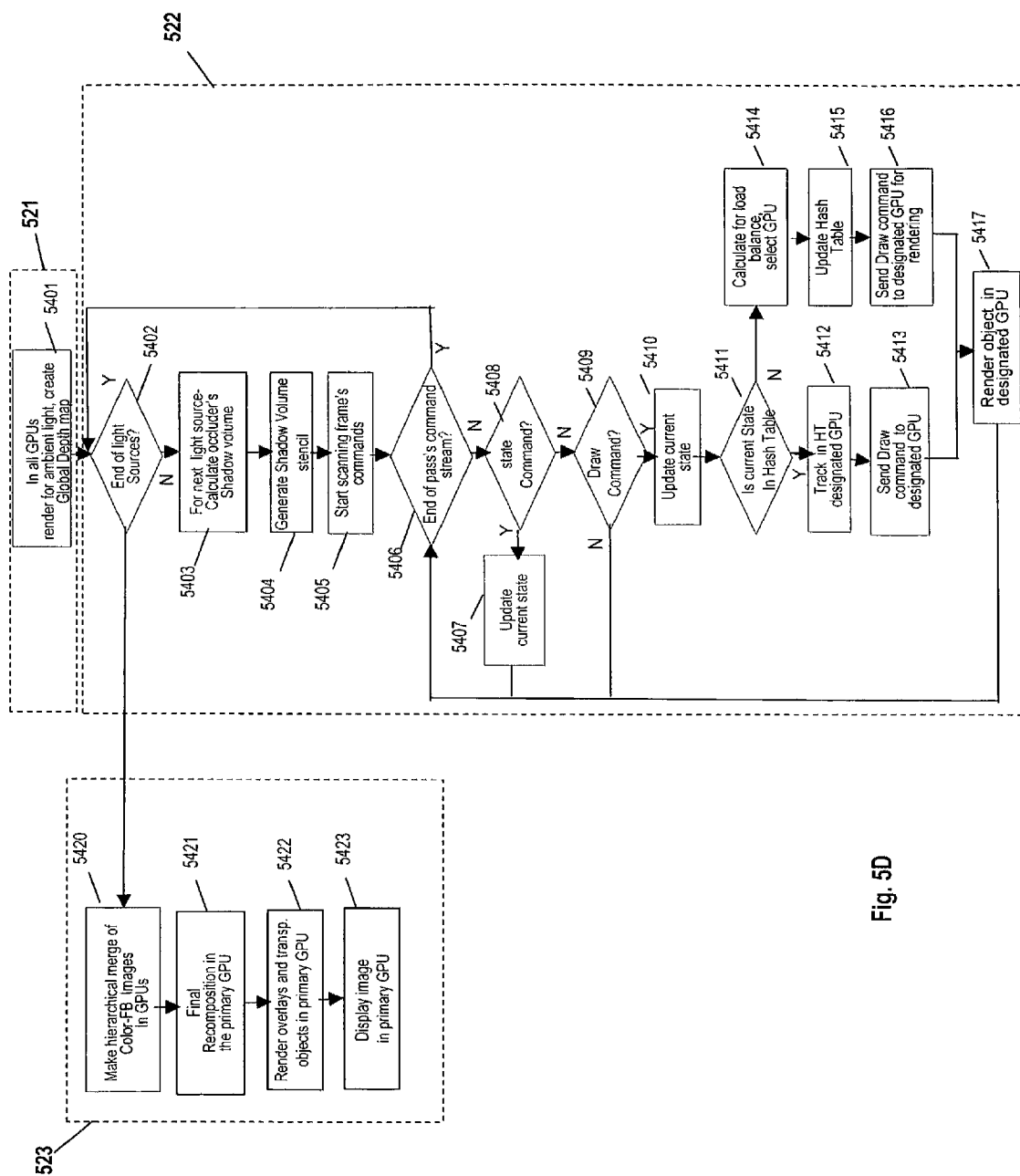
Figure 6A:
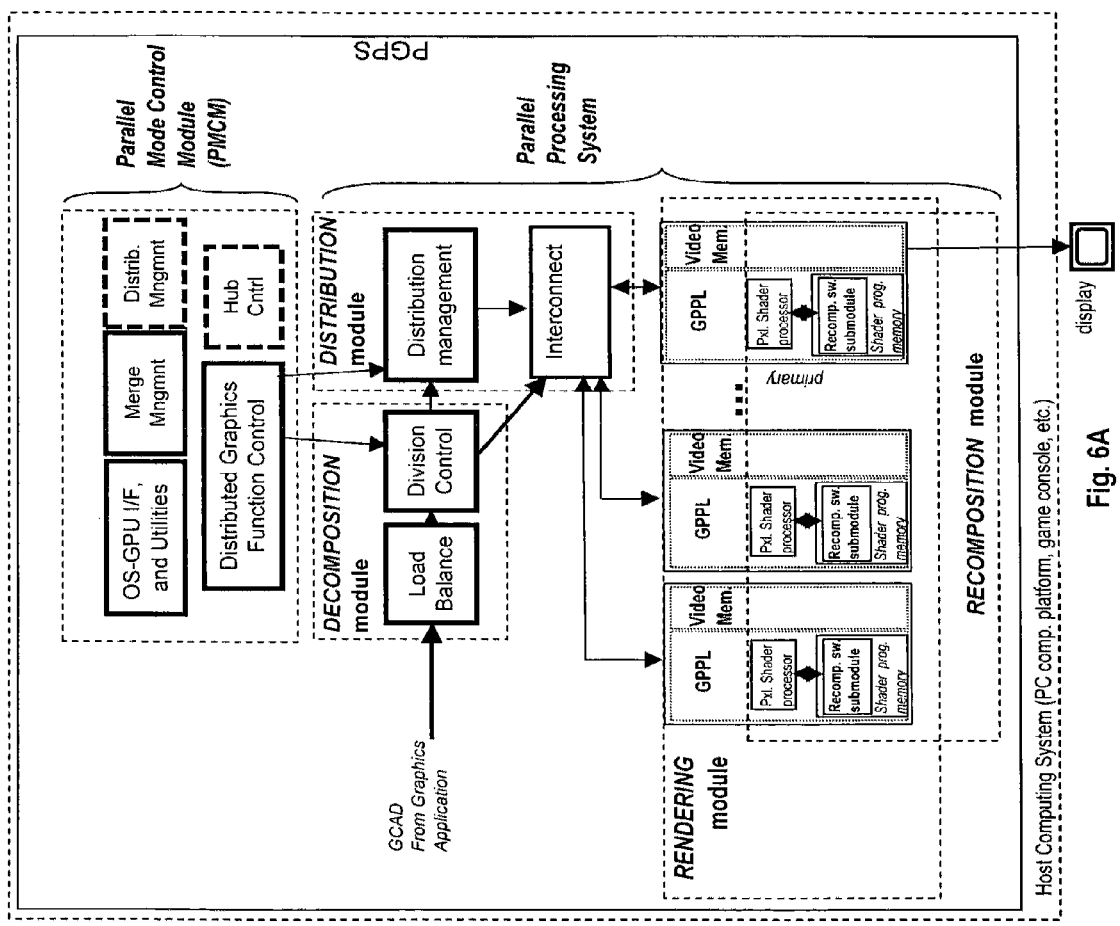
Figure 6C:
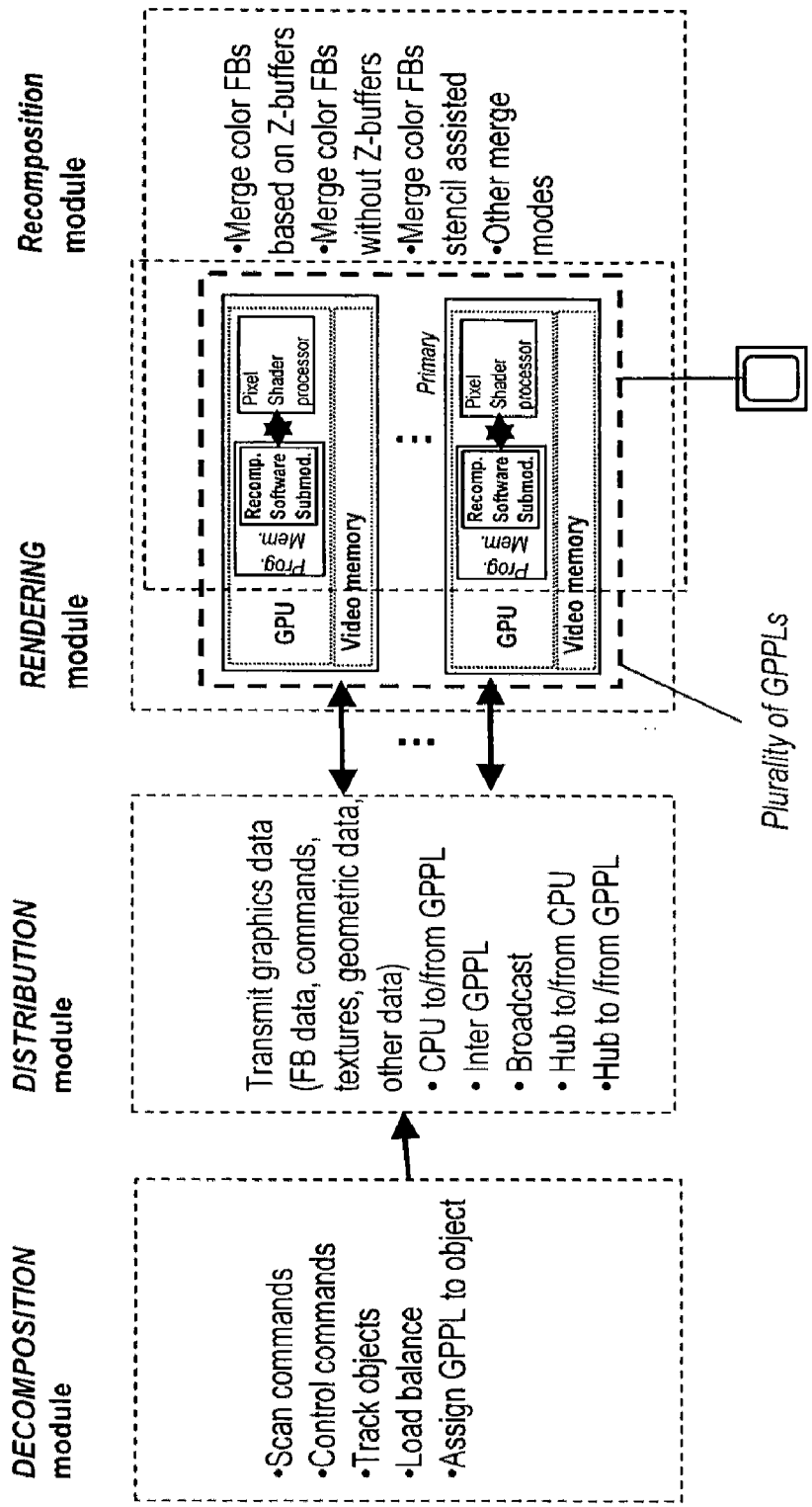
Figure 8A:
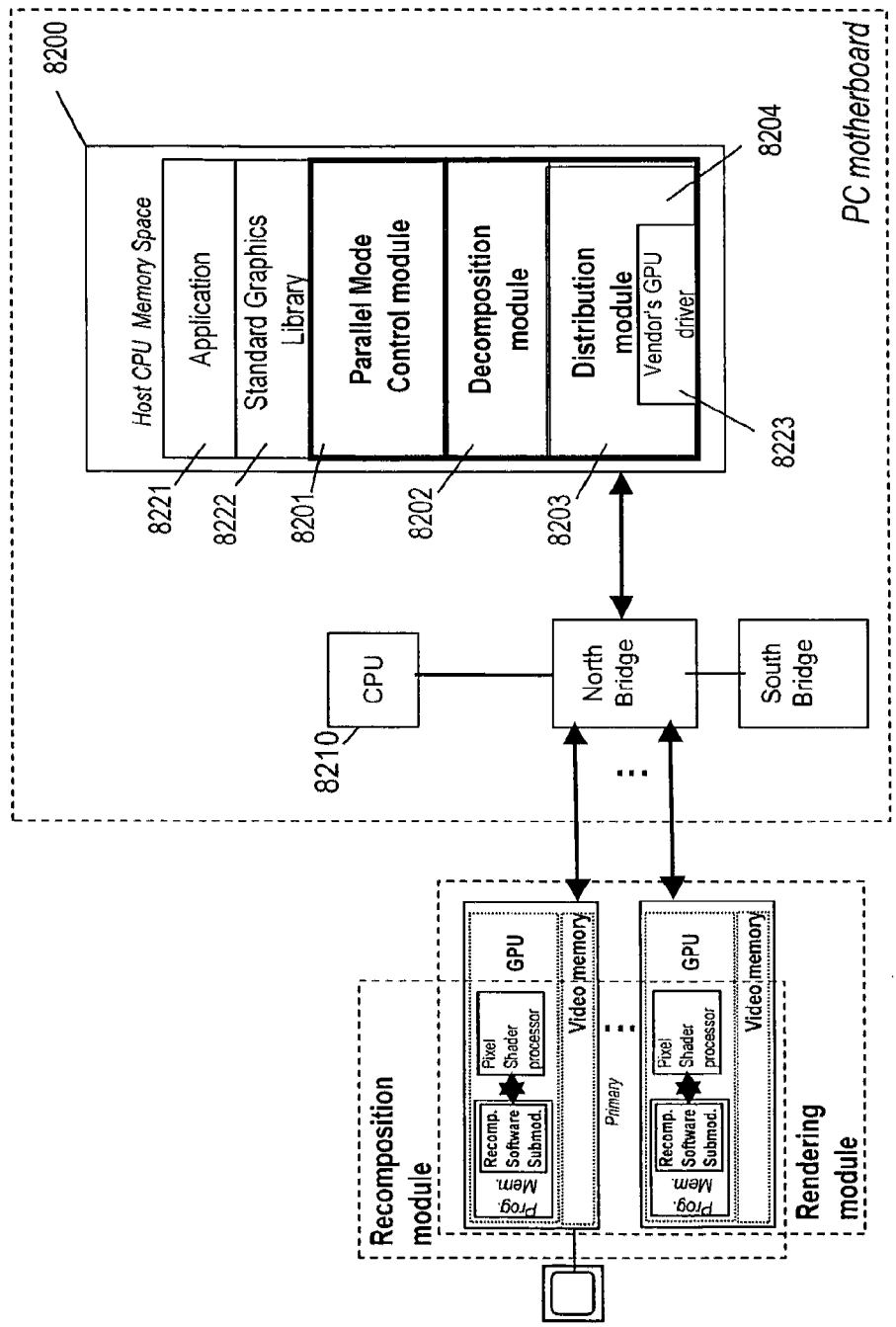
Figure 8B:
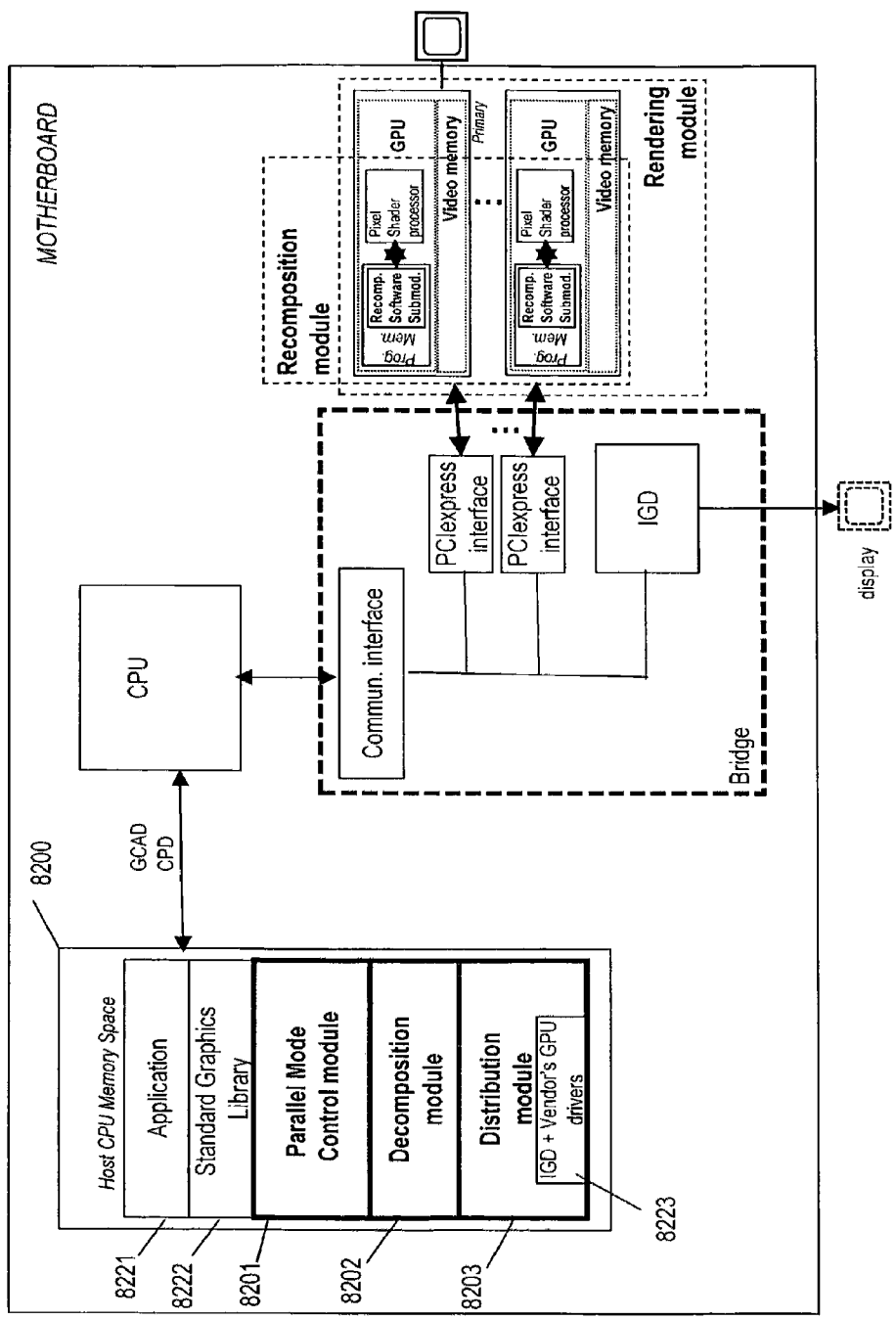
Figure 8C:
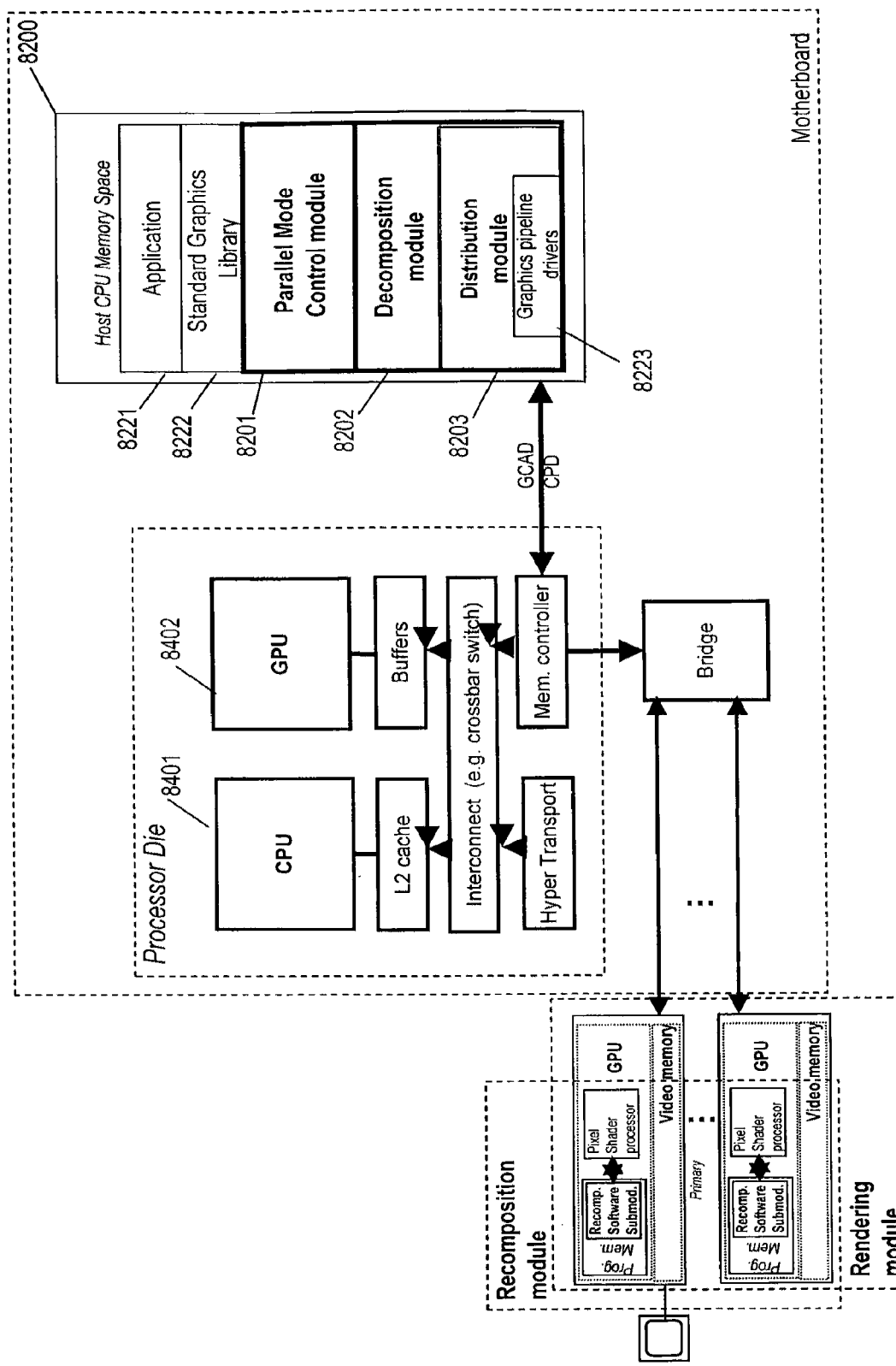
Figure 8E:
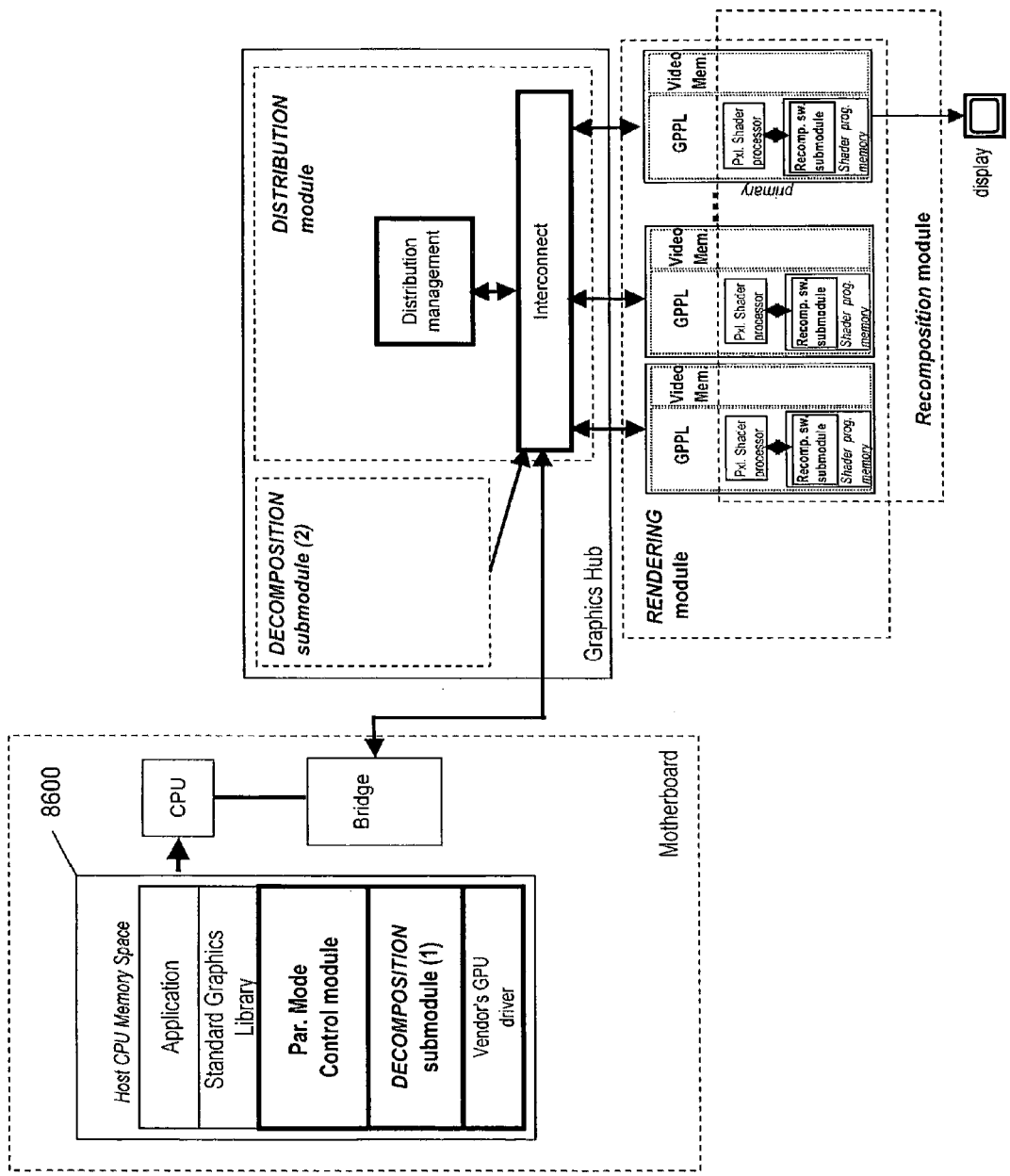
Figure 8F:
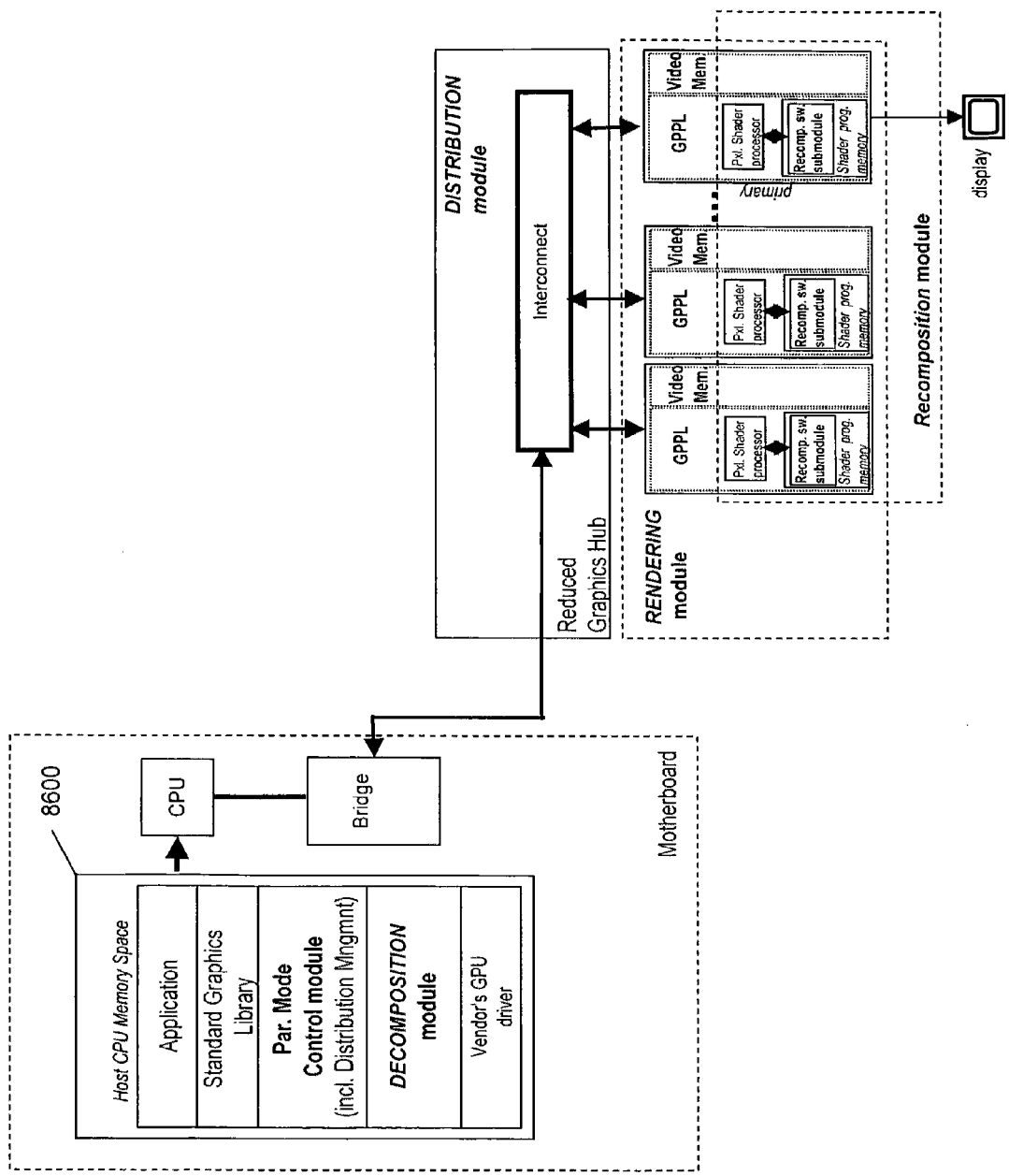
Figure 8G:
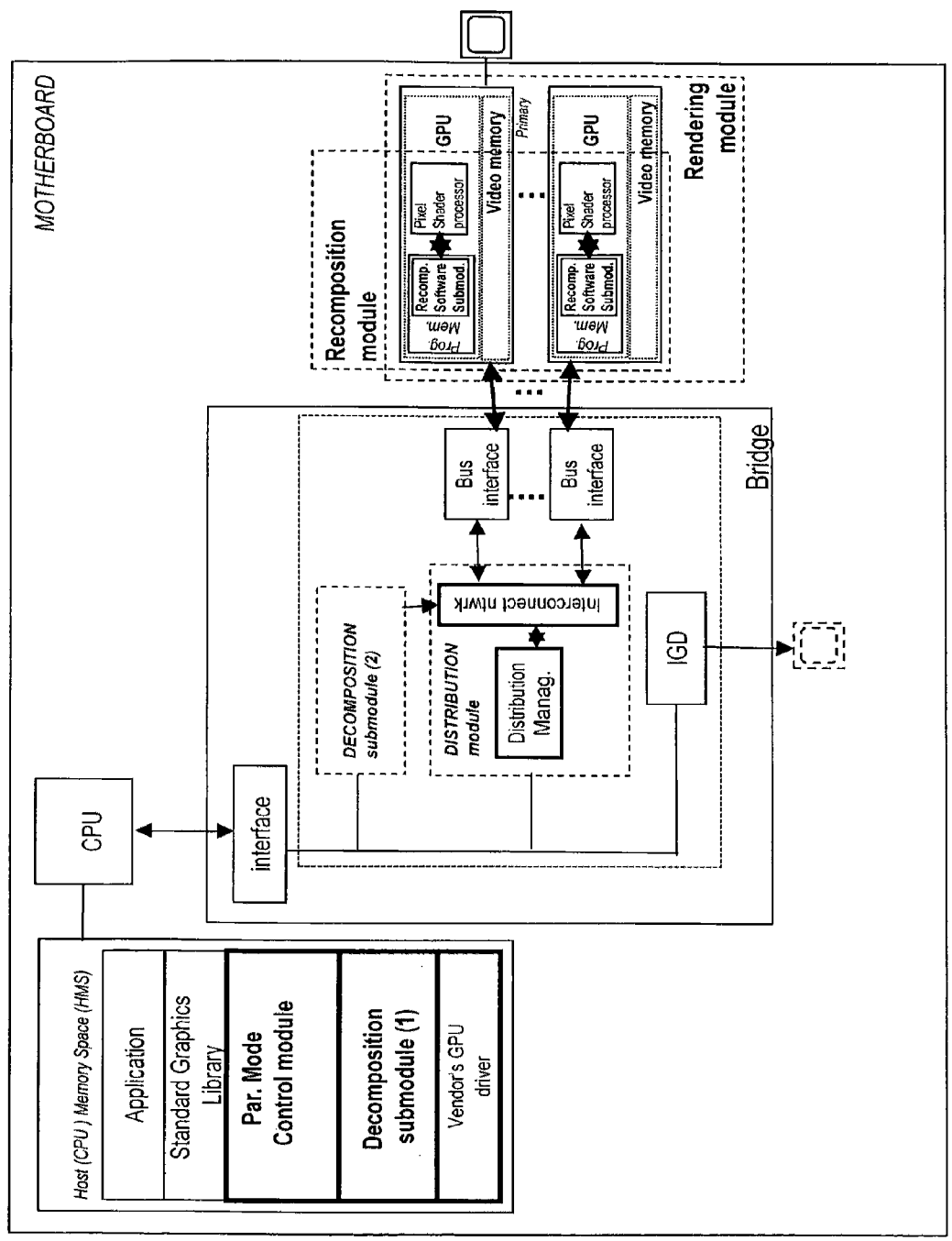
Figure 8H:
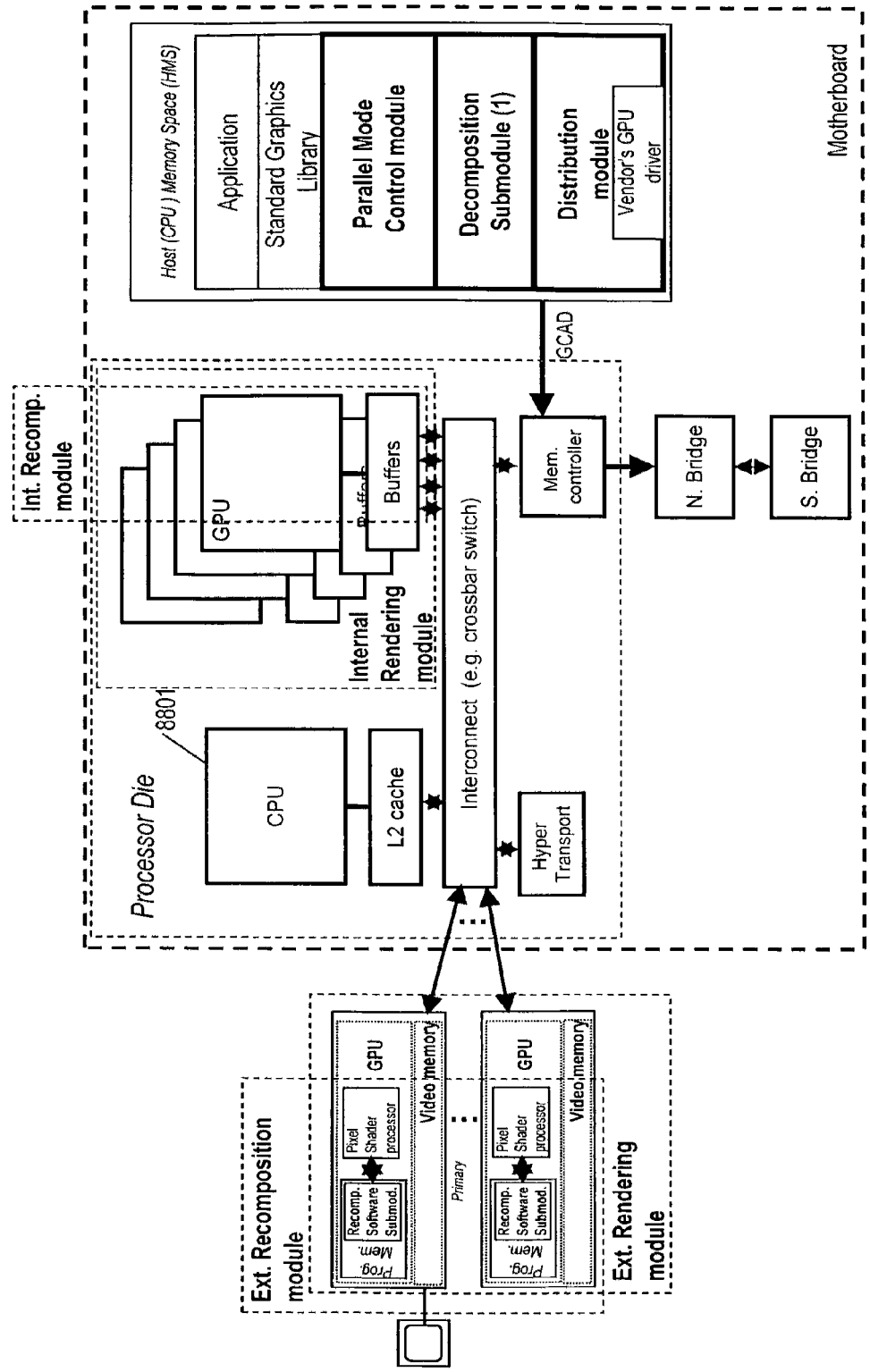
Figure 8I:
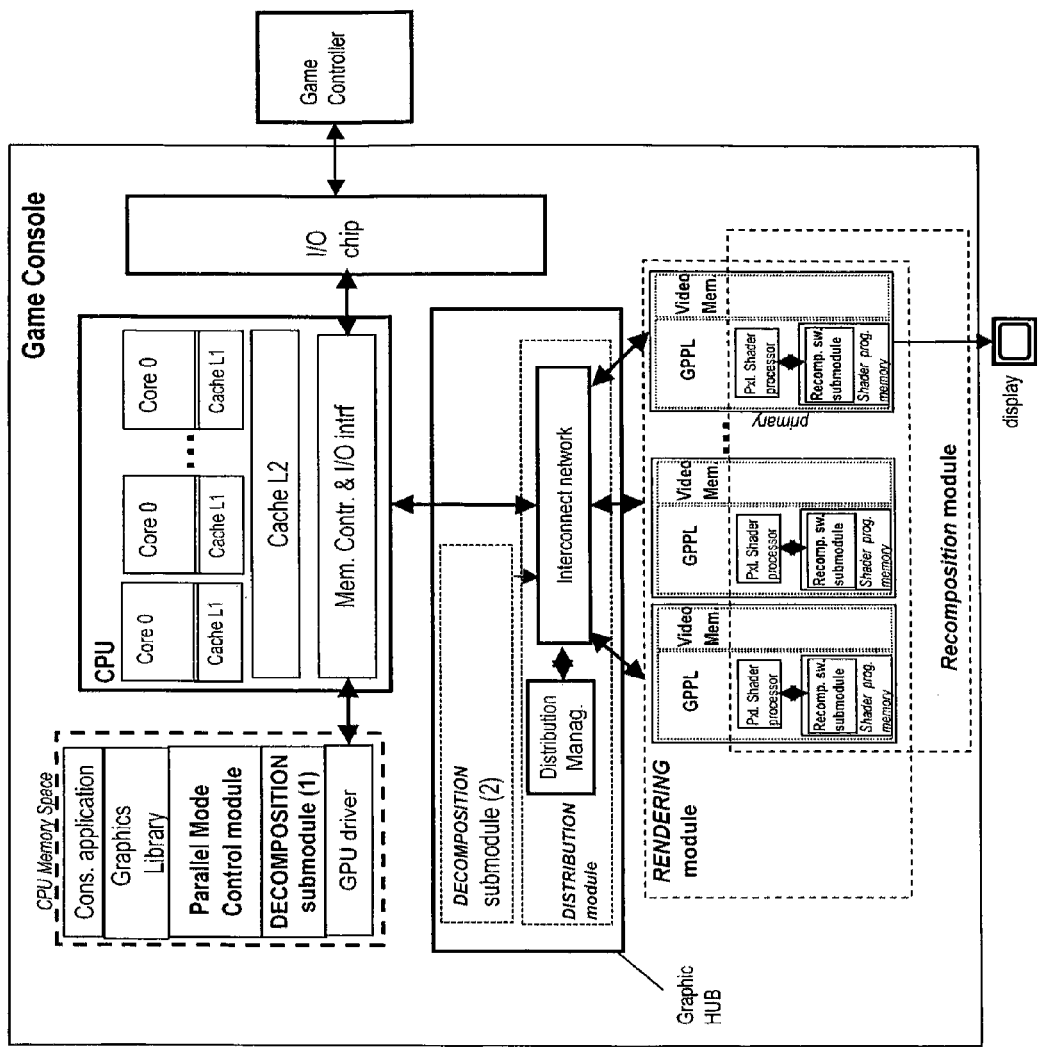

FIG. 1E1 is a graphical illustration of a 3D scene modeled within a dual-GPU embodiment of the parallel graphics processing system of FIG. 1A, operating in a classic object division (OD) mode of operation, wherein dual GPUs (GPU1 and GPU2) are provided, and three objects A, B and C are shown against a rectangular background frame, wherein cylindrical object B is occluded/obstructed by the cubic object A along the indicated view point within the coordinate reference system X-Y-Z, wherein the 3D scene is decomposed within the 3D dual-GPU based parallel graphics rendering system such that object A is assigned to GPU 1 while objects B and C are assigned to GPU2, and wherein partial images of the 3D scene are rendered in the GPUs and stored in the Color Buffers, and finally recomposited within GPU1 using pixel depth information maintained within the Z buffers of the GPUs;

FIG. 1E2 is a schematic representation of the Color Buffer and Z (Depth) Buffer associated with GPU1 employed in the dual-GPU embodiment of the parallel graphics rendering system of FIG. 1A operating in a classic Object Division Mode of operation, wherein the Color Buffer holds color values for the pixels of object A computed locally by GPU1, while the Z Buffer holds a local depth (z value) map for the pixels of object A also computed locally by GPU1;

FIG. 1E3 is a schematic representation of Color Buffer and Z (Depth) Buffer associated with GPU2 employed in dual-GPU embodiment of the parallel graphics rendering system of FIG. 1A operating in a classic Object Division Mode of operation, wherein the Color Buffer holds color values for the pixels of objects B and C computed locally by GPU2, while the Z Buffer holds a local depth (z value) map for the pixels of objects B and C, also computed locally by GPU2;

FIG. 2A is a graphical illustration of a 3D scene modeled within a dual-GPU embodiment of the parallel graphics processing system of FIG. 2C, carrying out a method of Depthless Image Recomposition (DIR) according to the present invention based an object division (OD) mode of parallel graphics processing operation, wherein dual GPUs (GPU1 and GPU2) are provided, and three objects A, B and C are shown against a rectangular background frame, wherein cylindrical object B is occluded/obstructed by the cubic object A along the indicated view point within the coordinate reference system X-Y-Z, wherein the 3D scene is decomposed within the 3D dual-GPU based parallel graphics rendering system such that object A is assigned to GPU 1 while objects B and C are assigned to GPU2, and wherein partial complementary-type images of the 3D scene are rendered in the GPUs and stored in the Color Buffers, and finally recomposited within GPU1 without using the global depth map (GDM) maintained within the Z buffers of the GPUs;

FIG. 2B is a high-level flow chart illustrating a generalized embodiment of the method of parallel graphics processing according to the present invention, comprising the steps of (a) providing a Global Depth Map (GDM) to each GPPL, for each image frame in the 3D scene to be generated, for use in rendering partial images of the 3D scene along a specified viewing direction, (b) generating complementary-type partial images in each GPPL, using the GDM and the object division based parallel rendering process according to the present invention, and (c) recompositing a complete image frame of the 3D scene using the depthless image recomposition (DIR) process of the present invention illustrated in FIGS. 3B1 and 3B2 (i.e. without the use of depth comparison);

FIG. 2C is a schematic representation illustrating the three primary stages of the generalized method of the present invention carried out on a dual-GPU embodiment of the parallel graphics processing system of the present invention, operating in an object division (OD) mode of operation according to the present invention, wherein each GPPL includes (i) a GPU having a geometry subsystem, a rasterizer, and a pixel subsystem with a pixel shader and raster operators including a Z test operator, and (ii) video memory supporting a Z (depth) Buffer and a Color Buffer, and wherein (a) the first stage involves providing a Global Depth Map (GDM) to the Z buffer of each GPPL, by transmitting graphics commands and data to all GPPLs, (b) the second stage involves generating a complementary-type partial images within the color buffer of each GPPL using the GDM and the Z Test Filter, and transmitting graphics commands and data to only assigned GPPLs, and (c) the third stage involves recompositing a complete image frame within the primary GPPL, from the complementary-type partial images stored in the color buffers, using the depthless recomposition process of the present invention;

FIG. 2D1 is a schematic representation of the complementary-type partial image generation process of the present invention carried out within GPU1 of the dual-GPU embodiment of the parallel graphics rendering system of FIG. 2C, wherein a Global Depth Map (GDM) is generated within the Z Buffer for all objects within the 3D scene (showing three different depth values namely the background having the highest depth (2415), wherein object A is closest to the viewer, has the lowest depth value (2416), its pixels have passed the Z-test and their depth values are written to the Z Buffer of GPU1, wherein object C (2414) has a middle depth value, its pixels have passed the z-test and their depth values are written to the Z buffer of GPU1, wherein object B has the deepest depth values, its pixels have all failed the z-test and their depth values have been replaced by the depth values of its occluding object A (2416) written in the Z Buffer in GPU1, and wherein a color-based complementary-type partial image is generated within the Color Buffer of GPU1 by recompositing (iii) the pixels of assigned object A rendered/drawn in color, (ii) the pixels of non-assigned object C drawn without color (i.e. black), and (iii) the pixels of assigned object B which are overwritten by the color pixels of the assigned occluding object A, which is closer to the viewer than object B;

FIG. 2D2 is a schematic representation of the complementary-type partial image generation process of the present invention carried out within GPU2 of the dual-GPU embodiment of the parallel graphics rendering system of FIG. 2C, wherein a Global Depth Map (GDM) is generated within the Z Buffer for all objects within the 3D scene (showing three different depth values namely, the background having the highest depth (2415), wherein the Z Buffer holds the Global Depth Map (242) identical to those depth values in the Z Buffer of GPU1 (2411), and wherein a color-based complementary-type partial image is generated within the Color Buffer of GPU2 by recompositing (i) the pixels of non-assigned objects A rendered/drawn without color (i.e. black), (ii) the pixels of assigned object C drawn with color, and (iii) the pixels of non-assigned object B which are overwritten by the colorless (i.e. black) values of non-assigned object A, which is closer to the viewer than object B;

FIG. 2D3 is a schematic representation illustrating the depthless method of image recomposition according to the principles of the present invention, carried out within the dual-GPU embodiment of the parallel graphics rendering system shown in FIG. 2C, wherein partial complementary images generated and buffered within GPPL1 and GPPL2 are recomposited (i.e. combined) by merging, in puzzle-like manner, to form a full color image frame of the 3D scene, without using any depth value information stored in the Z buffers of these GPPLs;

FIG. 2E1 is a schematic representation illustrating the depthless method of image recomposition according to the principles of the present invention, carried out within an eight-GPU embodiment of the parallel graphics rendering system, wherein (1) during the first level of hierarchical image merging involves four sub-stages of image merging, namely, (i) the partial complementary image generated and buffered within GPPL1 is merged with the partial complementary image generated and buffered within GPPL2 without using any depth value information stored in the Z buffers of these GPPLs, (ii) the partial complementary image generated and buffered within GPPL3 is merged with the partial complementary image generated and buffered within GPPL4 without using any depth value information stored in the Z buffers of these GPPLs, (iii) the partial complementary image generated and buffered within GPPL5 is merged with the partial complementary image generated and buffered within GPPL6 without using any depth value information stored in the Z buffers of these GPPLs, and (iv) partial complementary image generated and buffered within GPPL7 is merged with the partial complementary image generated and buffered within GPPL8 without using any depth value information stored in the Z buffers of these GPPLs, wherein (2) during the second level of hierarchical image merging, (i) the partial complementary image recomposited and buffered within GPPL2 is merged with the partial complementary image generated and buffered within GPPL4 without using any depth value information stored in the Z buffers of these GPPLs, and (ii) the partial complementary image recomposited and buffered within GPPL6 is merged with the partial complementary image generated and buffered within GPPL8 without using any depth value information stored in the Z buffers of these GPPLs, and wherein (3) during the third level of hierarchical image merging, the partial complementary image recomposited and buffered within GPPL4 is merged with the partial complementary image generated and buffered within GPPL8 (the primary GPPL) without using any depth value information stored in the Z buffers of these GPPLs, so as to generate a complete color image frame of the 3D scene within GPPL 8, without using any depth value information stored in the Z buffers of these GPPLs;

FIG. 2E2 is a flow chart illustrating the primary steps of the depthless method of recompositing image frames of a 3D scene from partial complementary images, carried out over n hierarchical levels or stages of using depthless complementary image merging operations, wherein at each (n−1)th level, pairs of source and target partial complementary images are merged into a target complementary image, for use at the nth level of processing, according to the principles of the present invention;

FIG. 2E3 is a flow chart illustrating the complementary image merging process carried out between a pair of partial complementary images buffered in the color buffers of a pair of GPPLs, wherein the addition of all pixels of source image and target images occurs within the target GPPL using its pixel shader processor running the shader merge code, and wherein the image merge result may become the source image for the next hierarchical step in the multi-level complementary image merging process of the present invention;

FIG. 3A1 is a high-level flow chart illustrating a first illustrative embodiment of the method of parallel graphics processing according to the present invention, comprising the steps of (a) during the first special rendering pass (i.e. GDM Creation Pass), generating a global depth map (GDM) within each GPPL, by broadcasting graphics commands and data to all GPPLs equally for pixel depth (z) testing, (b) during subsequent passes, generating complementary-type partial images in each GPPL using the GDM and the object-division based parallel rendering process according to the present invention, and (c) after the final pass, recompositing a complete image frame of the 3D scene using the depthless complementary image recomposition process of the present invention illustrated in FIGS. 3D3, 2E1, 2E2 and 3E3;

FIG. 3A2 is a schematic representation illustrating the three primary stages of the first illustrative embodiment of the method of the present invention, carried out on a dual-GPU embodiment of the parallel graphics processing system of the present invention, wherein (a) the first stage involves during the special rendering pass (i.e. GDM creating pass), providing a Global Depth Map (GDM) to the Z buffer of each GPPL involving the transmission of graphics commands and data to all GPPLs for all objects in the frame of the 3D scene to be rendered, (b) the second stage involves, for subsequent passes, generating a complementary-type partial images within the color buffer of each GPPL using the GDM and the Z Test Filter, and transmitting graphics commands and data to only assigned GPPLs, and (c) the third phase involves recompositing a complete image frame within the primary GPPL, from the complementary-type partial images stored in the color buffers of GPPL1 and GPPL2, using the depthless recomposition process of the present invention;

FIG. 3A3 is a graphical representation of a Hash Table (3132) in which each entry holds the state of a primitive, which is not assigned to any GPU, for tracking the appearance of object primitives during the first phase of the method of FIG. 3A4, and a Current State Buffer (4111) for storing a draw command;

FIG. 3A4 is a flowchart illustrating the steps performed during the first illustrative embodiment of the method of parallel graphics processing according to the present invention depicted in FIG. 3A1, with the pixels of objects assigned to a GPPL being normally rendered in color within the GPPL;

FIG. 3B1 is a high-level flow chart illustrating a second illustrative embodiment of the method of parallel graphics processing according to the present invention, comprising the steps of (a) during a first special rendering pass (i.e. GDM Creation Pass), (i) generating a global depth map (GDM) within each GPPL, by broadcasting graphics commands and data for all objects to all GPPLs, (ii) rendering without color (i.e. in black) the pixels of objects sent to non-assigned GPPLs, and (iii) rendering in color the pixels of all objects sent to assigned-GPPLs, (b) during subsequent passes, generating complementary-type partial images in each GPPL using the GDM and the object-division based parallel rendering process according to the present invention, and (c) recompositing a complete image frame of the 3D scene using the depthless complementary image recomposition process of the present invention illustrated in FIGS. 3D3, 2E1, 2E2 and 3E3;

FIG. 3B2 is a schematic representation illustrating the three primary stages of the second illustrative embodiment of the method of the present invention, carried out on a dual-GPU embodiment of the parallel graphics processing system of the present invention, wherein (a) the first stage involves, during a first special pass (i.e. GDM creating pass), (i) generating a global depth map (GDM) within each GPPL, by broadcasting graphics commands and data for all objects to all GPPLs, (ii) rendering without color (i.e. in black) the pixels of objects sent to non-assigned GPPLs, and (iii) rendering in color the pixels of all objects sent to assigned-GPPLs, (b) the second stage involves generating, for subsequent passes, a complementary-type partial images within the color buffer of each GPPL using the GDM and the Z Test Filter, and transmitting graphics commands and data to only assigned GPPLs, and (c) the third stage involves, after the final pass, recompositing a complete image frame within the primary GPPL, from the complementary-type partial images stored in the color buffers of GPPL1 and GPPL2, using the depthless recomposition process of the present invention;

FIG. 3B3 is a graphical representation of a Hash Table (3232) in which each entry holds the state of a primitive, which is not assigned to any GPU, for tracking the appearance of object primitives during the first stage of the method of FIG. 3B4, and a Current State Buffer (4111) for storing a draw command;

FIGS. 3B4A and 3B4B are flowcharts illustrating the steps performed during the second illustrative embodiment of the method of parallel graphics processing according to the present invention depicted in FIG. 3B1, wherein the pixels of objects assigned to a GPPL are normally rendered in color within the GPPL while pixels of objects not assigned to a GPPL are rendered colorlessly (i.e. in black);

FIG. 4A is a third illustrative embodiment of the method of parallel graphics processing according to the present invention, comprising the steps of (a) during each pass of the multi-pass method, (i) generating global depth map (GDM) values for each debuted object transmitted to each GPPL, (ii) rendering without color (i.e. in black) the pixels of objects sent to non-assigned GPPLs, and (iii) rendering in color the pixels of all objects sent to assigned-GPPLs, thereby generating complementary-type partial images in each GPPL, and (c) after the final pass, recompositing a complete image frame of the 3D scene using the depthless complementary image recomposition process of the present invention illustrated in FIGS. 3D3, 2E1, 2E2 and 3E3;

FIG. 4B is a schematic representation illustrating the two primary stages of the third illustrative embodiment of the method of the present invention, carried out on a dual-GPU embodiment of the parallel graphics processing system of the present invention, wherein (a) the first stage involves (i) during each pass of the multi-pass method, generating global depth map (GDM) values for each debuted object transmitted to each GPPL, (ii) rendering without color (i.e. in black) the pixels of objects sent to non-assigned GPPLs, and (iii), rendering in color the pixels of all objects sent to assigned-GPPLs, and (b) the second stage involves, after the final pass, recompositing a complete image frame within the primary GPPL, from the complementary-type partial images stored in the color buffers of GPPL1 and GPPL2, using the depthless recomposition process of the present invention;

FIG. 4C is a graphical representation of a Hash Table (432) in which each entry holds the state of a primitive, which is not assigned to any GPU, for tracking the appearance of object primitives during the first stage of the method of FIG. 4D, and a Current State Buffer (5111) for storing a draw command;

FIGS. 4D1 and 4D2 are flowcharts illustrating the steps performed during the third illustrative embodiment of the method of parallel graphics processing according to the present invention depicted in FIG. 4A, wherein the pixels of objects assigned to a GPPL are normally rendered in color within the GPPL while pixels of objects not assigned to a GPPL are rendered colorlessly (i.e. in black);

FIG. 5A is a fourth illustrative embodiment of the method of parallel graphics processing according to the present invention, comprising the steps of (a) during a first special Ambient Light Pass of the multi-pass method, generating a global depth map (GDM) within each GPPL by broadcasting all objects to all GPPLs for depth map creation in the Z buffers and colorless image creation within the color buffers, (b) during subsequent passes, generating complementary-type partial images in each GPPL using the GDM and the object-division based parallel rendering process according to the present invention (i.e. rendering without color (i.e. in black) the pixels of objects sent to non-assigned GPPLs, and rendering in color the pixels of all objects sent to assigned-GPPLs), and (c) after the final pass, recompositing a complete image frame of the 3D scene using the depthless complementary image recomposition process of the present invention illustrated in FIGS. 3D3, 2E1, 2E2 and 3E3;

FIG. 5B is a schematic representation illustrating the three primary stages of the third illustrative embodiment of the method of the present invention, carried out on a dual-GPU embodiment of the parallel graphics processing system of the present invention, wherein (a) the first stage involves of (a) during a first special Ambient Light Pass of the multi-pass method, generating a global depth map (GDM) within each GPPL by broadcasting all objects to all GPPLs for depth map creation in the Z buffers and colorless image creation within the color buffers, (b) the second stage involves, during subsequent passes, generating complementary-type partial images in each GPPL using the GDM and the object-division based parallel rendering process according to the present invention (i.e. rendering without color (i.e. in black) the pixels of objects sent to non-assigned GPPLs, and rendering in color the pixels of all objects sent to assigned-GPPLs), (c) the third stage involves, after the final pass, recompositing a complete image frame within the primary GPPL, from the complementary-type partial images stored in the color buffers of GPPL1 and GPPL2, using the depthless recomposition process of the present invention;

FIG. 5C is a graphical representation of a Hash Table (532) in which each entry holds the state of a primitive, which is not assigned to any GPU, for tracking the appearance of object primitives during the first stage of the method of FIG. 5D, and a Current State Buffer (5111) for storing a draw command;

FIGS. 5D1 and 5D2 are flowcharts illustrating the steps performed during the fourth illustrative embodiment of the method of parallel graphics processing according to the present invention depicted in FIG. 4A, wherein the pixels of objects assigned to a GPPL are normally rendered in color within the GPPL while pixels of objects not assigned to a GPPL are rendered colorlessly (i.e. in black);

FIG. 6A is a schematic representation of PC-based host computing system of the present invention (a) embodying an illustrative embodiment of the parallel 3D graphics processing system (PGPS) of the present invention illustrated throughout FIGS. 2A through 5D, and (b) comprising (i) a parallel mode control module (PMCM), (ii) a parallel graphics processing subsystem for supporting the parallelization stages of decomposition, distribution and re-composition implemented using a decomposition module, a distribution module and a re-composition module, respectively, and (ii) a plurality of either GPU and/or CPU based graphics processing pipelines (GPPLs) operated in a parallel manner under the control of the PMCM;

FIG. 6B1 is a schematic representation of the subcomponents of a first illustrative embodiment of a GPU-based graphics processing pipeline (GPPL) that can be employed in the PGPS of the present invention depicted in FIG. 6A, shown comprising (i) a video memory structure supporting a frame buffer (FB) including stencil, depth and color buffers, and (ii) a graphics processing unit (GPU) supporting (1) a geometry subsystem having an input assembler and a vertex shader, (2) a set up engine, and (3) a pixel subsystem including a pixel shader receiving pixel data from the frame buffer and a raster operators operating on pixel data in the frame buffers;

FIG. 6B2 is a schematic representation of the subcomponents of a second illustrative embodiment of a GPU-based graphics processing pipeline (GPPL) that can be employed in the PGPS of the present invention depicted in FIG. 6A, shown comprising (i) a video memory structure supporting a frame buffer (FB) including stencil, depth and color buffers, and (ii) a graphics processing unit (GPU) supporting (1) a geometry subsystem having an input assembler, a vertex shader and a geometry shader, (2) a rasterizer, and (3) a pixel subsystem including a pixel shader receiving pixel data from the frame buffer and a raster operators operating on pixel data in the frame buffers;

FIG. 6B3 is a schematic representation of the subcomponents of an illustrative embodiment of a CPU-based graphics processing pipeline that can be employed in the PGPS of the present invention depicted in FIG. 6A, and shown comprising (i) a video memory structure supporting a frame buffer including stencil, depth and color buffers, and (ii) a graphics processing pipeline realized by one cell of a multi-core CPU chip, consisting of 16 in-order SIMD processors, and further including a GPU-specific extension, namely, a texture sampler that loads texture maps from memory, filters them for level-of-detail, and feeds to pixel processing portion of the pipeline;

FIG. 6C is a schematic representation illustrating the pipelined structure of the parallel graphics processing system (PGPS) of the present invention shown driving a plurality of GPPLs, wherein the decomposition module supports the scanning of commands, the control of commands, the tracking of objects, the balancing of loads, and the assignment of objects to GPPLs, wherein the distribution module supports transmission of graphics data (e.g. FB data, commands, textures, geometric data and other data) in various modes including CPU-to/from-GPU, inter-GPPL, broadcast, hub-to/from-CPU, and hub-to/from-CPU and hub-to/from-GPPL, and wherein the re-composition module supports the merging of partial image fragments in the Color Buffers of the GPPLs in a variety of ways, in accordance with the principles of the present invention (e.g. merge color frame buffers without z buffers, merge color buffers using stencil assisted processing, and other modes of partial image merging);

FIGS. 7A1A and 7A1B are flowcharts illustrating in which modules of the parallel graphics processing system of FIG. 6A, the primary steps of the method of FIG. 3A4 are implemented;

FIG. 7A2 is a schematic representation illustrating the three primary stages of the first illustrative embodiment of the method of the present invention, carried out on a dual-GPU embodiment of the parallel graphics processing system of the present invention, wherein the Decomposition and Distribution Modules are shown implemented within the host memory space (HMS), whereas the Rendering and Recomposition Modules are implemented by the GPUs;

FIGS. 7B1A and 7B1B are flowcharts illustrating in which modules of the parallel graphics processing system of FIG. 6A, the primary steps of the methods of FIGS. 3B4A and 3B4B are implemented;

FIG. 7B2 is a schematic representation illustrating the three primary stages of the second illustrative embodiment of the method of the present invention, carried out on a dual-GPU embodiment of the parallel graphics processing system of the present invention, wherein the Decomposition and Distribution Modules are shown implemented within the host memory space (HMS), whereas the Rendering and Recomposition Modules are implemented by the GPUs;

FIGS. 7C1A and 7C1B are flowcharts illustrating in which modules of the parallel graphics processing system of FIG. 6A, the primary steps of the methods of FIGS. 4D1 and 4D2 are implemented;

FIG. 7C2 is a schematic representation illustrating the two primary stages of the second illustrative embodiment of the method of the present invention, carried out on a dual-GPU embodiment of the parallel graphics processing system of the present invention, wherein the Decomposition and Distribution Modules are shown implemented within the host memory space (HMS), whereas the Rendering and Recomposition Modules are implemented by the GPUs;

FIGS. 7D1A and 7D1B are a flowchart illustrating in which modules of the parallel graphics processing system of FIG. 6A, the primary steps of the methods of FIGS. 5D1 and 5D2 are implemented;

FIG. 7D2 is a schematic representation illustrating the three primary stages of the second illustrative embodiment of the method of the present invention, carried out on a dual-GPU embodiment of the parallel graphics processing system of the present invention, wherein the Decomposition and Distribution Modules are shown implemented within the host memory space (HMS), whereas the Rendering and Recomposition Modules are implemented by the GPUs;

FIG. 8A is a schematic representation of a first illustrative embodiment of the PGPS of the present invention embodied in a PC-level computing system, showing (i) that the Parallel Mode Control Module (PMCM) and the Decomposition and Distribution Modules of the Parallel Graphics Rendering Subsystem resides as a software package in the Host or CPU Memory Space (HMS) while multiple GPUs on external GPU cards are connected to a North bridge circuit, implement the Rendering and Recomposition Modules, and are driven in a parallelized manner under the control of the PMCM, (ii) the Decomposition Module divides (i.e. splits up) the stream of graphic commands and data (GCAD) according to the parallelization mode, (iii) the Distribution Module uses the North bridge circuit to distribute graphic commands and data (GCAD) to the external GPUs, (iv) the Rendering Module generates complementary-type partial color images according to a multi-pass parallel graphics processing method of the present invention, (v) the Recomposition Module uses inter-GPU communication transport to transfer the pixel data of the complementary-type partial images among the GPUs during the image recomposition stages, and finally (vi) the complementary-type partial color images are recomposited using the depthless image merging process of the present invention so as to generate a complete image frame of the 3D scene for display on the display device, connected to an external graphics card via a PCI-express interface;

FIG. 8B is a schematic representation of a second illustrative embodiment of the PGPS of the present invention embodied in a PC-level computing system, showing (i) that the Parallel Mode Control Module (PMCM) and the Decomposition and Distribution and Modules of the Parallel Graphics Rendering Subsystem resides as a software package in the Host or CPU Memory Space (HMS) while the Rendering and Recomposition Modules are realized across multiple GPUs connected to a bridge circuit (having an internal IPD) as well as on external graphic cards connected to the North memory bridge chip and driven in a parallelized manner under the control of the PMCM, (ii) the Decomposition Module divides (i.e. splits up) the stream of graphic commands and data (GCAD) according to the required parallelization mode, (iii) the Distribution Module uses the bridge chip to distribute the graphic commands and data (GCAD) to the multiple GPUs located on the external graphics cards, (iv) the Rendering Module generates complementary-type partial color images according to a multi-pass parallel graphics processing method of the present invention, (v) the Recomposition Module uses inter-GPU communication transport to transfer the pixel data of the complementary-type partial images among the GPUs during the image recomposition stages, and finally (vi) the complementary-type partial color images are recomposited using the depthless image merging process of the present invention so as to generate a complete image frame of the 3D scene for display on the display device, connected to one of the external graphics cards or the IGD;

FIG. 8C is a schematic representation of a third illustrative embodiment of the PGPS of the present invention embodied in a PC-level computing system, showing (i) that the Parallel Mode Control Module (PMCM) 400 and the Decomposition and Distribution Modules of the Parallel Graphics Rendering Subsystem reside as a software package in the Host Memory Space (HMS) while a single GPU is supported on a CPU/GPU fusion-architecture processor die (alongside the CPU), one or more GPUs are supported on an external graphic card connected to a bridge circuit and driven in a parallelized manner under the control of the PMCM, and the Rendering and Recomposition Modules are realized across the GPUs on the graphics card (ii) the Decomposition Module divides (i.e. splits up) the stream of graphic commands and data (GCAD) according to the required parallelization mode, (iii) the Distribution Module uses the memory controller (controlling the HMS) and the interconnect network (e.g. crossbar switch) within the CPU/GPU processor chip to distribute graphic commands and data to the multiple GPUs on the CPU/GPU die chip and on the external graphics cards, (iv) the Rendering Module generates complementary-type partial color images according to a multi-pass parallel graphics processing method of the present invention, (v) the Recomposition Module uses inter-GPU communication transport on the graphics card, as well as memory controller and interconnect (e.g. crossbar switch) within the CPU/GPU processor chip, to transfer the pixel data of the complementary-type partial images among the GPUs during the image recomposition stages, and finally (vi) the complementary-type partial color images are recomposited using the depthless image merging process of the present invention so as to generate a complete image frame of the 3D scene for display on the display device, connected to the external graphics card via a PCI-express interface connected to the bridge circuit;

FIG. 8D1 is a schematic representation of a fourth illustrative embodiment of the PGPS of the present invention embodied in a PC-level computing system, showing (i) that the Parallelization Mode Control Module (PMCM) and the Decomposition and Distribution Modules of the Parallel Graphics Rendering Subsystem reside as a software package in the Host Memory Space (HMS) while a second cluster of CPU cores on a multi-core CPU chip function as a CPU and a second cluster of CPU cores are used to implement a plurality of multi-core graphics pipelines (GPPLs) (i.e. of Rendering Module) which are parallelized under the control of the PMCM, with the Re-composition Module being realized across a plurality of the GPPLs, (ii) the Decomposition Module divides (i.e. splits up) the stream of graphic commands and data (GCAD) according to the required parallelization mode, (iii) the Distribution Module uses the bridge circuit and interconnect network within the multi-core CPU chip to distribute graphic commands and data (GCAD) to the multi-core graphic pipelines implemented on the multi-core CPU chip, (iv) the Rendering Module generates complementary-type partial color images according to a multi-pass parallel graphics processing method of the present invention, (v) the Recomposition Module uses inter-GPU communication transport as well as the bridge and interconnect network within the multi-core CPU chip to transfer the pixel data of the complementary-type partial images among the GPPLs during the image recomposition stages, and finally (vi) the complementary-type partial color images are recomposited using the depthless image merging process of the present invention so as to generate a complete image frame of the 3D scene for display on the display device connected to the primary GPPL (e.g. GPU) via a display interface;

FIG. 8D2 is a schematic representation of a fifth illustrative embodiment of the PGPS of the present invention embodied in a PC-level computing system, showing (i) that the Parallelization Mode Control Module (PMCM) and the Decomposition and Distribution Modules of the Parallel Graphics Rendering Subsystem reside as a software package in the Host or CPU Memory Space (HMS) while a first cluster of CPU cores on the multi-core CPU chips on external graphics cards function as GPPLs and implement the Re-composition Module across a plurality of the GPPLs whereas a second cluster of CPU cores function as GPPLs and implement the Rendering Module, (ii) the Decomposition Module divides (i.e. splits up) the stream of graphic commands and data (GCAD) according to the required parallelization mode, (iii) the Distribution Module uses the North bridge circuit and interconnect networks within the multi-core CPU chips (on the external cards) to distribute graphic commands and data (GCAD) to the multi-core graphic pipelines implemented thereon, (iv) the Rendering Module generates complementary-type partial color images according to a multi-pass parallel graphics processing method of the present invention, (v) the Recomposition Module uses interconnect networks within the multi-core CPU chips to transfer the pixel data of the complementary-type partial images among the GPPLs during the image recomposition stages, and finally (vi) the complementary-type partial color images are recomposited using the depthless image merging process of the present invention so as to generate a complete image frame of the 3D scene for display on the display device connected to the primary GPPL, via a display interface;

FIG. 8E is a schematic representation of a sixth illustrative embodiment of the MMPGRS of the present invention embodied in a PC-level computing system, showing (i) that the Parallel Mode Control Module (PMCM) and the Decomposition Submodule No. 1 reside as a software package in the Host or CPU Memory Space (HMS) while the Decomposition Submodule No. 2 and Distribution Module are realized within a single graphics hub device (e.g. chip) that is connected to the bridge circuit of the host computing system via a PCI-express interface and to a cluster of external GPUs via an interconnect, with the GPUs implementing the Rendering Module and Recomposition Modules and being driven in a parallelized manner under the control of the PMCM, (ii) the Decomposition Submodule No. 1 transfers graphic commands and data (GCAD) to the Decomposition Submodule No. 2 via the bridge circuit, (iii) the Decomposition Submodule No. 2 divides (i.e. splits up) the stream of graphic commands and data (GCAD) according to the required parallelization mode, (iv) the Distribution Module distributes graphic commands and data (GCAD) to the external GPUs, (v) the Rendering Module generates complementary-type partial color images according to a multi-pass parallel graphics processing method of the present invention, (vi) the Recomposition Module uses inter-GPU communication transport to transfer the pixel data of the complementary-type partial images among the GPUs during the image recomposition stages, and finally (vii) the complementary-type partial color images are recomposited using the depthless image merging process of the present invention so as to generate a complete image frame of the 3D scene for display on the display device connected to the primary GPU on the graphical display card;

FIG. 8F is a schematic representation of an seventh illustrative embodiment of the PGPS of the present invention embodied in a PC-level computing system, showing (i) that the Parallel Mode Control Module (PMCM), including the Distribution Management Submodule, and the Decomposition Module reside as a software package in the Host Memory Space (HMS) of the host computing system, while the Distribution Module and interconnect transport are realized within a single graphics hub device (e.g. chip) that is connected to the bridge circuit of the host computing system and a cluster of external GPUs implementing the Rendering and Recomposition Modules, and that all of the GPUs are driven in a parallelized manner under the control of the PMCM, (ii) the Decomposition Module divides (i.e. splits up) the stream of graphic commands and data (GCAD) according to the required parallelization mode, (iii) the Distribution Management Module within the PMCM distributes the graphic commands and data (GCAD) to the external GPUs via the bridge circuit and interconnect transport mechanism, (iv) the Rendering Module generates complementary-type partial color images according to a multi-pass parallel graphics processing method of the present invention, (v) the Recomposition Module uses inter-GPU communication transport to transfer the pixel data of the complementary-type partial images among the GPUs during the image recomposition stages, and finally (vi) the complementary-type partial color images are recomposited using the depthless image merging process of the present invention so as to generate a complete image frame of the 3D scene for display on the display device connected to the primary GPU on the graphical display card(s);

FIG. 8G is a schematic representation of a eighth illustrative embodiment of the PGPS of the present invention embodied in a PC-level computing system, showing (i) that the Parallel Mode Control Module (PMCM) and the Decomposition Submodule No. 1 reside as a software package in the Host Memory Space (HMS) while the Decomposition Submodule No. 2 and the Distribution Module are realized (as a graphics hub) on within a bridge circuit on the motherboard within the host computing system, with the Rendering Module and the Recomposition Module being implemented by a plurality of GPUs driven in a parallelized under the control of the PMCM, (ii) the Decomposition Submodule No. 1 transfers graphics commands and data (GCAD) to the Decomposition Submodule No. 2, (iii) the Decomposition Submodule No. 2 divides (i.e. splits up) the stream of graphic commands and data (GCAD) according to the parallelization mode, (iv) the Distribution Module distributes the graphic commands and data (GCAD) to the internal GPU and external GPUs, (v) the Rendering Module generates complementary-type partial color images according to a multi-pass parallel graphics processing method of the present invention, (vi) the Recomposition Module uses inter-GPU communication transport to transfer the pixel data of the complementary-type partial images among the GPUs during the image recomposition stages, and finally (vii) the complementary-type partial color images are recomposited using the depthless image merging process of the present invention so as to generate a complete image frame of the 3D scene for display on the display device connected to the external graphics card connected to the hybrid CPU/GPU chip via a PCI-express interface;

FIG. 8H is a schematic representation of a ninth illustrative embodiment of the PGPS of the present invention embodied in a PC-level computing system, showing (i) that the Parallel Mode Control Module (PMCM) and the Decomposition Submodule No. 1 reside as a software package in the Host Memory Space (HMS) while the Decomposition Submodule No. 2 and the Distribution Module are realized (as a graphics hub) on the die of a hybrid CPU/GPU fusion-architecture chip within the host computing system and having a single GPU driven with one or more GPUs on an external graphics card (connected to the CPU/GPU chip) in a parallelized under the control of the PMCM, and GPUs on the external graphics card are used to implement the Recomposition Module, (ii) the Decomposition Submodule No. 1 transfers graphics commands and data (GCAD) to the Decomposition Submodule No. 2, (iii) the Decomposition Submodule No. 2 divides (i.e. splits up) the stream of graphic commands and data (GCAD) according to the parallelization mode, (iv) the Distribution Module distributes the graphic commands and data (GCAD) to the internal GPU and external GPUs, (v) the Rendering Module generates complementary-type partial color images according to a multi-pass parallel graphics processing method of the present invention, (vi) the Recomposition Module uses inter-GPU communication transport to transfer the pixel data of the complementary-type partial images among the GPUs during the image recomposition stages, and finally (vii) the complementary-type partial color images are recomposited using the depthless image merging process of the present invention so as to generate a complete image frame of the 3D scene for display on the display device connected to the external graphics card connected to the hybrid CPU/GPU chip via a PCI-express interface;

FIG. 8I is a schematic representation of a tenth illustrative embodiment of the PGPS of the present invention embodied in a game console system, showing (i) that the Parallel Mode Control Module (PMCM) and the Decomposition Submodule No. 1 are realized as a software package within the Host Memory Space (HMS), while the Decomposition Submodule No. 2 and the Distribution Module are realized as a graphics hub semiconductor chip within the game console system, and the Rendering and Recomposition Modules are implemented by multiple GPPLs supported on the game console board and driven in a parallelized manner under the control of the PMCM, (ii) the Decomposition Submodule No. 1 transfers graphics commands and data (GCAD) to the Decomposition Submodule No. 2, via the memory controller on the multi-core CPU chip and the interconnect in the graphics hub chip of the present invention, (iii) the Decomposition Submodule No. 2 divides (i.e. splits up) the stream of graphic commands and data (GCAD) according to the parallelization mode, (iv) the Distribution Module distributes the graphic commands and data (GCAD) to the multiple GPUs, (v) the Rendering Module generates complementary-type partial color images according to a multi-pass parallel graphics processing method of the present invention, (vi) the Recomposition Module uses inter-GPU communication transport to transfer the pixel data of the complementary-type partial images among the GPUs during the image recomposition stages, and finally (vii) the complementary-type partial color images are recomposited using the depthless image merging process of the present invention so as to generate a complete image frame of the 3D scene for display on the display device connected to the primary GPU via an analog display interface.

DETAILED DESCRIPTION OF THE ILLUSTRATIVE EMBODIMENTS OF THE PRESENT INVENTION

Referring now to FIGS. 3A through 8I in the accompanying Drawings, the various illustrative embodiments of the 3D parallel graphics rendering system (PGPS) and 3D parallel graphics rendering process (PGRP) of the present invention will now be described in great technical detail, wherein like elements will be indicated using like reference numerals.

In general, one aspect of the present invention teaches a new way of and means for recompositing images of 3D scenes, represented within a 3D parallel graphics rendering subsystem (PGPS) supporting object division parallelism among its multiple graphics processing pipelines (GPPLs), but without performing pixel z-depth comparisons, which are otherwise required by prior art systems and processes. By virtue of the depthless image recompositing technique of the present invention, the performance of 3D graphics rendering processes and subsystems can be significantly improved using the principles of the present invention.

In general, the image recomposition method of the present invention can be practiced within any parallel graphics processing system (PGPS) having multiple GPPLs driven in an object division mode of parallelism, or hybrid mode of parallel operation employing a combination of object and image/screen division techniques and/or principles. In the illustrative embodiment, the method of the present invention is embodied within a system employing objective-division mode of parallelism.

The image recomposition method and apparatus of the present invention can be practiced within conventional computing platforms (e.g. PCs, laptops, servers, etc.) as well as silicon level graphics systems (e.g. graphics system on chip (SOC) implementations, integrated graphics device IGD implementations, and hybrid CPU/GPU die implementations).

Generalized Embodiment of the Method of Parallel Graphics Processing According to the Present Invention As indicated in FIG. 2A, the generalized embodiment of the method of parallel graphics processing according to the present invention comprises several steps, namely: (a) at the first step 221, providing a Global Depth Map (GDM) to each GPPL, for each image frame in the 3D scene 231 be generated, for use in rendering partial images of the 3D scene along a specified viewing direction; (b) at the second step 222, generating complementary-type partial images in each GPPL, using the GDM and the object division based parallel rendering process according to the present invention; and (c) at the third step 223, recompositing a complete image frame of the 3D scene using the depthless image recomposition (DIR) process of the present invention illustrated in FIGS. 3B1 and 3B2 (i.e. without the use of depth comparison).

In practice, the method of parallel graphics processing can involve, and will typically employ, multiple parallel graphics rendering passes, so that most, but not necessary all, illustrative embodiments of the method of the present invention will be "multi-pass" in character and nature. Also, in some illustrative embodiments of the present invention, steps (a) and (b) can be integrated within a single pass of a multi-pass method of parallel graphics processing, while steps (b) and (c) can be carried out in subsequent passes of the multi-pass parallel graphics rendering process of the present invention. This different embodiments are described in FIGS. 3A1 through 5D.

In order to create the Global Depth Map (GDM) in all GPUs, depth values of all objects of the scene must be imported to each GPU, and stored in its Z buffer. This is done as follows: while all objects originally designated to the GPU are drawn normally, the other GPU's objects are brought to the GPU for their depth values only, ignoring their color and texture. Thus while the Z-buffer is being updated for object's depth, only a black silhouette of the imported object is drawn in the color buffer, as indicated in FIG. 2D1. This method of "black rendering" is inexpensive because it avoids altogether the heavy processing associated with shading, texturing, and other pixel processing required during normal drawing operations with color values.

According to the recomposition method of the present invention, each object that is designated/assigned to a particular GPU, must also be imported to other GPUs for "black rendering" purposes, i.e. so as to update the Global Depth Map GDM being stored in the Z buffers of other non-designated GPUs. Those pixels of a "black rendered" object that have passed the Z test, are drawn in color buffers as black silhouette of the object. For multi-pass applications, when an object may be rendered several times (using several rendering passes), only its first appearance is used for updating the Global Depth Map (GDM) for a given image frame generated from a 3D scene. The graphics data associated with all additional appearances of the object in successive passes will be sent only to the designated GPU, and not to the non-designated GPUs. Therefore the system of the present invention provides a mechanism for tracking an object throughout its all successive appearances.

Dual-GPU Embodiment of the Parallel Graphics Processing System of the Present Invention Carrying Out a Method of Depthless Image Recomposition (DIR) Based an Object Division (OD) Mode of Parallel Graphics Processing Operation In FIG. 2B, a 3D scene is shown modeled within a dual-GPU embodiment of the parallel graphics processing system of FIG. 2C, adapted to carry out a method of Depthless Image Recomposition (DIR) according to the present invention based, an object division (OD) mode of parallel graphics processing operation. As shown, dual GPUs (GPU1 and GPU2) are provided, and three objects A, B and C are shown against a rectangular background frame. As shown, cylindrical object B is occluded/obstructed by the cubic object A along the indicated view point within the coordinate reference system X-Y-Z. The 3D scene is decomposed within the 3D dual-GPU based parallel graphics rendering system such that object A is assigned to GPU 1 while objects B and C are assigned to GPU2. The partial complementary-type images of the 3D scene are rendered in the GPU1 and GPU2 and stored in their respective Color Buffers, and finally recomposited within GPU1 without using the global depth map (GDM) maintained within the Z Buffers of the GPUs.

Referring to FIG. 2C, the three primary stages of the generalized method of the present invention are illustrated being carried out on the dual-GPU embodiment of the parallel graphics processing system of the present invention, operating in an object division (OD) mode of operation according to the present invention. In this embodiment, GPPL1 includes (i) a GPU1 having a geometry subsystem, a rasterizer, and a pixel subsystem with a pixel shader and raster operators including a Z test operator, and (ii) video memory supporting a Z (depth) Buffer and a Color Buffer. Also, GPPL2 includes (i) a GPU2 having a geometry subsystem, a rasterizer, and a pixel subsystem with a pixel shader and raster operators including a Z test operator, and (ii) video memory supporting a Z (depth) Buffer and a Color Buffer.

As illustrated at Block 231, the first stage involves providing a Global Data Map (GDM) to the Z buffer of each GPU, by transmitting graphics commands and data to all GPPLs.

As illustrated at Block 232, the second stage involves generating a complementary-type partial images within the color buffer of each GPU using the GDM and the Z Test Filter, and transmitting graphics commands and data to only assigned GPPLs.

As illustrated at Block 233, the third stage involves recompositing a complete image frame within the primary GPU, from the complementary-type partial images stored in the color buffers, using the depthless recomposition process of the present invention, Notably, the image recompositing stage (233) is performed after all the intra and inter-GPU Z-tests have been completed, making the final comparison of Z-buffers needless. Therefore, for the case of dual GPUs (i.e. GPU1 and GPU2), the recompositing process of the present invention involves only merging the color Frame Buffers of GPU1 and GPU2, and no depth comparison operations are involved. The depthless image recomposition process as will be described below with reference to FIGS. 2D1 through 2E3.

Complementary-Type Partial Image Generation Process of the Present Invention Carried Out within the GPUS of the Dual-GPU Embodiment of the Parallel Graphics Rendering System of the Illustrative Embodiment Referring now to FIGS. 2D1 through 2D3, the Complementary-Type Partial Image Generation Process of the present invention is graphically illustrated in connection with the dual-GPU embodiment of the parallel graphics rendering system of the illustrative embodiment, supporting GPU1 and GPU2.

FIG. 2D1 illustrates the complementary-type partial image generation process of the present invention carried out within GPU1 of the dual-GPU embodiment of the parallel graphics rendering system of FIG. 2C. During this stage, a Global Depth Map (GDM) is generated within the Z Buffer for all objects within the 3D scene (showing three different depth values namely the background having the highest depth (2415). As shown, the object A is closest to the viewer, has the lowest depth value (2416), and its pixels have passed the Z-test and their depth values are written to the Z Buffer of GPU1. Object C (2414) has a middle depth value, its pixels have passed the z-test filter, and their depth values are written to the Z buffer of GPU1. Also, object B has the deepest depth values, its pixels have all failed the z-test and their depth values have been replaced by the depth values of its occluding object A (2416) written in the Z Buffer in GPU1. As shown, a color-based complementary-type partial image is generated within the Color Buffer of GPU1 by recompositing (iii) the pixels of assigned object A rendered/drawn in color, (ii) the pixels of non-assigned object C drawn without color (i.e. black), and (iii) the pixels of assigned object B which are overwritten by the color pixels of the assigned occluding object A, which is closer to the viewer than object B.

FIG. 2D2 illustrates the complementary-type partial image generation process of the present invention carried out within GPU2 of the dual-GPU embodiment of the parallel graphics rendering system of FIG. 2C. As shown, the Z Buffer in GPU2 holds a Global Depth Map (2422) which is identical to those depth values of the GDM held in the Z Buffer of GPU1 (2411). Notably, as will be shown in the illustrative embodiments, there are different methods of implementing the GDM within depth buffers of the GPPLs within any given parallel graphics processing platform. Also, as shown a color-based complementary-type partial image is generated within the Color Buffer of GPU2 by recompositing (i) the pixels of non-assigned objects A rendered/drawn without color (i.e. black), (ii) the pixels of assigned object C drawn with color, and (iii) the pixels of non-assigned object B which are overwritten by the colorless (i.e. black) values of non-assigned object A, which is closer to the viewer than object B.

As shown in FIG. 2D3, the depthless method of image recomposition according to the principles of the present invention, is carried out within the dual-GPU embodiment of the parallel graphics rendering system shown in FIG. 2C, by simply combining, in puzzle-like manner, through merging, the partial complementary images generated and buffered within GPPL1 and GPPL2 so as to form, the Color Frame Buffer of GPU1 (i.e. the primary GPU), a full color image frame of the 3D scene, without using any depth value information stored in the Z buffers of these GPUs. In parallel graphics rendering systems employing more than two GPUs, the depthless image recomposition process according to the present invention involves performing a hierachical complementary recomposition process, as illustrated in FIGS. 2E1, 2E2 and 2E3, described below.

The Depthless Method of Image Recomposition According to the Principles of the Present Invention, Carried Out within an Eight-GPU Embodiment of the Parallel Graphics Processing System of the Present Invention In FIG. 2E1, the depthless method of image recomposition according to the principles of the present invention is shown carried out, in a hierarchical manner, within an eight-GPPL (e.g. 8-GPU) embodiment of the parallel graphics processing system. The process is performed hierarchically in "$\log_2 n$" merging steps, where n is the number of GPPLs employed in the parallel graphics processing platform. At each stage of the hierarchical process, the partial complementary color images in the Color Buffers of pairs of GPPLs (identified as source GPPL and target GPPL) are merged without the use of any depth value information. Therefore, there are no depth (Z) buffers involved in the depthless image recomposition process according to the principles of the present invention.

In the exemplary case of 8 GPPLs (e.g. GPUs) illustrated in FIG. 2E1, there are three (3) hierarchical levels of merge (i.e. $\log_2 8 = 3$). In the highest level of the hierarchy, the final image ends up in the primary GPPL (i.e. GPU). At all levels, the source and target images, buffered in the source and target GPPLs, are complementary-type images, in accordance with the principles of the present invention, i.e. at a given x,y position in an image, at most only one GPPL can hold a non zero pixel value (i.e. the visible pixel) which has survived the z-test against the GDM stored in the Z Buffers of all GPPLs. All other GPPLs hold PLX(x,y)=0. At this juncture, it will be appropriate to describe this hierarchical depthless image recomposition process in greater detail below with reference to the three-tier hierarchical example set forth in FIGS. 2E1 through 2E3, As shown in FIG. 2E1, during the first level of hierarchical image merging, the following operations are performed: (i) the partial complementary image generated and buffered within GPPL1 is merged with the partial complementary image generated and buffered within GPPL2 without using any depth value information stored in the Z buffers of these GPPLs; (ii) the partial complementary image generated and buffered within GPPL3 is merged with the partial complementary image generated and buffered within GPPL4 without using any depth value information stored in the Z buffers of these GPPLs; (iii) the partial complementary image generated and buffered within GPPL5 is merged with the partial complementary image generated and buffered within GPPL6 without using any depth value information stored in the Z buffers of these GPPLs, and (iv) partial complementary image generated and buffered within GPPL7 is merged with the partial complementary image generated and buffered within GPPL8 without using any depth value information stored in the Z buffers of these GPPLs.

During the second level of hierarchical image merging, the following operations are performed: (i) the partial complementary image recomposited and buffered within GPPL2 is merged with the partial complementary image generated and buffered within GPPL4 without using any depth value information stored in the Z buffers of these GPPLs; and (ii) the partial complementary image recomposited and buffered within GPPL6 is merged with the partial complementary image generated and buffered within GPPL8 without using any depth value information stored in the Z buffers of these GPPLs.

During the third level of hierarchical image merging, the partial complementary image recomposited and buffered within GPPL4 is merged with the partial complementary image generated and buffered within GPPL8 (the primary GPPL) without using any depth value information stored in the Z buffers of these GPPLs, so as to generate a complete color image frame of the 3D scene within GPPL 8, without using any depth value information stored in the Z buffers of these GPPLs.

The Depthless Method of Recompositing Image Frames of a 3D Scene from Partial Complementary Images, Carried Out Over N Hierarchical Levels or Stages of Using Depthless Complementary Image Merging Operations In FIG. 2E2, a generalized method of depthless recompositing image frames of a 3D scene from partial complementary images is described using a parallel graphics processing platform having n GPPLs, and wherein image merging occurs at $\log_2 n$ hierarchical levels or stages. At each level, pairs of source and target images are merged into target image (25230). In general, the process can be carried out over n hierarchical levels of depthless complementary image merging operations, wherein at each (n−1)th level, pairs of source and target partial complementary images are merged into a target complementary image, for subsequent use at the nth level of processing, according to the principles of the present invention.

As indicated at Block 25232, the first step of the method involves the system commencing of partial complementary image merge processing, at the first hierarchical level.

At Block 25230, for each pair of source and target images, the system employs the process illustrated at FIG. 2E3 to calculate: $image_{target} = image_{source} + image_{target}$.

At Block 25234, the system determines whether or not the last hierarchical level is completed. If the last level is not completed, then at Block 25233, the system moves up or increments the recomposition hierarchy and returns to Block 25230 and performs the same operation for each pair of source and target images, namely: $image_{target} = image_{source} + image_{target}$. If at Block 25235, the system determines that the last level is completed, then at Block 25233, the system determines that the final image frame recomposition result is stored in the Color Buffer in the primary GPPL, ready for rendering transparent objects of scene in a single GPPL, and subsequent display on the display devices supported by the system.

The Complementary Image Merging Process of the Present Invention Carried Out Between a Pair of Partial Complementary Images Buffered in the Color Buffers of a Pair of GPPLs FIG. 2E3 illustrates the complementary image merging process carried out between a pair of partial complementary images buffered in the color buffers of a single pair of GPPLs. The addition of all pixel values in the source image (tex2) and the target image (tex1) occurs within the target GPPL using its pixel shader processor running the shader merge code (25346). Notably, in hierarchical processes, the image merge result (tex1) may become the source image (tex2) for the next hierarchical step in the multi-level complementary image merging process of the present invention.

As indicated at Blocks 25342 and 25343, partial complementary-type color images are rendered in the target and source GPPLs, according to the principles of the present invention, and stored in the color Frame Buffer of the GPPLs.

As indicated at Blocks 25344 and 25345, the partial complementary-type color images are copied from the color Frame Buffer in the target and source GPPLs, into their respective texture memory, and indicated as "tex1" and "tex2" images, respectively.

As indicated at Block 25346 in the target GPPL, the Shader's merge code (program) is downloaded and run using "tex1" and "tex2" images, and performs the operations indicated at Blocks 25347 through 25350, which will be described below.

As indicated at Block 25347, the merge code program analyzes the next x,y location in the "tex1" and "tex2" images, and at Block 25348, for each set of corresponding x,y values in these tex1 and tex2 images, the merge code program makes a new pixel value according to the formula: $PXL_{tex}(x,y) = PXL_{tex1}(x,y) + PXL_{tex2}(x,y)$ At Block 25349, the program determines whether or not all of the x,y locations of the image have been recomposited, and if not, then the process returns to Block 25347 and repeats the pixel merging process for the next x,y image frame location. If all x,y locations in the image frame have been processed (i.e. merged), thes the program moves the merged image tex1 to the color buffer in the primary GPPL, and the process is completed for the particular image frame being generated for display.

There are various ways of and means for practicing the method of parallel graphics processing according to the present invention, illustrated in FIGS. 2A through 2E3. Fourth illustrative embodiments of the method and system of the present invention will be described in detail below. Thereafter, various system architectures for implementing the method and system of the present invention will be specified in great detail.

Overview on Different Methods of Implementing Global Depth Maps (GDMs) within the GPPLs of Parallel Graphics Processing Systems In accordance with the present invention, there are four illustrative methods of the providing a global depth map (GDM) to the Z Buffer of GPPLs of a parallel graphics processing system, in accordance with the principles of the present invention, namely: (i) a first method called "the Special GDM-Creation Pass version", wherein all Z values are distributed to all GPUs during a special single first pass (i.e. "Global Depth Map Creation Pass") performed at the beginning of each frame, so as to generate a GDM for the image frame, stored within the Z buffer of each GPPL; (ii) a second method "the Special GDM-Creation Pass, with color rendering of debuted objects in selected GPU," which is a variation of the 'GDM Creation Pass' method described above, wherein the difference is that the Global Depth Pass includes also normal color rendering of each debuted object in selected GPU, in addition to the updating of the Global Depth Map (GDM) in all GPUs.

(iii) a third method called the "Regular Course GDM Creation version", wherein the Z values of each object are distributed to their designated/assigned GPUs during the regular course of normal rendering in a graphics application; and (iv) a fourth method called the Application Provided GDM version, wherein the graphics application generates a GDM for its own purposes, e.g. for Shadow Volumes, and provides the GDM to the GPPLs for use in graphics rendering operations in accordance with the principles of the present invention.

First Illustrative Embodiment of the Method of Parallel Graphics Processing According to the Present Invention In FIG. 3A1, a first illustrative embodiment of the method of parallel graphics processing according to the present invention is shown and described as comprising three primary steps, indicated at Blocks 3111, 3112 and 3113 in FIG. 3A1.

As indicated at Block 3111, during the first special rendering pass (i.e. the GDM Creation Pass) 3111, a global depth map (GDM) is generated within each GPPL, by a process involving the broadcasting of graphics commands and data to all GPPLs equally, for pixel depth (z) testing. This first special rendering pass occurs once, for each image frame to be rendered, during the multi-pass graphics rendering method of the present invention. As will be described in greater detail hereinafter, the first special GDM creation pass indicated at Block 3111 in FIG. 3A1 employs an object tracking mechanism comprising a current state buffer 4111, 5111, and a hash table of states (4112, 5112), illustrated in FIGS. 3A3(*a*) and 3A3(*b*). The current state buffer is used to hold the current state, and is updated by draw commands and state commands. The Hash table of states is used to register the first appearance of all objects (i.e. each entry in the hash table is considered a full state of an object).

As indicated at Block 3112 in FIG. 3A1, during subsequent passes, a complementary-type partial image is generated in each GPPL using the GDM and the object-division based parallel rendering process according to the present invention.

As indicated at Block (3113), after the final pass, recompositing a complete image frame of the 3D scene using the depthless complementary image recomposition process of the present invention illustrated in FIGS. 2D3, 2E1, 2E2 and 3E3.

The First Illustrative Embodiment of the Method of the Present Invention, Carried Out on a Dual-GPU Embodiment of the Parallel Graphics Processing System of the Present Invention FIG. 3A2 illustrates the graphics pipeline activity along three primary stages of the first illustrative embodiment of the method of the present invention, carried out on a dual-GPU embodiment of the parallel graphics processing system of the present invention. During the first stage indicated at 3121, the GDM creation pass is performed and the GDM is provided within the Z buffer of each GPU. During the second stage indicated at Block 3122, multiple rendering passes are performed the partial complementary-type color images are generated in the color buffers of the Color Buffer. Then, during the third stage indicated at Block 3123, depthless compositing is performed. During this stage, decompositing of objects and load balancing is controlled by a software based decomposition module residing in the host, as will be described in greater detail hereinafter. For simplicity of explication, the following example considers the case of a parallel graphics processing system employing only two GPUs, however it can be extended to any number of GPUs.

As shown, the first stage at Block 3121 involves, during the special rendering pass (i.e. GDM creating pass), providing a Global Depth Map (GDM) to the Z buffer of each GPPL. During this first phase of the method, graphics commands and data are transmitted to all GPPLs (i.e. equally broadcasted to both GPUs) for all objects in the frame of the 3D scene to be rendered, as indicated by the broken-line arrows. The goal is performing the Z-test on all objects and populating the Z-buffer (3126) in each GPU without any drawing into the color buffer. The final result of this pass is the GDM stored in Z-buffer, as a reference for all Z-tests in the subsequent passes.

When carrying out the method of the present invention, each entry of the Hash Table (3132) in FIG. 3A3 holds the state of a primitive (object), which is not assigned to any GPU, for tracking the "appearance(s)" of object primitives. The Current State Buffer (3131) is provided for storing a draw command.

As used herein, the term primitive object, or simple "object", is a group of one or more primitive graphics elements, drawn by a single draw call. A primitive graphics element generally refers to a basic shape, such as point, line, or triangle. The appearance of the object is defined by the state of the object, that includes information on its vertex array, index array, vertex shader parameters, pixel shader parameters, transformation matrix, skinning transformation matrix, and state parameters (e.g. RenderState-blending related, SamplerState-filter, etc.). The entire state defines the exact appearance of the object in the scene. For example, the same character (e.g. soldier), geometrically defined by given vertex and index buffers, can appear in a graphics game several times in various locations and forms by just modifying its transformation matrix, i.e. modifying its state.

The state of an object is shaped by two commands: the State command, and the Draw Primitive command. The current state of an object is an accumulation of these two commands. The appearance of an object in the stream of geometric data is considered as a first appearance (or debut), only if this exact state did not occur (i.e. happen) before in the system. An additional appearance of an object is considered a successive appearance if, and only if, it appears in exactly the same state as it had before. A modified state creates another first appearance of object.

This first pass creates global depth maps (GDMs) in all GPUs by delivering the depth value of each object to the Z buffers. The depth value of an object is registered in the global depth map (GDM) for only the first appearance of an object. Therefore, during this first GDM creation pass where no color rendering occurs (i.e. writing into the Color FB is disabled), all draw commands are scanned for the first appearance of each object, which is represented by the current State Buffer (4111). While the State Buffer is being registered in an entry of the Hash Table (4112), the object is sent to all GPUs for Z-testing and updating of the Global Depth Map in Z-buffers. Writing into the color FB is disabled. Upon completion of this pass of objects' debuts all GPUs hold global depth map. The successive passes keep behaving according to the original application's schedule.

As indicated at Block 3122, the second stage involves, during subsequent passes, generating complementary-type partial images within the color buffer of each GPPL. This step involves using the GDM and the Z Test Filter in each GPU, and transmitting graphics commands and data to only assigned GPPLs, as indicated by the solid-line arrows. During such subsequent rendering passes, the scene is decomposed between GPUs. The exact decomposition of objects may change from pass to pass, according to dynamic load balance considerations. Each GPU renders incoming objects (3128) into its Color Buffer (3130), using the graphics commands and data associated with the objects, while z-testing the pixel depth values of each object against the GDM stored in the Z-buffer 3129.

As indicated at Block 3123, the third or last phase involves recompositing a complete image frame within the primary GPPL (i.e. GPU1), from the complementary-type partial images stored in the color buffers of GPPL1 and GPPL2, using the depthless recomposition process of the present invention, described hereinabove. This depthless recompositing process involves moving the complementary partial image in the secondary color buffer, into the primary color buffer of GPU1 and merging these partial images in accordance with the principles of the present invention, and then displaying the partial image fragments.

The First Illustrative Embodiment of the Method of Parallel Graphics Processing According to the Present Invention FIG. 3A4 illustrates the first illustrative embodiment of the method of parallel graphics processing according to the present invention depicted in FIG. 3A1. In this illustrative embodiment, the single specialized GDM creation pass is carried out in the Block 3121. Thereafter, during subsequent passes, the pixels of objects, assigned to a GPPL, are normally rendered in color within the GPPL by the steps indicated at Blocks 3122. Then, by way of the steps within Block 3123, the partial color complementary-type images are recomposited within the primary GPU, then the fully composited image within the primary GPU is displayed on the display device. The details of this process will now be described with reference to FIG. 3A4.

During the Blocks 31401 through 31412, the extra pass, called Global Depth Pass, is performed so as to create the GDM in all GPUs. As indicated in FIG. 3A4, the first Block 3121 in FIG. 3A1 is realized by Blocks 31401 through 31412.

As indicated at Block 31401, the pass starts by initializing the color buffers with black color values and scanning all the graphics commands for the frame to be rendered from the 3D scene, from a specified viewing direction. At Block 31402, the CPU analyzes the stream of commands associated with the image frame to be rendered, and when the end of the command stream is detected, the process moves to the multi-pass rendering stage 3122, and while the end of the command stream is not detected, then the process proceeds to Block 31403. When a 'State command' is encountered at Block 4203, it is used to update (4204) the current state buffer (4111). When a 'Draw primitive' command is found at Block 4205, the current state of the object is updated in the state buffer at Block at 31406, and the Hash Table is scanned at Block 31407 for the appearance of the object. The object can be found in the Hash Table only if this is not its first appearance. In this case, the object is abandoned and the command stream examination resumes. If the current state is not in the Hash Table, the object's state in the Hash Table is updated at Block 31408. Then, at Block 31409, the "Disable Write" command is generated to the Color Frame Buffer (FB), and at Block 31410, the Disable Write command is sent to all GPUs. Then, at Block 31411, the Draw Primitive Command is broadcasted to all GPUs, and then at Block 31412, the object is colorlessly rendered in all GPUs (i.e. in black, which was the initialized color set at Block 31401). The result is an update of object's depth in the Global Depth Map in all GPUs, while the color Frame Buffer remains clear.

Upon completion of the Global Depth Pass, all the Z-buffers hold a complete Global Depth Map (GDM) based on depth values of all objects in the frame. From this point forward during the method, the GDM is used as a common reference for depth or z value testing.

When the end of the command stream is detected at Block 31402, the stream of commands is now scanned from the beginning, as indicated at Block 31415. Upon detection of a drawing command at 4215, objects are distributed among GPUs based on any possible scheme of load balance. At this step, there is no need to check with Hash Table. For every Draw Command, a load balance is calculated at Block 4216, and a GPU is chosen for the object. At Block 4218, finally the object is normally rendered in that GPU. The above sequence repeats for any number of passes required to render the frame.

The next step, at Block 31418, involves making hierarchical merges of the partial complementary-type images in all GPU color buffers. For a number of GPUs greater than two, the recomposition process starts from partial merges among GPUs, in a hierarchical way), finalizing by final merge in primary GPU. Specifically, at Block 31419, the final merge of partial complementary images occurs in the color buffer of the primary GPU. Then at Block 31420, transparent objects (e.g. flames) and overlays (e.g. scores in computer games) are rendered in the primary GPU on top of composited color buffer, by the graphics-based application. Finally, at Block 31421, the image is moved out to the display unit.

Second Illustrative Embodiment of the Method of Parallel Graphics Processing According to the Present Invention FIG. 3B1 is a high-level flow chart illustrating a second illustrative embodiment of the method of parallel graphics processing according to the present invention. This method is a variation of the 'GDM Creation Pass' method described above, wherein the difference is that the Global Depth Pass includes also normal color rendering of each debuted object in selected GPU, in addition to the updating of the Global Depth Map (GDM) in all GPUs.

As indicated at Block 3211, a first special rendering pass (i.e. GDM Creation Pass) involves (i) generating a global depth map (GDM) within each GPPL, by broadcasting graphics commands and data for all objects to all GPPLs, (ii) rendering without color (i.e. in black) the pixels of objects sent to non-assigned GPPLs, and (iii) rendering in color the pixels of all objects sent to assigned-GPPLs.

As indicated at Block 3B1, during subsequent passes, the method continues by generating complementary-type partial images in each GPPL using the GDM and the object-division based parallel rendering process according to the present invention.

As indicated at Block 3213, after the final rendering pass, the method concludes by recompositing a complete image frame of the 3D scene using the depthless complementary image recomposition process of the present invention, illustrated in FIGS. 2D3, 2E1, 2E2 and 3E3.

Second Illustrative Embodiment of the Method of the Present Invention, Carried Out on a Dual-GPU Embodiment of the Parallel Graphics Processing System of the Present Invention FIG. 3B2 is a schematic representation illustrating the three primary stages of the second illustrative embodiment of the multi-pass parallel graphics processing method of present invention, carried out on a dual-GPU embodiment of the parallel graphics processing system of the present invention. For clarity of illustration, the following specification addresses the case of using only two GPUs, however, it is understood that the method it can be practiced on a parallel graphics processing system supporting any number of GPUs. Within the system, de-compositing of objects and load balancing is controlled by the software based Decomposition module residing in the host system.

The first stage indicated at Block 3221 involves, during a first special pass (i.e. GDM creating pass), (i) generating a global depth map (GDM) within each GPPL, by broadcasting graphics commands and data for all objects to all GPPLs indicated by solid-line and broken-line arrows, (ii) rendering without color (i.e. in black) the pixels of objects sent to non-assigned GPPLs indicated by the dotted-line arrows, and (iii) rendering in color the pixels of all objects sent to assigned-GPPLs indicated by solid-line arrows.

During the first special GDM creation pass represented at Block 3121 in FIG. 3B2, all objects of the scene are delivered to each GPU. During this stage, the objects are separated into two classes: objects that are assigned to the GPU indicated by black arrows, and objects that are not assigned to the GPU indicated by broken-line arrows (i.e. assigned to other GPUs). The Z-test is performed equally on both classes of objects, while drawing to the color buffer is done selectively. Z-buffer is populated by z-tested depth values of all fragments, for assigned objects as well as non-assigned objects. The partial image fragments of assigned objects are drawing in within the color buffer, whereas partial image fragments of non-assigned fragments are drawn without color (black). The final result of this rendering pass is that (i) the Z Buffer of each GPU holds a GDM in its final state, whereas (ii) the Color Buffer of each GPU holds a complementary-type partial color image in its preliminary state.

The second stage indicated at Block 3222 involves performing multiple rendering passes, wherein during each subsequent rendering pass, a complementary-type partial images is generated within the color buffer of each GPPL using the GDM and the Z Test Filter, and transmitting graphics commands and data to only assigned GPPLs indicated by solid-line arrows. During each such rendering pass, the objects of the scene are decomposed between GPUs. The exact decomposition of objects may change from rendering pass to rendering pass, according to dynamic load balance considerations. Each GPU renders its incoming objects into color buffer, while performing z-test against the GDM in its Z-buffer.

The third stage indicated at Block 3223 is a stage of depthless recomposition, wherein, after the final rendering pass, a complete image frame is recomposited within the primary GPPL. This stage is performed using the complementary-type partial images stored in the color buffers of GPPL1 and GPPL2, and the depthless recomposition process of the present invention. During the recomposition process, all of the images in the frame buffers of the GPUs are scanned, pixel by pixel, and at each x,y coordinate, the color value of all GPUs are summed up and the result $PXL_{final}(x,y)$ (from GPU2) is moved to the x,y of the final image in the primary image buffer (i.e. GPU1). The final image is completed when all pixels are scanned. In a merging process involving only a single pair of GPPLs, as illustrated in FIG. 3B2, the addition of all pixels of source (tex2) and target (tex1) images occurs in the target GPPL (i.e. GPU1), by means of its pixel shader processor, running the shader's merge code. The merge result remains in the target GPPL, which may become a source for the next hierarchical step. In the case of the 2 GPU platform, GPU1 is the target GPPL, and the composited image in its color buffer are moved to the display device for display.

The Second Illustrative Embodiment of the Method of Parallel Graphics Processing According to the Present Invention FIGS. 3B4A and 3B4B illustrate the steps performed during the second illustrative embodiment of the method of parallel graphics processing according to the present invention depicted in FIG. 3B1. In this illustrative embodiment, the pixels of objects assigned to a GPPL are normally rendered in color within the GPPL, while pixels of objects not assigned to a GPPL are rendered colorlessly (i.e. in black).

The methods of FIGS. 3B4A and 3B4B differ from the method of FIG. 3A4, in that during the GDM Creation Pass, indicated at Block 3221, debuted objects are normally rendered in color in the color buffer of the selected GPU, in addition to the Global Depth Map (GDM) being updated in the Z buffers of all GPUs. These differences will become more apparent hereinafter.

As indicated at Block 32401 in FIGS. 3B4A and 3B4B, during the Blocks 31401 through 31412, the extra pass, called Global Depth Pass, is performed so as to create the GDM in all GPUs. As indicated in FIG. 3A4, the first Block 3121 in FIG. 3A1 is realized by Blocks 31401 through 31412.

As indicated at Block 31401, the pass starts by (initializing the color buffers with colorless values and) scanning all the graphics commands for the frame to be rendered from the 3D scene, from a specified viewing direction. At Block 31402, the CPU analyzes the stream of commands associated with the image frame to be rendered, and when the end of the command stream is detected, the process moves to the multi-pass rendering stage 3222, and while the end of the command stream is not detected, then the process proceeds to Block 31403. When a 'State command' is encountered at Block 4203, it is used to update (4204) the current state buffer (4111). When a 'Draw primitive' command is found at Block 4205, the current state of the object is updated in the state buffer at Block at 31406, and the Hash Table is scanned at Block 31407 for the appearance of the object. The object can be found in the Hash Table only if this is not its first appearance. In this case, the object is abandoned and the command stream examination resumes. If the current state is not in the Hash Table, the object's state in the Hash Table is updated at Block 31408. Then, at Block 31409, the load balance among the GPUs is calculated, the GPU selected, Upon updating the Hash Table at Block 32408, a GPU is chosen according to any selected load balance scheme. In addition, the object is marked in the 'Drawn' list of debut objects (4309). This list assists to eliminate redundant drawings of objects that have been drawn the first time during the Global Depth Pass. A marked object will be cleared from the list in successive passes, the first time it is called for rendering. This call will be skipped while its entry in the list cleaned up. The object is then sent for normal color rendering to the designated GPU (4310).

As indicated at Block 32414, the next step of the method involves broadcasting the object to the rest of GPUs for Global Depth Map (GDM) update in Z buffers, and for drawing visible pixels in black into the color frame buffers. For this purpose, the current pixel shader program is adapted in these GPUs, for the alpha status of drawn object. Namely, whether the object is to be drawn with transparencies (alpha) or without. Therefore, according to the status of an object's alpha test, determined at Block 4314, there are two possible modifications which are made to the pixel shader: (i) a modification of the pixel shader for an opaque (i.e. black) object indicated at Block 32415; and (ii) a modification of the pixel shader for semi-transparent object, indicated at Block 32416. After modification of the pixel shaders in the GPUs, the draw command for the object is broadcasted to all GPUs (except of the designated GPU), for the purpose of black rendering, as indicated at Block 3211. Then as indicated at Block 32413, the original shaders in the GPUs are restored for regular color rendering.

Upon completion of the Global Depth Pass, all the Z-buffers in GPUs hold a complete Global Depth Map (GDM) for the image frame, based on depth values of all objects in the frame. This map is used as a common reference for depth tests performed in all successive rendering passes carried out in the multi-pass stage indicated at Block 3222.

As indicated at Block 32419, the stream of commands is then scanned from the beginning for successive rendering passes. At Block 32420, the end of drawing passes is determined by determining when the end of the graphics command stream occurs. When a Draw command is encountered at Block 32421, a search in 'list of debuted objects' is performed at Block 32423, by determining whether the object is marked in the "Drawn" List. If the object is found in the List, then the entry in the List is cleared a Block 32422, and rendering is skipped, and next Draw command in the line is handled. Otherwise, at Block 32424, a GPU is chosen according to load balance considerations. At Block 32425, the object commands is sent to the designated GPU for normal color rendering, and then the object is normally rendered in that GPU. The above sequence repeats for any number of passes required to render the frame.

The next step, at Block 32430, involves making hierarchical merges of the partial complementary-type images in all GPU color buffers. For a number of GPUs greater than two, the recomposition process starts from partial merges among GPUs, in a hierarchical way), finalizing by final merge in primary GPU. Specifically, at Block 31431, the final merge of partial complementary images occurs in the color buffer of the primary GPU. Then at Block 31422, transparent objects (e.g. flames) and overlays (e.g. scores in computer games) are rendered in the primary GPU on top of composited color buffer, by the graphics-based application. Finally, at Block 32433, the image is moved out to the display unit.

Third Illustrative Embodiment of the Method of Parallel Graphics Processing According to the Present Invention FIG. 4A describes the third illustrative embodiment of the multi-pass parallel graphics processing method of present invention, carried out on a parallel graphics processing system of the present invention.

As indicated at Block 411, the Global Depth Maps (GDMs) are generated in each of the GPUs during the regular course of a graphics application, instead of during an extra special pass (i.e. processing step) performed during the beginning of image frame processing. During each pass of the multi-pass rendering method, (i) global depth map (GDM) values are generated for each debuted object transmitted to each GPPL, (ii) the pixels of objects sent to non-assigned GPPLs are rendered without color (i.e. in black), and (iii) the pixels of all objects sent to assigned-GPPLs are rendered in color, thereby generating complementary-type partial images in each GPPL using the GDM.

As indicated at Block 412, after the final pass, a complete image frame of the 3D scene is recomposited using the depthless complementary image recomposition process illustrated in FIGS. 2D3, 2E1, 2E2 and 3E3.

The Method of the Present Invention, Carried Out on a Dual-GPU Embodiment of the Parallel Graphics Processing System of the Present Invention FIG. 4B illustrates the two primary stages of the third illustrative embodiment of the multi-pass parallel graphics processing method of the present invention, carried out on a dual-GPU embodiment of the parallel graphics processing system of the present invention.

As indicated at Block 421, the first multi-pass rendering stage involves (i) during each pass of the multi-pass method, generating global depth map (GDM) values for each debuted object transmitted to each GPPL indicated by solid-line arrows, (ii) rendering without color (i.e. in black) the pixels of objects sent to non-assigned GPPLs indicated in dotted-line arrows, and (iii), rendering in color the pixels of all objects sent to assigned-GPPLs indicated by broken-line arrows. In the illustrative embodiments, re-compositing of objects and load balancing are controlled by a software-based Decomposition module residing in the host.

This stage of multi-pass rendering includes the generation of the GDM as part of its regular multi-pass rendering process. Decomposed geometric data is sent to assigned or designated GPUs. However, any debuted object is also sent once to all other GPUs so that the object contributes its z value share to the GDM under development within the Z buffer. In each GPU, the GDM is generated as follows: GDM values are generated for each debuted object and transmitted to each GPU, while; (i) for objects sent to non-assigned GPUs indicated by broken-line arrows, their pixels are normally z-tested, their depth values are stored in the z-buffer while their fragments are rendered colorlessly in the color buffer; and (ii) for objects sent to assigned-GPUs indicated by solid-line arrows, their pixels are normally z-tested, their depth values are stored in z-buffer and their fragments are rendered in color. For simplicity of explication, the illustrative embodiment employs only two GPUs, although it is understood, that any number of GPUs can be supported on the parallel graphics processing platform of the present invention.

As indicated at Block 422, the second depthless compositing stage involves, after the final pass, recompositing a complete image frame within the primary GPPL, from the complementary-type partial images stored in the color buffers of GPPL1 and GPPL2, using the depthless recomposition process of the present invention. Thereafter, the completely composite image is moved from the primary GPU to the display device for display.

Third Illustrative Embodiment of the Method of Parallel Graphics Processing According to the Present Invention Depicted in FIG. 4A FIGS. 4D1 and 4D2 illustrate the steps performed during the third illustrative embodiment of the method of parallel graphics processing according to the present invention depicted in FIG. 4A, In this illustrative embodiment, the pixels of objects assigned to a GPPL are normally rendered in color within the GPPL while pixels of objects not assigned to a GPPL are rendered colorlessly (i.e. in black), while their contribution to the global depth map (GDM) for the frame, are generated for each debuted object transmitted to each GPPL.

As illustrated in FIG. 4C, the current state of an object is kept updated in a "current state" buffer 431. At the debut of an object, this buffer is copied into the Hash Table 432. However, in contrast to the case of Global Depth Map Creation (GDM) Pass algorithm of FIG. 3A2, the state record of each object in the algorithm of FIG. 4C also includes the GPU number/index. The object is designated/assigned to the GPU for processing based on load balancing considerations, for all rendering passes.

As indicated at Block 4401, the process begins by scanning the graphics commands in a given frame of a 3D scene to be rendered for display. At Block 4402, determination of the end of the graphics command stream for the frame is monitored. When the end of the command stream is detected, process control moves to Block 422, involving partial image recompositing, in accordance with the principles of the present invention. The monitoring of state commands occurs at Block 4403, and the monitoring of Primitive Draw commands occurs at Block 4405, while current object state updating occurs at Block 4406, and current list updating occurs at Block 4404.

As indicated at Block 4406, the Current State Buffer 431 is updated by two classes of commands; State commands and Draw Primitive command. The detection of State command is followed by updating the State Buffer. The Draw Primitive command initiates the process of drawing primitive. First, the primitive must be examined for its debut appearance. This is done by scanning the Hash Table 432 for the current state of a Draw Command (of an object). If the state of the object is found in the hash table, along with the designation of its GPU, this means that this object has appeared before for processing, and has been rendered within the GPUs according to the principles of the present invention. In such a case, the load balance is updated (distinguished from calculation of load balance, which is done only for the debut of an object), and the object is sent its designated GPU for rendering. Otherwise, GPU is selected for load balance considerations, Hash Table is updated, and the object (draw command) is sent to the designated GPU for normal/regular rendering.

As indicated at Block 4407, every incoming "Draw Primitive" command for an object is subject to the "first appearance test" which involves the matching of the Current State Buffer 431 to the Hash Table 432, illustrated in FIG. 4C. If a match is found to exist therebetween at Block 4407, then the object is sent to the designated GPU, and load balancing is updated at Block 4408.

However, if a match is not found to exist therebetween at Block 4407, then at Block 4424, load balance calculations are performed, and the GPU selected/designated, and at Block 4425, the Hash Table is updated by creating a new entry for the Current State Buffer in the Hash Table. At Block 4426, the Draw Command for the object is sent to the selected designated/assigned GPU, for normal color rendering. At the same time, the Draw Command for the object is simultaneously broadcasted to all other non-designated/assigned GPUs for (i) updating the global map (GDM) values in their Z buffers, and (ii) drawing black pixels of the object's shilolette in the color frame buffers (FBs) of these GPUs, by performing: alpha testing as indicated at Block 4428; required pixel shader modification as indicated at Blocks 4427 and 4429; black rendering in the color buffers of the rest of the GPUs, using the Draw Primitive command as indicated at Block 4430; rendering the object in the rest of the GPUs as indicated at Block 4431; and restoring the pixel shaders in each GPU to their original state as indicated at Block 4432 for normal/regular rendering at Block 4426.

At Blocks 4420 through 4423, the recomposition process is described in detail. Notably, the process is identical to the process described above at Blocks 32430 through 32433. Specifically, at Block 4420, involves making hierarchical merges of the partial complementary-type images in all GPU color buffers. For a number of GPUs greater than two, the recomposition process starts from partial merges among GPUs, in a hierarchical way), finalizing by final merge in primary GPU. Specifically, at Block 4421, the final merge of partial complementary images occurs in the color buffer of the primary GPU. Then at Block 4422, transparent objects (e.g. flames) and overlays (e.g. scores in computer games) are rendered in the primary GPU on top of composited color buffer, by the graphics-based application. Finally, at Block 4423, the image is moved out to the display unit.

Fourth Illustrative Embodiment of the Method of Parallel Graphics Processing According to the Present Invention FIG. 5A describes a fourth illustrative embodiment of the multi-pass method of parallel graphics processing according to the present invention. This illustrative embodiment of the method of the present invention is based on taking advantage of the GDM generated by a graphics application, and is intended to work only in a graphics application that generates a GDM for its own purposes at the beginning of each frame (e.g. for Shadow Volumes based graphics applications originally intended for single GPU-based systems). In each frame of Shadow Volume based graphics applications, the first pass (termed Ambient Light pass) generates a depth map in the Z-buffer for all image fragments that are visible from the view point. All visible fragments in color buffer are homogenously dim colored during this pass. According to the parallelization strategy of present invention, this depth map, which was originally intended for single GPU, is simultaneously generated in all GPUs, and used as a GDM according to the principles of the present invention. Moreover, the homogenously dim color buffer serves to prevent the obstructed object from appearing in the image: the obstructing objects of all GPUs are drawn as a colorless silhouette of the object in the color FB, as described hereinabove. The details regarding the Application Provided GDM algorithm of the present invention are described in the flowcharts of FIGS. 5D1 and 5D2.

As indicated at Block 511 in FIG. 5A, during a first special Ambient Light Pass of the multi-pass method, a global depth map (GDM) is generated within each GPPL by broadcasting all objects to all GPPLs for depth map creation in the Z buffers and colorless image creation within the color buffers.

As indicated at Block 512 in FIG. 5A, during subsequent passes, complementary-type partial images are generated in each GPPL using the GDM and the object-division based parallel rendering process according to the present invention (i.e. rendering without color (i.e. in black) the pixels of objects sent to non-assigned GPPLs, and rendering in color the pixels of all objects sent to assigned-GPPLs).

As indicated at Block 513 in FIG. 5A, after the final pass, a complete image frame of the 3D scene is recomposited using the depthless complementary image recomposition process of the present invention illustrated in FIGS. 2D3, 2E1, 2E2 and 3E3.

Fourth Illustrative Embodiment of the Method of the Present Invention, Carried Out on a Dual-GPU Embodiment of the Parallel Graphics Processing System of the Present Invention FIG. 5B is a schematic representation illustrating the three primary stages of the fourth illustrative embodiment of the method of the present invention, carried out on a dual-GPU embodiment of the parallel graphics processing system of the present invention. As shown, de-compositing of objects and load balancing is controlled by the software based Decomposition module residing in the host. For simplicity illustration, the following embodiment considers a graphics processing platform having only two GPUs. However, it is understood that any number of GPUs may be supported on the platform to carry out the method.

As indicated at Block 521 in FIG. 5B, during a first special Ambient Light Pass of the multi-pass method, as part of Shadow Volume algorithm, a global depth map (GDM) is generated within each GPPL by broadcasting all objects to all GPPLs for depth map creation in the Z buffers and colorless image creation within the color buffers. Within each GPU, the objects are rendered, the pixels are z-tested and their depth values are stored into the z-buffer creating the GDM. Color buffers are disabled (or alternatively rendered colorlessly, depending on application).

As indicated at Block 522 in FIG. 5B, during subsequent rendering passes, complementary-type partial images are generated in each GPPL using the GDM and the object-division based parallel rendering process according to the present invention (i.e. rendering without color (i.e. in black) the pixels of objects sent to non-assigned GPPLs, and rendering in color the pixels of all objects sent to assigned-GPPLs, indicated in solid-line arrows). During such subsequent rendering passes, the scene is decomposed between GPUs, and each GPU is delivered its assigned objects. The exact decomposition of objects may change from pass to pass, according to dynamic load balance considerations. Each GPU renders its objects into color buffer, while performing z-test against the GDM in Z-buffer.

As indicated at Block 523 in FIG. 5B, after the final pass, a complete image frame of the 3D scene is recomposited by merging the complementary-type partial images stored in the color buffers of GPPL1 and GPPL2 using the depthless complementary image recomposition process of the present invention illustrated in FIGS. 3D3, 2E1, 2E2 and 3E3. Thereafter, the complete image in the primary GPU is displayed on the display device.

Fourth Illustrative Embodiment of the Method of Parallel Graphics Processing According to the Present Invention Depicted in FIG. 4A

FIGS. 5D1 and 5D2 are flowcharts illustrating the steps performed during the fourth illustrative embodiment of the method of parallel graphics processing according to the present invention depicted in FIG. 4A, wherein the pixels of objects assigned to a GPPL are normally rendered in color within the GPPL while pixels of objects not assigned to a GPPL are rendered colorlessly (i.e. in black).

As indicated at Block 5401 in FIGS. 5D1 and 5D2, the Ambient Light pass is made in all GPUs, generating a GDM in the z-buffers, and "black" rendering objects in the color buffers.

Blocks 5402 through 5417 constitute the light source pass, repeating for all light sources of the scene. For simplicity, only one occluder is considered per each light source. At Block 5402, the number of light sources in the 3D scene is monitored, and when all light sources have been rendered, then process control moves to Block 5420 in Stage 523.

As indicated at Block 5403, according to the prior art Shadow Volume algorithm, for the next light source, each occluding object ("occluder"), a shadow volume is calculated.

As indicated at Block 5404, front face and back face of the shadow volume are compared to the GDM to generate a shadow volume stencil, which is registered in the stencil buffer.

From Blocks 5405 through 5417, all objects of the scene are rendered for shadows in accordance with the stencil.

As indicated at Block 5408, the command stream is scanned looking for state commands for updating state buffer, and for draw commands at Block 5409.

At Block 5410, upon the occurrence of a draw command of an object, the current state buffer is updated.

At Block 5411, the presence of the current state is checked in the Hash Table. If the current state is in not present in the Hash Table, then load balance is calculated and the GPU selected for the draw command.

At Block 5415, the Hash Table is updated, and at Block 5416, the Draw Command is sent to the designated GPU for normal rendering. A debut object must be assigned to GPU in accordance with load balance considerations at Block 5314, registered in Hash Table as indicated at Block 5315, and sent for rendering in designated GPU as indicated at Block 5316 and 5317.

If at Block 5411 the current state is in the Hash Table (i.e. the object is a repeat object), then the designated GPU is tracked in the Hash Table for its allocated GPU at Block 5412, and at Block 5413, the Draw Command is sent to the designated GPU, and then advances to Block 5417, where the object is rendered in the designated GPU, and then returns to Block 5406.

When Block 5402 determines that all light rendering passes are completed, then the hierarchical merge of color buffers in the GPUs is performed at Block 5420 in Stage 523.

As indicated at Block 5421, the final/complete image frame is composited in the primary GPU.

At Block 5422, overlays and transparent object are rendered in the primary GPU, and at Block 5423, the final image in the primary GPU is displayed on the display device.

PC-Based Host Computing System of the Present Invention Embodying an Illustrative Embodiment of the Parallel 3D Graphics Processing System (PGPS) of the Present Invention The parallel 3D graphics processing system and method of the present invention can be practiced in diverse kinds of computing and micro-computing environments in which 3D graphics support is required or desired. Referring to FIGS. 6A through 6C, the parallel graphics processing system (PGPS) of the present invention will now be described in greater detail.

In FIG. 6A, there is shown a PC-based host computing system embodying an illustrative embodiment of the parallel 3D graphics processing system (PGPS) platform of the present invention, illustrated throughout FIGS. 2A through 5D. As shown, the PGPS comprises: (i) a Parallel Mode Control Module (PMCM); (ii) a Parallel Processing Subsystem for supporting the parallelization stages of decomposition, distribution and re-composition implemented using a Decomposition Module, a Distribution Module and a Re-Composition Module, respectively; and (ii) a plurality of either GPU and/or CPU based graphics processing pipelines (GPPLs) operated in a parallel manner under the control of the PMCM.

As shown, the PMCM further comprises an OS-GPU interface (I/F) and Utilities; Merge Management Module; Distribution Management Module; Distributed Graphics Function Control; and Hub Control, as described in greater detail in U.S. application Ser. No. 11/897,536 filed Aug. 30, 2007, incorporated herein by reference.

As shown, the Decomposition Module further comprises a Load Balance Submodule, and a Division Submodule, whereas the Distribution Module comprises a Distribution Management Submodule and an Interconnect Network.

Also, the Rendering Module comprises the plurality of GPPLs, whereas the Re-Composition Module comprises the Pixel Shader, the Shader Program Memory and the Video Memory (e.g. Z Buffer and Color Buffers) within each of the GPPLs cooperating over the Interconnect Network.

In FIG. 6B1, a first illustrative embodiment of a GPU-based graphics processing pipeline (GPPL) is shown for use in the PGPS of the present invention depicted in FIG. 6A. As shown, the GPPL comprises: (i) a video memory structure supporting a frame buffer (FB) including stencil, depth and color buffers, and (ii) a graphics processing unit (GPU) supporting (1) a geometry subsystem having an input assembler and a vertex shader, (2) a set up engine, and (3) a pixel subsystem including a pixel shader receiving pixel data from the frame buffer and a raster operators operating on pixel data in the frame buffers.

In FIG. 6B2, a second illustrative embodiment of a GPU-based graphics processing pipeline (GPPL) is shown for use in the PGPS of the present invention depicted in FIG. 6A. As shown, the GPPL comprises (i) a video memory structure supporting a frame buffer (FB) including stencil, depth and color buffers, and (ii) a graphics processing unit (GPU) supporting (1) a geometry subsystem having an input assembler, a vertex shader and a geometry shader, (2) a rasterizer, and (3) a pixel subsystem including a pixel shader receiving pixel data from the frame buffer and a raster operators operating on pixel data in the frame buffers.

In FIG. 6B3, an illustrative embodiment of a CPU-based graphics processing pipeline (GPPL) is shown for use in the PGPS of the present invention depicted in FIG. 6A. As shown, the GPPL comprises (i) a video memory structure supporting a frame buffer including stencil, depth and color buffers, and (ii) a graphics processing pipeline realized by one cell of a multi-core CPU chip, consisting of 16 in-order SIMD processors, and further including a GPU-specific extension, namely, a texture sampler that loads texture maps from memory, filters them for level-of-detail, and feeds to pixel processing portion of the pipeline.

In FIG. 6C, the pipelined structure of the parallel graphics processing system (PGPS) of the present invention is shown driving a plurality of GPPLs. As shown, the Decomposition Module supports the scanning of commands, the control of commands, the tracking of objects, the balancing of loads, and the assignment of objects to GPPLs. The Distribution Module supports transmission of graphics data (e.g. FB data, commands, textures, geometric data and other data) in various modes including CPU-to/from-GPU, inter-GPPL, broadcast, hub-to/from-CPU, and hub-to/from-CPU and hub-to/from-GPPL. The Re-composition Module supports the merging of partial image fragments in the Color Buffers of the GPPLs in a variety of ways, in accordance with the principles of the present invention (e.g. merge color frame buffers without z buffers, merge color buffers using stencil assisted processing, and other modes of partial image merging).

Using the Parallel Graphics Processing System of the Present Invention to Implement the Various Embodiments of the Method of Parallel Graphics Processing According to the Principles of the Present Invention The parallel graphics processing methods of the present invention, illustrated in FIGS. 2A through 5D can be practiced using diverse types of parallel computing platforms supporting a plurality or clusters of GPPLs, realized in many possible ways. However, for purposes of illustration, the four illustrative embodiments of the parallel graphics processing method of the present invention, illustrated in FIGS. 3A1 through 5D, will now be shown implemented using the architecture provided by the PGPS of the present invention shown in FIG. 6A, in which particular modules (e.g. Decomposition Module, Distribution Module, Rendering Module or Recomposition Module) are used to perform or carry out different stages and/or steps in each such parallel graphics processing method.

As shown in the flowcharts of FIGS. 7A1A and 7A1B, which correspond to the flow chart of FIG. 3A4, the modules in the system of FIG. 6A perform the following method steps: (i) the Decomposition Module carries out Blocks 3140 through 31409 and Blocks 31414 and 31416 in the methods of FIGS. 7A1A and 7A1B; (ii) the Distribution Module carries out Blocks 31410 through 31411 and Blocks 31417 and 31418 in the methods of FIGS. 7A1A and 7A1B; (iii) the Rendering Module carries out Blocks 31412 and Blocks 31420 through 31421 in the methods of FIGS. 7A1A and 7A1B; and (iv) Recomposition Module carries out Block 31419 in FIGS. 7A1A and 7A1B.

In FIG. 7A2, the Decomposition and Distribution Modules are shown implemented within the host memory space (HMS), whereas the Rendering and Recomposition Modules are implemented by the GPUs.

As shown in the flowcharts of FIGS. 7B1A and 7B1B, which correspond to the flow charts of FIGS. 3B4A and 3B4B, the modules in the system of FIG. 6A perform the following method steps: (i) the Decomposition Module carries out Blocks 32401 through 32409, Blocks 32415 through 32416, Block 32413, and Blocks 32419 through 32424 in the methods of FIGS. 7B1A and 7B1B; (ii) the Distribution Module carries out Blocks 32425 through 32430 in the methods of FIGS. 7B1A and 7B1B; (iii) the Rendering Module carries out Blocks 32410,32411, and Blocks 32432 and 32433 in the methods of FIGS. 7B1A and 7B1B; and (iv) Recomposition Module carries out Block 32431 in FIGS. 7B1A and 7B1B.

In FIG. 7B2, the Decomposition and Distribution Modules are shown implemented within the host memory space (HMS), whereas the Rendering and Recomposition Modules are implemented by the GPUs.

As shown in the flowcharts of FIGS. 7C1A and 7C1B, which corresponds to the flow chart of FIG. 3A4, the modules in the system of FIG. 6A perform the following method steps: (i) the Decomposition Module carries out Blocks 4401 through 4408, Blocks 4420 and 4421, Blocks 4424 and 4425, and Blocks 4427 through 4429 in the methods of FIGS. 7C1A and 7C1B; (ii) the Distribution Module carries out Blocks 4409, 4426 and 4430 in the methods of FIGS. 7C1A and 7C1B; (iii) the Rendering Module carries out Blocks 4410, Blocks 4422 and 4423 and Block 4431 in the methods of FIGS. 7C1A and 7C1B; and (iv) Recomposition Module carries out Block 4432 in FIGS. 7C1A and 7C1B.

In FIG. 7C2, the Decomposition and Distribution Modules are shown implemented within the host memory space (HMS), whereas the Rendering and Recomposition Modules are implemented by the GPUs.

As shown in the flowcharts of FIGS. 7D1A and 7D1B, which correspond to the flowcharts of FIGS. 5D1 and 5D2, the modules in the system of FIG. 6A perform the following method steps: (i) the Decompostion Module carries out Blocks 5405 through 5412, and Blocks 5414 and 5415 in the methods of FIGS. 7D1A and 7D1B; (ii) the Distribution Module carries out Blocks 5413 and 5416 in the methods of FIGS. 7D1A and 7D1B; (iii) the Rendering Module carries out Blocks 5401 through 5404, Blocks 5417, and 5422 and 5423 in the methods of FIGS. 7D1A and 7D1B; and (iv) Recomposition Module carries out Block 5420 and 5421 in FIGS. 7D1A and 7D1B.

In FIG. 7D2, the Decomposition and Distribution Modules are shown implemented within the host memory space (HMS), whereas the Rendering and Recomposition Modules are implemented by the GPUs.

The First Illustrative Embodiment of the Parallel Graphic Processing System (PGPS) of the Present Invention FIG. 8A shows a first illustrative embodiment of the PGPS of the present invention embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8A, the Parallel Mode Control Module (PMCM) 8201 and the Decomposition Module 8202 and Distribution Module 8203 of the Parallel Graphics Processing Subsystem resides as a software package in the Host Memory Space (HMS) 8200 of the CPU 8210. Also, the Vendor's GPU drivers 8223 also reside on HMS 8200, along with the Graphics Applications 8221, and the Standard Graphics Library 8222. As shown, the multiple GPUs on external GPU cards are (i) connected to a North bridge circuit on a motherboard, (ii) implement the Rendering and Recomposition Modules, and (iii) driven in a parallelized manner under the control of the PMCM.

During system operation, the Decomposition Module divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module uses the North bridge circuit to distribute graphic commands and data (GCAD) to the external GPUs. The Rendering Module generates complementary-type partial color images according to the parallel multi-pass graphics processing method of the present invention being used, e.g. as illustrated in FIGS. 7A through 7D. The Recomposition Module uses inter-GPU communication transport (e.g. via an Interconnect Network) to transfer the pixel data of the complementary-type partial images among the GPUs during the image recomposition stages. Finally, complementary-type partial color images are recomposited using the depthless image merging process of the present invention, described in great detail above, so as to generate a complete image frame of the 3D scene for display on the display device, connected to an external graphics card via a PCI-express interface.

The Second Illustrative Embodiment of the Parallel Graphic Processing System (PGPS) of the Present Invention FIG. 8B shows a second illustrative embodiment of the PGPS of the present invention embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8B, the Parallel Mode Control Module (PMCM) 8201 and the Decomposition Module 8202 and Distribution Module 8203 of the Parallel Graphics Processing Subsystem reside as a software package in the Host Memory Space (HMS) 820 of the CPU. Also, the Vendor's GPU drivers 8223 reside on HMS 8200, along with the Graphics Applications 8221, and the Standard Graphics Library 8222. As shown, the Rendering and Recomposition Modules are realized across multiple GPUs connected to a bridge circuit on a motherboard (and having an internal IGD) and driven in a parallelized manner under the control of the PMCM.

During system operation, the Decomposition Module divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. Distribution Module uses the North bridge chip to distribute the graphic commands and data (GCAD) to the multiple GPUs located on the external graphics cards. The Rendering Module generates complementary-type partial color images according to the multi-pass parallel graphics processing method of the present invention being used, e.g. as illustrated in FIGS. 7A through 7D. The Recomposition Module uses inter-GPU communication transport to transfer the pixel data of the complementary-type partial images among the GPUs during the image recomposition stages. Finally, the complementary-type partial color images are recomposited using the depthless image merging process of the present invention so as to generate a complete image frame of the 3D scene for display on the display device, connected to one of the external graphics cards or the IGD.

The Third Illustrative Embodiment of the Parallel Graphic Processing System (PGPS) of the Present Invention FIG. 8C shows a third illustrative embodiment of the PGPS of the present invention embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8C, the Parallel Mode Control Module (PMCM) 8201, the Decomposition Module 8202 and the Distribution Module 8203 of the Parallel Graphics Processing Subsystem reside as a software package in the Host Memory Space (HMS) 8200. The Vendor's GPU drivers 8223 also reside on HMS 8200, along with the Graphics Applications 8221, and the Standard Graphics Library 8222. As shown, a single GPU is supported on a CPU/GPU fusion-architecture processor die (alongside the CPU), and one or more GPUs are supported on one or more external graphic cards connected to a bridge circuit, and driven in a parallelized manner under the control of the PMCM. The Rendering and Recomposition Modules are realized across the GPUs on the graphics card(s).

During system operation, the Decomposition Module divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module uses the memory controller (controlling the HMS) and the interconnect network (e.g. crossbar switch) within the CPU/GPU processor chip to distribute graphic commands and data to the multiple GPUs on the CPU/GPU die chip and on the external graphics cards. The Rendering Module generates complementary-type partial color images according to the multi-pass parallel graphics processing method of the present invention being used, e.g. as illustrated in FIGS. 7A through 7D. The Recomposition Module uses inter-GPU communication transport on the graphics card, as well as memory controller and interconnect (e.g. crossbar switch) within the CPU/GPU processor chip, to transfer the pixel data of the complementary-type partial images among the GPUs during the image recomposition stages. Finally, the complementary-type partial color images are recomposited using the depthless image merging process of the present invention so as to generate a complete image frame of the 3D scene for display on the display device, connected to the external graphics card via a PCI-express interface connected to the bridge circuit.

The Fourth Illustrative Embodiment of the Parallel Graphic Processing System (PGPS) of the Present Invention FIG. 8D1 shows a fourth illustrative embodiment of the PGPS of the present invention, embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least three stages, namely, decomposition, distribution and recomposition a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8D1, the Parallelization Mode Control Module (PMCM) 8201, the Decomposition Module 8202 and Distribution Module 8203 of the Parallel Graphics Processing Subsystem reside as a software package in the Host Memory Space (HMS) 8200. Also, the Vendor's GPU drivers 8223 reside on HMS 8200, along with the Graphics Applications 8221, and the Standard Graphics Library 8222. As shown, a first cluster of the CPU cores on a multi-core CPU chip function as the CPU, while a second cluster of the CPU cores function as a plurality of multi-core graphics pipelines (GPPLs). As shown, the Rendering Module and the Re-composition Module are realized across a plurality of the GPUs on the external graphics cards. Some of the GPPLs implemented by the CPU cores may participate in the implementation of the Rendering and/or Recomposition Modules.

During system operation, the Decomposition Module divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module uses the bridge circuit and interconnect network within the multi-core CPU chip to distribute graphic commands and data (GCAD) to the multi-core graphic pipelines implemented on the multi-core CPU chip, as well as the GPUs on the external graphics cards. The Rendering Module generates complementary-type partial color images according to the multi-pass parallel graphics processing method of the present invention being used, e.g. as illustrated in FIGS. 7A through 7D. The Recomposition Module uses inter-GPU communication transport as well as the bridge and interconnect network within the multi-core CPU chip to transfer the pixel data of the complementary-type partial images among the GPPLs during the image recomposition stages. Finally, the complementary-type partial color images are recomposited using the depthless image merging process of the present invention so as to generate a complete image frame of the 3D scene for display on the display device connected to the primary GPPL (i.e. GPU) via a display interface.

The Fifth Illustrative Embodiment of the Parallel Graphic Processing System (PGPS) of the Present Invention FIG. 8D2 shows a fifth illustrative embodiment of the PGPS of the present invention, embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least three stages, namely, decomposition, distribution and recomposition a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8D2, the Parallelization Mode Control Module (PMCM) and the Decomposition and Distribution Modules of the Parallel Graphics Processing Subsystem reside as a software package in the Host Memory Space (HMS) of the CPU on the motherboard. The Vendor's GPU drivers also reside on HMS, along with the Graphics Applications, and the Standard Graphics Library. As shown, a first cluster of CPU cores on the multi-core CPU chips on externals graphics cards function as GPPLs and implement the Re-composition Module across a plurality of the GPPLs, whereas a second cluster of CPU cores function as GPPLs and implement the Rendering Module.

During system operation, the Decomposition Module divides (i.e. splits up) the stream of graphic commands and data (GCAD) according to the required parallelization mode. The Distribution Module uses the North bridge circuit and interconnect networks within the multi-core CPU chips (on the external cards) to distribute graphic commands and data (GCAD) to the multi-core graphic pipelines implemented thereon. The Rendering Module generates complementary-type partial color images according to a multi-pass parallel graphics processing method of the present invention. The Recomposition Module uses interconnect networks within the multi-core CPU chips to transfer the pixel data of the complementary-type partial images among the GPPLs during the image recomposition stages. Finally, the complementary-type partial color images are recomposited using the depthless image merging process of the present invention so as to generate a complete image frame of the 3D scene for display on the display device connected to the primary GPPL, via a display interface.

The Sixth Illustrative Embodiment of the Parallel Graphic Processing System (PGPS) of the Present Invention FIG. 8E shows a sixth illustrative embodiment of the MMPGRS of the present invention, embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least three stages, namely, decomposition, distribution and recomposition a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8E, the Parallel Mode Control Module (PMCM) and the Decomposition Submodule No. 1 reside as a software package in the Host or CPU Memory Space (HMS). The Vendor's GPU drivers also reside on HMS, along with the Graphics Applications, and the Standard Graphics Library. As shown, the Decomposition Submodule No. 2 and Distribution Module (including a distribution management submodule and interconnect network) are realized within a single graphics hub device (e.g. chip) that is connected to (i) the bridge circulation the motherboard, via a PCI-express interface, and (ii) a cluster of external GPUs via the interconnect network within the graphics hub chip. The GPUs are used to implement the Rendering Module and Recomposition Modules and are driven in a parallelized manner under the control of the PMCM.

During system operation, the Decomposition Submodule No. 1 transfers graphic commands and data (GCAD) to the Decomposition Submodule No. 2 via the bridge circuit. The Decomposition Submodule No. 2 divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module distributes graphic commands and data (GCAD) to the external GPUs. The Rendering Module generates complementary-type partial color images according to the multi-pass parallel graphics processing method of the present invention being used, e.g. as illustrated in FIGS. 7A through 7D. The Recomposition Module uses inter-GPU communication transport to transfer the pixel data of the complementary-type partial images among the GPUs during the image recomposition stages. Finally, the complementary-type partial color images are recomposited using the depth-less image merging process of the present invention so as to generate a complete image frame of the 3D scene for display on the display device connected to the primary GPU on the graphical display card.

The Seventh Illustrative Embodiment of the Parallel Graphic Processing System (PGPS) of the Present Invention FIG. 8F shows a seventh illustrative embodiment of the PGPS of the present invention, embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8F, the Parallel Mode Control Module (PMCM) (including the Distribution Management Submodule) and the Decomposition Module reside as a software package in the Host Memory Space (HMS) of the host computing system. The Vendor's GPU drivers also reside on HMS, along with the Graphics Applications, and the Standard Graphics Library. As shown, the Distribution Module and its interconnect transport are realized within a single "reduced" graphics hub device (e.g. chip) that is connected to the bridge circuit of the host computing system, and a cluster of external GPUs implementing the Rendering and Recomposition Modules, and are driven in a parallelized manner under the control of the PMCM.

During system operation, the Decomposition Module divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Management Module within the PMCM distributes the graphic commands and data (GCAD) to the external GPUs via the bridge circuit and interconnect transport mechanism. The Rendering Module generates complementary-type partial color images according to the multi-pass parallel graphics processing method of the present invention being used, e.g. as illustrated in FIGS. 7A through 7D. The Recomposition Module uses inter-GPU communication transport to transfer the pixel data of the complementary-type partial images among the GPUs during the image recomposition stages. Finally, the complementary-type partial color images are recomposited using the depthless image merging process of the present invention so as to generate a complete image frame of the 3D scene for display on the display device connected to the primary GPU on the graphical display card(s).

The Eighth Illustrative Embodiment of the Parallel Graphic Processing System (PGPS) of the Present Invention FIG. 8G shows an eighth illustrative embodiment of the PGPS of the present invention, embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8G the Parallel Mode Control Module (PMCM) and the Decomposition Submodule No. 1 reside as a software package in the Host Memory Space (HMS). The Vendor's GPU drivers also reside on HMS, along with the Graphics Applications, and the Standard Graphics Library. As shown, the Decomposition Submodule No. 2 and the Distribution Module are realized (as a graphics hub) on within a bridge circuit on the motherboard within the host computing system. The Rendering Module and the Recomposition Module are implemented by a plurality of GPUs which are driven in a parallelized under the control of the PMCM.

During system operation, the Decomposition Submodule No. 1 transfers graphics commands and data (GCAD) to the Decomposition Submodule No. 2. The Decomposition Submodule No. 2 divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module distributes the graphic commands and data (GCAD) to the internal GPU and external GPUs. The Rendering Module generates complementary-type partial color images according to the multi-pass parallel graphics processing method of the present invention being used, e.g. as illustrated in FIGS. 7A through 7D. The Recomposition Module uses inter-GPU communication transport to transfer the pixel data of the complementary-type partial images among the GPUs during the image recomposition stages. Finally, the complementary-type partial color images are recomposited using the depthless image merging process of the present invention so as to generate a complete image frame of the 3D scene for display on the display device connected to the external graphics card connected to the hybrid CPU/GPU chip via a PCI-express interface.

The Ninth Illustrative Embodiment of the Parallel Graphic Processing System (PGPS) of the Present Invention FIG. 8H shows a ninth illustrative embodiment of the PGPS of the present invention, embodied within a host computing system capable of parallelizing the operation multiple graphics processing pipelines (GPPLs). In the general, the computing system comprises: CPU memory space for storing one or more graphics-based applications, and a graphics library for generating a stream of graphics commands and data (GCAD) during the execution of the graphics-based applications; one or more CPUs, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a plurality of graphic processing pipelines (GPPLs), including a primary GPPL, wherein each GPPL includes a color frame buffer and Z depth buffer; and (ii) a parallel mode control module (PMCM) for automatically controlling the object-division mode of parallel operation during the run-time of the graphics-based application, during which the GPPLs are driven in a parallelized manner.

As shown in FIG. 8H, the Parallel Mode Control Module (PMCM) and the Decomposition Submodule No. 1 reside as a software package in the Host Memory Space (HMS). The Vendor's GPU drivers also reside on HMS, along with the Graphics Applications, and the Standard Graphics Library. As shown, the Decomposition Submodule No. 2 and the Distribution Module are realized (as a graphics hub) on the processor die of a hybrid CPU/GPU fusion-architecture chip on the motherboard, and having one or more GPUs driven with one or more GPUs on an external graphics card(s) (connected to the CPU/GPU chip via the interconnect) in a parallelized under the control of the PMCM. The GPUs on the external graphics card are used to implement the Rendering and Recomposition Modules. In some embodiments, the GPUs within the hybrid chip may assist in implementing the Rendering and/or Recomposition Modules.

During system operation, the Decomposition Submodule No. 1 transfers graphics commands and data (GCAD) to the Decomposition Submodule No. 2. The Decomposition Submodule No. 2 divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module distributes the graphic commands and data (GCAD) to the internal GPU and external GPUs. The Rendering Module generates complementary-type partial color images according to the multi-pass parallel graphics processing method of the present invention being used, e.g. as illustrated in FIGS. 7A through 7D. The Recomposition Module uses inter-GPU communication transport to transfer the pixel data of the complementary-type partial images among the GPUs during the image recomposition stages. Finally, the complementary-type partial color images are recomposited using the depthless image merging process of the present invention so as to generate a complete image frame of the 3D scene for display on the display device connected to the primary GPU on the external graphics card connected to the hybrid CPU/GPU chip via a PCI-express interface.

The Tenth Illustrative Embodiment of the Parallel Graphic Processing System (PGPS) of the Present Invention FIG. 8I shows a tenth illustrative embodiment of the PGPS of the present invention, embodied within a game console system capable of parallelizing the operation multiple graphics processing pipelines (GPPLs). In the general, the game console system comprises: CPU memory space for storing one or more graphics-based applications, and a graphics library for generating a stream of graphics commands and data (GCAD) during the execution of the graphics-based applications; a multi-core CPU chip with multiple CPU-cores, in communication with the memory space, for (i) executing the graphics-based applications, (ii) generating the stream of graphics commands and data, and (iii) segmenting the stream of graphics commands into frames for rendering pixel-based images of a 3D scene generated by the graphics-based application, and wherein objects within the 3D scene are generated by processing the frames of graphics commands and data along the stream; a Parallel Graphics Processing Subsystem (PGPS) supporting an object-division mode of parallel operation including at least four stages, namely, decomposition, distribution, rendering, and recomposition. The Parallel Graphics Processing Subsystem (PGPS) includes a Decomposition Module for supporting the decomposition stage of parallel operation, a Distribution Module for supporting the distribution stage of parallel operation; a Rendering Module for supporting the rendering stage of parallel operation, and a Recomposition Module for supporting the recomposition stage of parallel operation.

As shown, the Parallel Graphics Processing Subsystem also includes: (i) a graphics hub with an interconnect network, (ii) a plurality of graphic processing pipelines (GPPLs), including a primary GPPL, wherein each GPPL includes a color frame buffer and Z depth buffer; and (iii) a parallel mode control module (PMCM) for automatically controlling the object-division mode of parallel operation during the run-time of the graphics-based application, during which the GPPLs are driven in a parallelized manner.

As shown in FIG. 8I, the Parallel Mode Control Module (PMCM) and the Decomposition Submodule No. 1 are realized as a software package within the Host Memory Space (HMS). The Vendor's GPU drivers also reside on HMS, along with the Graphics Applications, and the Standard Graphics Library. As shown, the Decomposition Submodule No. 2 and the Distribution Module are realized as a graphics hub semiconductor chip within the game console system, whereas the Rendering and Recomposition Modules are implemented by multiple GPPLs supported on the game console board and driven in a parallelized manner under the control of the PMCM.

During system operation, the Decomposition Submodule No. 1 transfers graphics commands and data (GCAD) to the Decomposition Submodule No. 2, via the memory controller on the multi-core CPU chip and the interconnect in the graphics hub chip of the present invention. The Decomposition Submodule No. 2 divides (i.e. splits up) the stream of graphic commands and data (GCAD) according to the parallelization mode that is implemented using an embodiment of the parallel multi-pass graphics processing method of the present invention, which may be selected from the group of processes illustrated in FIGS. 7A, 7B, 7C or 7D. The Distribution Module distributes the graphic commands and data (GCAD) to the multiple GPUs. The Rendering Module generates complementary-type partial color images according to the multi-pass parallel graphics processing method of the present invention being used, e.g. as illustrated in FIGS. 7A through 7D. The Recomposition Module uses inter-GPU communication transport to transfer the pixel data of the complementary-type partial images among the GPUs during the image recomposition stages. Finally, the complementary-type partial color images are recomposited using the depthless image merging process of the present invention so as to generate a complete image frame of the 3D scene for display on the display device connected to the primary GPU via an analog display interface.

Advantages of the Present Invention

The depthless image recomposition process of the present invention is based on simplicity and low cost of implementation. It also offers a number of advantages over recomposition methods that are associated with "classical modes" of object division, based on depth comparison, which require expensive and high processing requirements, high bandwidth requirements, and additional cost of recompositing hardware.

In contrast, the depthless image recomposition process of the present invention does not involve any depth comparison, and merges the partial complementary images in the color buffers using a simple depth-less puzzle-like merging operation.

In classical modes of object division, the hidden objects are processed for rendering as if they were visible. This processing redundancy greatly decreases the parallelism efficiency. In the present invention the overdraw effect is completely eliminated by means of the Global Depth Map (GDM) materialized at each GPU.

The method of the present invention eliminates obstructed objects in early stages of multi-pass rendering operations. The more passes, the more aggregated savings.

In classical modes of object division, the anti-aliasing in a GPU is based on processing the edge pixels against their background, while this background might turn hidden, and be replaced by the background of another GPU in the final image. The result in classical modes of object division is incorrect image in the "stitched" boundaries. In marked contrast, the method of the present invention eliminates the hidden background during rendering process at each GPU, and pixels are always anti-aliased against their final background.

While Applicants have disclosed the parallel graphics processing methods in connection with object-based modes of parallel operation, it is understood, however, that the methods of the present invention can be practiced in hybrid environments, in which object-based modes are nested within image-based as in the case of hybrid parallel graphics processing systems. Also, it is understood that these alternative methods can be based on novel ways of dividing and/or quantizing: (i) objects and/or scenery being graphically rendered; (ii) the graphical display screen (on which graphical images of the rendered object/scenery are projected); (iii) temporal aspects of the graphical rendering process; (iv) the illumination sources used during the graphical rendering process using parallel computational operations; as well as (v) various hybrid combinations of these components of the 3D graphical rendering process.

While the principles of the present invention have been illustrated in parallel graphics processing platforms supporting a single mode of parallel operation, it is understood that the object-division mode of the present invention can be practiced in multi-mode PGS architectures, as disclosed in U.S. application Ser. No. 11/897,53 filed Aug. 30, 2007, and other system architectures, including hybrid system architectures.

It is understood that the parallel graphics processing technology employed in computer graphics systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A method of generating image frames of a 3D scene containing objects along a viewing direction, using an object-division based parallel rendering process carried out on a parallel graphics processing system employing a plurality of graphics processing pipelines (GPPLs) configured to operate according to object-division mode of parallel rendering, while eliminating the overdrawing of objects in said 3D scene that are occluded by other objects along said viewing direction, wherein said GPPLs include a primary GPPL, wherein each said GPPL has a Z depth buffer in which each depth value has an x, y position, and a color image buffer in which each pixel value has an x, y position, wherein said 3D scene to be rendered along said viewing direction is decomposed into objects, and said objects are assigned to particular GPPLs for graphics processing, wherein during the generation of each image frame, said method comprising the steps of:
   (a) transmitting graphics commands and data for all objects in the image frame, to all said GPPLs to be rendered;
   (b) within each said GPPL, using said graphics commands and data transmitted in step (a) to locally generate a Global Depth Map (GDM), and then storing said GDM within the Z depth buffers of all of said GPPLs;
   (c) transmitting graphics commands and data of objects in the image frame, to only assigned GPPLs;
   (d) within the color buffer of each GPPL, (i) generating a partial color-based complementary-type image, using said GDM, a Z test filter operating on said Z depth buffer, and said graphics commands and data transmitted in step (c), and (ii) then storing said partial color-based complementary-type image in the color buffer of said GPPL;
   wherein the pixels of objects sent to assigned GPPLs are rendered as color pixel values within the color image buffers of the assigned GPPLs, while pixels of objects sent to non-assigned GPPLs are rendered as black pixel values within the color image buffers of the non-assigned GPPLs;
   wherein said partial color-based complementary-type image within the color frame buffer of each said GPPL comprises (i) black pixel values corresponding to objects in the image frame sent to a non-assigned GPPL, and (ii) color pixel values corresponding to objects in the image frame sent to an assigned-GPPL and located closest to the viewer along said viewing direction;
   wherein, at a given x,y position in the color image buffers of said GPPLs, (i) at most only one said GPPL holds a color pixel value which has survived the Z test filter operating on said Z buffers using said GDM stored in said Z buffers of all said GPPLs, while all other said GPPLs hold a black pixel value; and
   (e) after a final pass, recompositing a complete color image frame of said 3D scene within said primary GPPL, using said partial color-based complementary-type images stored in said color image buffers of said GPPLs, by simply combining, at each x, y position, the color and black pixel values of said partial color-based complementary-type images stored in the color image buffers within said GPPLs, so as to form said complete color image frame of the 3D scene, without using said GDM or any depth value information stored in the Z buffers of said GPPLs.

2. The method of claim 1, wherein the generation of said GDM at each said GPPL is carried out during a first pass within said parallel graphics rendering process.

3. The method of claim 1, wherein the generation of said GDM at each GPPL is carried out as a computational process within said GPPL.

4. The method of claim 1, wherein said plurality of GPPLs is realized using GPU-based GPPLs, wherein each GPU-based GPPL comprises a graphics processing unit (GPU), and a video memory supporting said Z depth buffer and said color image buffer.

5. The method of claim 1, wherein said object-division based parallel rendering process is a multi-pass process; wherein step (a) comprises, during a first special rendering pass, said GDM is generated within each GPPL, by broadcasting graphics commands and data to all said GPPLs equally, for pixel depth (z) testing; wherein step (d) comprises during subsequent passes, generating said partial color-based complementary-type images in said GPPLs using said GDM and said object-division based parallel rendering process; and wherein step (e) comprises, after said final pass, recompositing said complete color image frame of said 3D scene without using said GDM or any depth value information stored in the Z buffers of said GPPLs.

6. The method of claim 1, wherein said object-division based parallel rendering process is a multi-pass process; wherein step (a) comprises, during a first special rendering pass, said GDM is generated within each GPPL, by broadcasting graphics commands and data to all said GPPLs equally, for pixel depth (z) testing, while debutted objects are color rendered in the assigned GPPLs; wherein step (d) comprises during subsequent passes, generating said partial color-based complementary-type images in said GPPLs using said GDM and said object-division based parallel rendering process; and wherein step (e) comprises, after said final pass, recompositing said complete color image frame of said 3D scene without using said GDM or any depth value information stored in the Z buffers of said GPPLs.

7. The method of claim 1, wherein said object-division based parallel rendering process is a multi-pass process; wherein step (e) is carried out in a hierarchical manner within said parallel graphics processing system, wherein said object-division based parallel rendering process is performed hierarchically in "$\log_2 n$" merging steps, where n is the number of GPPLs employed in said parallel graphics processing system; and wherein at each stage of the hierarchical object-division based parallel rendering process, the partial color-based complementary-type images stored in the color image buffers of pairs of said GPPLs, identified as source GPPL and target GPPL, are merged without using said GDM or any depth value information stored in the Z buffers of said GPPLs.

8. The method of claim 1, wherein each said color pixel value is a non-zero pixel value, and each said black pixel value is a zero pixel value.

9. The method of claim 1, wherein each said color pixel value is selected from a first set of pixel values, and wherein each said black pixel value is a pixel value that is not contained in said first set of pixel values.

10. A computing system for generating image frames of a 3D scene containing objects along a viewing direction, using an object-division based parallel rendering process carried out on a parallel graphics processing subsystem, while eliminating the overdrawing of objects in said 3D scene that are occluded by other objects along said viewing direction, said computing system comprising:
   CPU memory space for storing one or more graphics-based applications and a graphics library for generating graphics commands and data (GCAD) during the run-time of the graphics-based applications;
   one or more CPUs for executing said graphics-based applications; and
   a parallel graphics processing subsystem employing a plurality of graphics processing pipelines (GPPLs) configured to operate according to an object-division mode of parallel rendering;
   wherein said GPPLs include a primary GPPL;
   wherein each said GPPL has a Z depth buffer in which each depth value has an x, y position, and a color image buffer in which each pixel value has an x, y position;
   wherein said 3D scene to be rendered along said viewing direction is decomposed into objects, and said objects are assigned to particular GPPLs for graphics processing;
   wherein during a pass involved in rendering an image frame, graphics commands and data for all objects in the image frame are transmitted to all said GPPLs to be rendered;
   wherein graphics commands and data transmitted to each GPPL during said pass are used to locally generate a Global Depth Map (GDM) within the Z depth buffer of said GPPL;
   wherein during subsequent passes involved in rendering the image frame, graphics commands and data of objects in the image frame are transmitted to only assigned GPPLs;
   wherein, within the color buffer of each GPPL, a partial color-based complementary-type image is generated using said GDM, a Z test filter operating on said Z depth buffer, and said transmitted graphics commands and data, and (ii) then storing said partial color-based complementary-type image in the color buffer of said GPPL;
   wherein the pixels of objects sent to assigned GPPLs are rendered as color pixel values within the color image buffers of the assigned GPPLs, while pixels of objects sent to non-assigned GPPLs are rendered in as black pixel values within the color image buffers of the non-assigned GPPLs;
   wherein said partial color-based complementary-type image within the color frame buffer of each said GPPL comprises black pixel values corresponding to objects in the image frame sent to a non-assigned GPPL, and color pixel values corresponding to objects in the image frame sent to an assigned-GPPL and located closest to the viewer along said viewing direction;
   wherein, at a given x,y position in the color image buffers of said GPPLs, (i) at most only one said GPPL holds a color pixel value (i.e. non zero pixel value) which has survived the Z test filter operating on said Z buffers using said GDM stored in said Z buffers of all said GPPLs, while all other said GPPLs hold a black pixel value; and
   wherein, after a final pass, a complete color image frame of said 3D scene is recomposited within said primary GPPL, using said partial color-based complementary-type images stored in said color image buffers of said GPPLs, by simply combining, at each x, y position, the color and black pixel values of said partial color-based complementary-type images stored in the color image buffers within said GPPLs, so as to form said complete color image frame of the 3D scene, without using said GDM or any depth value information stored in the Z buffers of said GPPLs.

11. The computing system of claim 10, wherein the generation of said GDM at each said GPPL is carried out during a first pass within said parallel graphics rendering process.

12. The computing system of claim 10, wherein the generation of said GDM at each GPPL is carried out as a computational process within said GPPL.

13. The computing system of claim 10, wherein said plurality of GPPLs is realized using GPU-based GPPLs, wherein each GPU-based GPPL comprises a graphics processing unit (GPU), and a video memory supporting said Z depth buffer and said color image buffer.

14. The computing system of claim 10, wherein said object-division based parallel rendering process is a multi-pass process; wherein step (a) comprises, during a first special rendering pass, said GDM is generated within each GPPL, by broadcasting graphics commands and data to all said GPPLs equally, for pixel depth (z) testing; wherein step (d) comprises during subsequent passes, generating said partial color-based complementary-type images in said GPPLs using said GDM and said object-division based parallel rendering process; and wherein step (e) comprises, after said final pass, recompositing said complete color image frame of said 3D scene without using said GDM or any depth value information stored in the Z buffers of said GPPLs.

15. The computing system of claim 10, wherein said object-division based parallel rendering process is a multi-pass process; wherein step (a) comprises, during a first special rendering pass, said GDM is generated within each GPPL, by broadcasting graphics commands and data to all said GPPLs equally, for pixel depth (z) testing, while debutted objects are color rendered in the assigned GPPLs; wherein step (d) comprises during subsequent passes, generating said partial color-based complementary-type images in said GPPLs using said GDM and said object-division based parallel rendering process; and wherein step (e) comprises, after said final pass, recompositing said complete color image frame of said 3D scene without using said GDM or any depth value information stored in the Z buffers of said GPPLs.

16. The computing system of claim 10, wherein said object-division based parallel rendering process is a multi-pass process; wherein step (e) is carried out in a hierarchical manner within said parallel graphics processing system, wherein said object-division based parallel rendering process is performed hierarchically in "$\log_2 n$" merging steps, where n is the number of GPPLs employed in said parallel graphics processing system; and wherein at each stage of the hierarchical object-division based parallel rendering process, the partial color-based complementary-type images stored in the color image buffers of pairs of said GPPLs, identified as source GPPL and target GPPL, are merged without using said GDM or any depth value information stored in the Z buffers of said GPPLs.

17. The computing system of claim 10, wherein each said color pixel value is a non-zero pixel value, and each said black pixel value is a zero pixel value.

18. The computing system of claim 10, wherein each said color pixel value is selected from a first set of pixel values, and wherein each said black pixel value is a pixel value that is not contained in said first set of pixel values.

* * * * *